United States Patent
Wu

(10) Patent No.: US 10,585,969 B2
(45) Date of Patent: Mar. 10, 2020

(54) SYSTEM AND METHOD FOR EXTENDING DATABASE FUNCTIONS BY A WEB APPLICATION AND COMPUTER READABLE MEDIA

(76) Inventor: Jianqing Wu, Beltsville, MD (US)

( * ) Notice: Subject to any disclaimer, the term of this patent is extended or adjusted under 35 U.S.C. 154(b) by 775 days.

(21) Appl. No.: 13/543,829

(22) Filed: Jul. 7, 2012

(65) Prior Publication Data

US 2014/0012922 A1    Jan. 9, 2014

(51) Int. Cl.
*G06F 16/958*    (2019.01)

(52) U.S. Cl.
CPC ................ *G06F 16/972* (2019.01)

(58) Field of Classification Search
CPC .......... G06F 3/04842; G06F 17/30368; G06F 17/30327; G06F 17/0483; G06F 16/972
See application file for complete search history.

(56) References Cited

U.S. PATENT DOCUMENTS

| | | | |
|---|---|---|---|
| 2007/0011144 A1* | 1/2007 | Balan et al. .................... 707/3 |
| 2007/0118603 A1* | 5/2007 | Washburn et al. ......... 709/206 |
| 2007/0185721 A1* | 8/2007 | Agassi ................ G06Q 10/06 | 705/1.1 |
| 2009/0150168 A1* | 6/2009 | Schmidt ............... G06Q 10/10 | 705/311 |
| 2009/0287718 A1* | 11/2009 | Motoyama et al. ......... 707/100 |
| 2010/0268705 A1* | 10/2010 | Douglas ................ G06Q 10/06 | 707/723 |
| 2011/0184935 A1* | 7/2011 | Marlin .................. G06Q 50/10 | 707/719 |
| 2013/0046789 A1* | 2/2013 | Lulew cz .......... G06F 17/30292 | 707/792 |
| 2013/0297517 A1* | 11/2013 | Sinha .................... G06Q 10/06 | 705/301 |
| 2014/0188574 A1* | 7/2014 | Luca ....................... G09B 7/00 | 705/7.39 |

* cited by examiner

*Primary Examiner* — Mariela Reyes
*Assistant Examiner* — Courtney Harmon
(74) *Attorney, Agent, or Firm* — Jianqing Wu

(57) ABSTRACT

A system and method for extending database functions by using an installed web application. A project work environment for a group of users can be created, modified, and reset instantly during a project life and/or between project life cycles by using a plurality of methods without effecting system integrity and core functions such as data validation, searches and sorting, data preservation, data display feature, and productive data entry methods.

20 Claims, 32 Drawing Sheets

| Assign Project Manager | View Project Manager | Assign Project Manager | Discussion Board | E-mail | Log out |
|---|---|---|---|---|---|
| Code | Project Full Name | Project Manager | Password | E-mail address | Actions |
| glg | Corporate Litigation Site | g-admin2 | 222222 | manager@test.com | View Modify Delete |
| mdg | Internal discuss Site | g-admin1 | 111111 | gbp@test.com | View Modify Delete |

FIG. 2

| Assign Project Manager | View Project Manager | Assign Project Manager | Discussion Board | E-mail | Log out |
|---|---|---|---|---|---|

Assign Project Manager

Login name ▭ (1-20 letters)
Password ▭ (6-20 letters)
Confirm Password ▭
Email Address (opt) ▭

Submit

Name Search | Full Screen | Email | Setup Project | Setup Tables | Log out

Internal Discussion Group
― 152  Manager: Man FastName  Date: 3/2/2009
[Search]

| Notes | Names | Privilege log | Doc-log | Hot Log | Discussion | Pad | Instructions |

Change Project Password

- Change Password
- Update Account Info
- Modify Project Setup
- View Project Members
- Assign New Members
- Update Shared Account
- Export Project
- Import Project
- Reset Configuration

, 153

Old Password [        ]
New Password [        ]
New Password [        ]

[Change] [Cancel]

FIG. 4A

Modify Project Setup

| Project Full Name | Project Green Forest | (1-50 letters) |
| Project Code | GP 1 | (3-10 letters) |
| Member Login Methods | Group and Personal ▼ | |
| Entry Validation Page | Via Tentative Table ▼ | ,154 |
| Data Validation Method | Manager and Vote ▼ | |
| Required Votes No. | 3 | |
| Pad Max Record Size | 200 | |
| Max Suggestion Size | 50 | (Shown in selection box) |

Do you allow server's administrator to access your project data?

○ Yes   ◉ No

[Submit]

FIG. 4B

| | View Project Members | | | |
|---|---|---|---|---|
| Member No. | Member | Password | E-mail | Operations |
| 4 | 2person1 | 2person1 | gbp@test.com | View Modify Delete |
| 5 | 2person2 | 2person2 | | View Modify Delete |
| 6 | 2person3 | 2person3 | | View Modify Delete |

Assign Project Members

Enter member Log-in Name and Password

Login Name [                ] (1-20 letters)
Password   [                ] (6-20 letters)

[Submit] — 156

Or add Log in names and passwords for plural members

You may upload a text file ( e.g. name. txt ) containing name-password pairs ( e.g., johnsmith 10, pass8759; jonstone, pass7658 ) where the name password pairs are delimited by a carriage return or semicolon.

[                                    ] [Browse]

[Submit] — 157

FIG. 4D

Update Project Shared Account

Manager Project Shared Account
Shared Log-in Name [myglg]   (1-20 letters)
Shared Password   [111111]  (6-20 letters)

[Submit] — 158

FIG. 4E

Reset Table Configuration

1. Choose one of the options:

○ Restore project settings to system's default — 163
   ○ Delete data from selected tables (keep the table structure)
   ● Reset selected tables by configuration file (DELETE DATA)

a. Select tables below or    [Select All]
           — 164

| ☐ Changes | ☐ Acronym |
   |---|---|
   | ☐ Transaction | ☐ Privilege-Log |
   | ☐ Names | ☐ Doc_Log | b. Select Additional Options

☐ Delete all existing tables (DATA) that do not match any table in the Configuration file — 165

☐ Create a new table according to the configuration file If the table does not exit in your current system.

○ Reset all tables by your own configuration file (DELETE ALL DATA)
   — 166

2. Find your configuration file:

[_____] [Browse]

[Submit]

FIG. 4H

| | | | | |
|---|---|---|---|---|
| Changes | Data Entry Layout | Modify Table History Table | Delete Table & Backup Data Upload Data | Advanced Setup |
| Transaction | Data Entry Layout | Modify Table History Table | Delete Table & Backup Data Upload Data | Advanced Setup |
| Names | Data Entry Layout | Modify Table History Table | Delete Table & Backup Data Upload Data | Advanced Setup |
| Acronym | Data Entry Layout | Modify Table History Table | Delete Table & Backup Data Upload Data | Advanced Setup |
| Privilege-log | Data Entry Layout | Modify Table History Table | Delete Table & Backup Data Upload Data | Advanced Setup |
| Production log | Data Entry Layout | Modify Table History Table | Delete Table & Backup Data Upload Data ← 167 | Advanced Setup |
| Pad | Modify | | | |

Set Up More Table

FIG. 5A

Create Database Table

* Table Navigation: Names
Table Name: Names  ← 168

[Insert entry]  [Delete entry] ← 169

170 →

| | | | | | | | |
|---|---|---|---|---|---|---|---|
| Col 1 Field | First_Name | Type | VARCHAR | Length | 30 | Not NULL ☐ | Unique ☐ |
| Col 2 Field | Last_Name | Type | VARCHAR | Length | 30 | Not NULL ☐ | Unique ☐ |
| Col 3 Field | Firm | Type | VARCHAR | Length | 100 | Not NULL ☐ | Unique ☐ |
| Col 4 Field | Notes | Type | VARCHAR | Length | 200 | Not NULL ☐ | Unique ☐ |

[Submit]

FIG. 5B

Structure of the Names Table

| Field | Data Type | Null | Unique | Setup Data Source |
|---|---|---|---|---|
| ☐ First_Name | VARCHAR(30) | Yes | No | 171 → Setup |
| ☐ Last_Name | VARCHAR(30) | Yes | No | Setup |
| ☐ Firm | VARCHAR(30) | Yes | No | Setup |
| ☐ Notes | VARCHAR(30) | Yes | No | Setup |

[ Delete ] [ Add ] [ Modify ]  ← 172

FIG. 5C

Modify Columns for Names

Col 1 Field [First_Name]  Type [VARCHAR]  Length [30]  Not NULL ☐  Unique ☐

[ Submit ]

FIG. 5D

Advance Setup–Change Navigation Name, Table Name, Access Rule, and Validation Route or Page, Validation Method, and Display Scope Setup for Table: Transaction

| | | |
|---|---|---|
| Navigation Name | [Transaction] | (Fewer than 20 letters) |
| Table Name | [Transaction] | (Fewer than 20 letters) |
| Data validation Page | [Via Whole Table ▼] | |
| Data Validation Method | [Manager and Vote ▼] | |
| Votes | [3] (Excluding owner) | |
| Data Access Rule | [Private Edit ▼] | |
| Display Scope | [Show all Data ▼] | |

[ Change ]

FIG. 5E

Email | Setup Project | Setup Tables | Log out

| Internal Discussion Group | | | | | | | |
|---|---|---|---|---|---|---|---|
| | Global Search | | Manager: Man Lastname | | | Date: 3/2/2009 | |
| Notes | Names | Privilege_log | Doc-log | Hot Log | Discussion | Pad | Instructions |
| | | Back to Summary Page | | Active Table | Archive Table | | |

Active Table Changes → 185

Rec. Id [  ] [  ] [Go] [All Date ▼] [  ] [  ] [Go] [All Fields ▼] [  ] [Go]

| 1 | 2 | 3 | 4 | 5 | 6 | 7 | 8 |
|---|---|---|---|---|---|---|---|
| Sys_record_id | Events | Date | Comment | Entry_date | Confirm_date | Initials | App |

| 1 | 21 | 2 | First Amendment — 186 | | | | |
| 3 | 07/10/2010 | | | | | | |
| 4 | A first amendment was distributed on July 10, 2010. The major change was the privilege review standard. | | | | | | |
| 5 | 04/19/2011 09:03:37 | 6 | 04/19/2011 09:06:31 | 7 | MAN1 | 8 | VOTE |
| 1 | 28 | 2 | First Amendment | | | | |
| 3 | 07/10/2010 | | | | | | |
| 4 | The first review instruction was published on instruction page. You can identity this file by document ID0010. — 187 | | | | | | |
| 5 | 04/19/2011 20:48:26 | 6 | 04/18/2011 21:38:36 | 7 | MAN1 | 8 | VOTE-R |

Archive: [Selected Records] [Displayed Records] [Found Records] [Whole DB Table]

Set Up the Instructions Page

A. Procedural Guidelines
   1. Topic A                       Update ← 188
   2. Topic B                       Update B. Substantive Guidelines
   1. Topic C                       Update
   2. Topic D                       Update
   3. Topic E                       Update
   4. Topic F                       Update C. Other Tools
   1. Log in
   2. Payment Histories
   3. Computation Tools
   4. Performance Analysis

FIG. 5K

Update A Topic for Multiple Topic Page

You are updating Topic A:

Topic [_____] ←—189

Message [The attached file is a guideline for this project.] ←—190

File List: Merger.doc
Upload File:
Add More File Path (accept dpf, jpg, txt, doc...) ←—191

[_____] Browse

[Submit]    [Cancel]

FIG. 5L

Upload Data to the Transaction Table

[Sequence Match]   [Field Name Match]   ☐ Select/deselect all

─192   ─194

| Fields in the Table: | | | | Fields in the File: |
|---|---|---|---|---|
| Sys_record_id | Sys_record_id | Clear | Add | ☐ Sys_record_id |
| Sys_user_id | Sys_user_id | Clear | Add | ☐ Sys_user_id |
| Sys_status | Sys_status | Clear | Add | ☐ Sys_status |
| Entry_date | Entry_date | Clear | Add | ☐ Entry_date |
| Confirm_date | Confirm_date | Clear | Add | ☐ Confirm_date |
| IP | IP | Clear | Add | ☐ IP |
| Initials | Initials | Clear | Add | ☐ Initials |
| App | App | Clear | Add | ☐ App |
| Event | Acronym | Clear | Add | ☐ Acronym |
| Date | Date | Clear | Add | ☐ Date |
| Comment | Comment | Clear | Add | ☐ Comment |

193   [Submit]   [Clear All]   195

Change Layout — 201

| Validated Table | Tentative Table | Whole Table | Edit Table | Look-up Table |

Validated Records in Names (1200 Records) — 202

[Enter] [Delete] [Edit] ← 203    [____Search____] ← 204

| | 1 | 2 | 3 | 4 | 5 | 6 | 7 | 8 | 9 | 10 | 11 | 12 | 13 |
|---|---|---|---|---|---|---|---|---|---|---|---|---|---|
| | Sys_rec_id | Confirm_date | App | FirstName | MI | LastName | Email | Firm | Comment | Initials | Type | Entry_date | |

Row 1: 1223 | 05/30/2011 14:58:16 | MG | Jere | | Buchanan | | Green & White, LLP

Total Votes : 3 — 205

| User ID | Initials | Voting Date |
|---|---|---|
| 6 | TSF | 04-03-2009 12:32:07 |
| 5 | TST2 | 04-03-2009 12:29:18 |
| 4 | TST1 | 04-03-2009 12:21:05 |

Row 2: 1239 | 05/30/2011 14:58:16 | MG | Judd | | Buchanan | test2@test.com | GoodWork LLP | This test record | TST | Law Firm | 04/22/2011 15:26:55

FIG. 6B

☐ 1161   test99991@test.com   Lisa  Cars  Law House LLP   01-20-2008

Current Votes : 1 — 206

| User ID | Initials | Voting Date |
|---|---|---|
| 6 | TSF | 04-03-2009 12:32:07 | ← 207

☐ 1145   test1218@test.com   Scott  Foster           04-03-2008

| Change Layout | | | | | | | | | | | | | |
|---|---|---|---|---|---|---|---|---|---|---|---|---|---|
| Validated Table | | Tentative Table | | | Whole Table | | | Edit Table | | | Look-up Table | | |
| Tentative Records in Names (2 Records) | | | | | | | | | | | | | |
| Enter | Delete | Vote | Revoke | Edit | | | | Buchanan | | | Search | | |
| | 1 | 2 | 3 | 4 | 5 | 6 | 7 | 8 | 9 | 10 | 11 | 12 | 13 |
| | Sys_rec_id | Confirm_date | App | FirstName | MI | LastName | Email | Firm | Comment | Initials | Type | Entry_date | |
| 1 | 18 | | 2 | 05/30/2011 14:58:16 | 3 | MG | | | | | | | |
| 4 | Jack | 5 | | 6 | Buchanan | | | | | | | | |
| 7 | test185@test.com | | | | | | | 8 | Green Lab, LLP | | | | |
| 9 | For special use | | | | | | | | | | | | |
| 10 | MAN 1 | | | | | | | | | | | | |
| 11 | Partner | | | | | | | | | | | | |
| 12 | 04/22/2011 14:21:19 | | | | | | | | | | | | |
| 13 | 11/10/2008 | | | | | | | | | | | | |
| 1 | 19 | | 2 | 05/30/2011 14:58:16 | 3 | MG | | | | | | | |
| 4 | John | 5 | | 6 | Buchanan | | | | | | | | |
| 7 | test2@test.com | | | | | | | 8 | GoodWork LLP | | | | |
| 9 | This test record | | | | | | | | | | | | |
| 10 | TST | | | | | | | | | | | | |
| 11 | Law Firm | | | | | | | | | | | | |
| 12 | 04/22/2011 15:26:55 | | | | | | | | | | | | |
| 13 | | | | | | | | | | | | | |

Labels: 201 (Change Layout), 202 (Edit Table), 203 (Edit button), 204 (Search), 205 (MAN 1)

All Records in Changes (3 Records)

Validated Table | Tentative Records | Whole Table | Edit Table | Look-up Table Change Layout

[Enter] [Delete] [Vote] [Revoke] [Edit]   [first] [Search]

| | 1 Sys_record_id | 2 Entry_date | 3 Initials | 4 Events | 5 Date | 6 Comment |
|---|---|---|---|---|---|---|
| ☐ 1 | 108 | 05/30/2009 | TST | others | 04/02/09 | First record |
| ☐ 1 | 21 | 05/30/2009 | MAN 1 | | 04/02/09 | A first amend |
| ☐ 1 | 20 | 05/30/2009 | TST | | 04/03/09 | the first review |

Global Search Result

| tex | Global Search | Member: Smith |

Changes | Transaction | Names | Priv-log | Doc-Log | Discussion | Instructions | Pad Global Search Results (Red Record ID Means the Record Is Unverified) — 212

Key: tex; First Table: [Acronym ▼]  Order By: [Sys_record_id ▼] [Go]

- Acronym
- Sys_record_id
- Full_name
- Comment

1: 8;VID;Vendor identifier in software. a little text th... tion Digital, a digital for output voltages:[];[];[];[];[] [Acronym]
2: 10;VID;Vendor identifier in software. a little text t... ognized product name;voltage identification Digital, a digital, for ... [];[];[] [Acronym]   — 213
3: 3314;test; 07/06/2010; Heat Wave Scorches the Northeast Today in 2 minutes: Northeast & Mid-Atlantic states see near-record temperatures [Discussion]

FIG. 7G

Add Records To the Changes Table

Select Tables: Chan | Tran | Name | Acro | Priv | Doc | Home  ← 214

Server Response: Record 211 was entered at 05/30/2011 16:27:05 ← 215

Date format: MM-DD-YYYY

Events (< 80): Second-record
Date: 05/30/2011
Comment (<300): This is a second record.

[Submit] [Close] [Close Pop-up & Refresh Table]

FIG. 7H

Edit Records in the Changes Table

Instructions: Date format: MM-DD-YYYY
Record to Be Edited Next:
212, 211

The Record (No. 213) Is Under Edit Now ← 216

Events (<80): Record B
Date: 01-01-2009
Comment (<300): The record come from different source.

[Save Record] [Close]

FIG. 7I

| Discussion Board for Garden Project | | |
|---|---|---|
| Open View | Conventional View | |
| Subject | Date | Users |
| Server Speed | 06/03/2009 | TST |
| Work Progress Summary | 04/28/2009 | UST |
| New Counsel | 03/09/2009 | MAN |
| 228 → Submit Message  Search Message | | |

FIG. 7N

| Discussion Board: Message Details |
|---|
| Subject: New Counsel |
| Member Names: TST 2 \|Post Date : 03-03-2009\| IP : 192.168.41.70 |
| I have encountered a new law firm, which is not listed in our review list. This firm appears to be a firm who worked for or against our client and its name is Zoolet. Can anyone confirm this? — 229 |
| Back    Related Messages    Submit Messages    Search Messages |

FIG. 7O

```
         Discussion Board: Search Message

Subject [                              ] [ Go ]

Subject [ Server                          ]
      Date ● at any time, or ○ in the period
Between [January ▼] [1 ▼] [2007 ▼] and [January ▼] [1 ▼] [2008 ▼]
Search Key [                              ]
              [ More Key ] [ Fewer Key ] ◄── 230
(Blank search key allows the search to include all possible search
keys)         [ Search ] [ Reset ]
```

FIG. 7P

```
         Discussion Board: Submit Message

*Subject [ Server speed                    ]
    Search Keys [ Server                          ]
 Your Name (opt) [ TST                            ]
Email Address (opt) [                            ]

*Message [ I have problem with the server functions ]
           The page at http://localhost:9080 says:      [X]
        If you are satisfied with your message, please press confirm.
                  [ Cancel ]    [ OK ]               ◄── 231

[/root/test files/menu.jpg] [ Browse... ]  Remove filepath
   Add more file path (dpf, jpg, txt, doc etc. )      ◄──── 232
                         [ Submit ]
                                            Search Message
```

FIG. 7Q

SYSTEM AND METHOD FOR EXTENDING DATABASE FUNCTIONS BY A WEB APPLICATION AND COMPUTER READABLE MEDIA

BACKGROUND OF THE INVENTION

The present invention relates to information management system, and, in particular a web-based information management system.

Database Management System ("DBMS") has been a matured and the most powerful tool for managing large amounts of information. In as early as in mid-1960s, there were a number of database systems in commercial use. In 1971, a group known as "Database Task Group" lead by Charles Bachman delivered a standard, which generally became known as the "Codasyl approach", and a number of commercial products based on this approach became available. In 1968, IBM developed its own database system known as IMS, which was similar in concept to Codasyl, but used a strict hierarchy for its model of data navigation. Both concepts later became known as navigational databases. In 1970, Edgar Codd wrote a number of papers that outlined a new approach to database construction that eventually lead to the groundbreaking relational model of data. Beginning in 1973, INGRES delivered its first test products that were ready for use in 1979. Companies such as IBM and Honeywell developed different database models. In 1968, the University of Michigan began development of the Micro DBMS that remained in production until 1996. IBM created the first version System R in 1974 and then delivered multi-user versions for test in 1978 and 1979, by which time a standardized query language (SQL) had been added. Many of the people involved with INGRES formed their own companies to commercialize their work. In the 1980s, Sybase, Informix, NonStop SQL and even Ingres itself were all sold as offshoots to the original ingress product. In Sweden, Mimer SQL was developed from the mid-70s at Uppsala University. In 1984, this project was consolidated into an independent enterprise. In the early 1980s, Mimer in C introduced transaction handling for high robustness in applications, an idea that was subsequently implemented on most other database. The rise in object oriented programming technologies in the 1980s has affected how data in databases was handled. This allows for relationships between data to be relation to objects and their attributes and not to individual fields. Another big changes in the 1980s were increasing reliability and access speeds. In 1989, two professors from the University of Wisconsin at Madison published an article at an ACM associated conference outlining their concept of increasing database performance. This eventually leads to the practice of indexing.

After more than half a century of development, database technologies have become so complex that it is beyond the reach of ordinary users. It is noted there was a need for automated configuration and management. The development of numerous database options has created flexibility in database management. Despite the efforts by the experts from the whole world, database technology is still considered as an art for server computers and mainframe computers.

Many problems that severely limit database application on the Internet have not been solved. Few efforts have been directed to building the bridge between powerful database applications and web application. Database applications are only used for large enterprise business, and the deployment of database for online use is expensive and requires a long development cycle.

Web interfaces between a database application and web users are generally realized by static programming. By using such a method, a server program using a database application must be designed specifically for each application. No publication teaches how to extend a database application to the browser in a quick and easy way so that ordinary users can run and use the database from a client computer. Another problem is often the cases that those who manage projects do not have access to the server. Thus, ordinary users cannot use the conventional database.

There is a need for a cheep and relatively simple technology, which allows the users to run and use database application from web pages rather than from a server terminal. For example, there may be situations where a large number of the people work on a project from client terminals at various locations for a short period of time. Each of the projects is unique in table number, field definitions and other attributes. Therefore, it is neither possible to develop a perfect web interface for a database system, nor economically feasible due to the nature of one-time use. Assuming the task is to investigation of the organized crime by multiple agencies in several cities and states. The project might require dozens of investigators to interview thousands of witnesses at various cites and collect information from all kinds of sources. Frequently, a vast amount of collected information might be ultimately useless, and the success of the investigation may depend upon the ability to identify and connect only a few pieces of critical information. It is even possible that one piece of the information acquired by Investigator A in New York may be relevant to a piece of information that Investigator Z encountered in Los Angeles. Yet, two pieces of information may lack direct and obvious connection. Under the traditional investigation model, it is highly unlikely to pull out the two pieces of isolated information together due to lack of direct connection. Thus, a web-based system for collecting, storing and distributing massive amount of information at the lowest costs may provide the best tool for finding such a connection.

Another example is management of information for discovery in a large suit. In the last decade, document reviewers received a binder containing review instructions on the first day of review. With information expansion, the binders have become larger and larger. The background information may have tens of pages, the list of key players might be hundreds of pages long, and there might be hundreds pages of relevant transactions. For a global company, any topic might require hundreds of pages of outlines. The investigators might have to use two, five or more large binders for tracking case information. When the task is to answer specific questions based upon the results of investigation, the investigator has to search the massive binders.

The old binder method is no longer workable in practice for many other reasons. All binders will become obsolete in a few days due to the discovery of new information and the changes in response to unavoidable changes. All reviewers or investigators have to learn the same critical facts, terms, or transactions, and they cannot share the work product of others. When the entire review team is changed, the knowledge and experience of the team will disappear, and thus the lead investigator might know little about review history, relevant facts, hot transactions, important events, and critical documents. They never have a second chance to get the first hand information, nor do they have the time to read the mountains of documents. When a reviewer runs into an unfamiliar term, a technology, a transaction, an event, a product, or a person of interest, the reviewer may try to scan through the volumes of binders, ask a colleague about it, or just make the best guess. None of methods is productive and workable. Unfamiliar substance is the biggest time-killer and the number one factor responsible for poor performance and disastrous outcome. Cooperate documents contain difficult technologies, uncommon acronyms, foreign language terms, unfamiliar jargon, and implied assumptions in high frequency, and it is beyond the point for any intelligent person to make a reasonable call. A bad call missing the most favorable evidence or inadvertently failure to keep a privileged smoking-gun document may ruin the client's case.

For the forgoing reasons, there might be a need for a new technology to extend the database application to web browser without additional costs and development cycle; there might be a need for a system that is able to collect, search and distribute a massive amount of information to a plurality of the users online; there might be a need for a database system that can be accessed from client terminal and configured at the client terminal; and there might be a need for a database system that can be reconfigured within a project life cycle and between project life cycles. A web-based information system disclosed in the present invention may be useful in clinic trails, census data analysis, research and development, a variety of surveys, business operations, personal information management, and internal investigations.

SUMMARY OF THE INVENTION

One object of the present invention is an information management system that has configurable data tables and non-configurable tables with a unique display layout and the tools for configuring, saving, changing and applying display layout out. The system has tools for deleting, adding and changing database tables within a project life cycle and between project life cycles. The present invention discloses three methods for creating new data tables: (1) using a configuration file to reset the data tables, (2) importing a model project zip file, and (3) creating table structures manually from a client terminal.

Another object of the present invention is an information sharing system, which has a plurality of the view table of different access levels, provides tools for validating data records, and tools for controlling user's authority to view, edit, and write data records for each of the data tables and view tables.

Another object of the present invention is an information management system that is equipped with a server pad for storing private casual information in casual format. The server pad has a large input box for writing data, a submit button for saving and updating the data, tools for sorting saved data on the server, a search box for conducting searches, and an input box for interactively retrieving saved data. Its sorting, searching and interactive retrieving capabilities make it an ideal tool for managing a large amount of private causal information.

Another object of the present invention is an information management system which has rich tools such as adding data, viewing data, searching data, validating data, and sorting data, and global edit functions. Whenever a data table is created during a project life cycle, the newly created data table supports all existing functions. The global edit function allows the user to find data records by date, record ID, and other criteria, create a plurality of records, and copy and paste data record between any two editable data records.

Another object of the present invention is an information management system, which provides an interactive data-feeding function, which not only saves time on data entry, but also improves data consistency. The interactive search and data-feeding function can be set up for any of the data tables within any project life cycle. The function can dramatically improve data entry speed and consistency and help the user avoid entering duplicate records.

One object of the present invention is phrase construction function for interactively feeding data from a static source or one or more database fields. By using the interactive phrase construction function, the total number of keystrokes is substantially reduced for each phrase with an improved data consistency.

BRIEF DESCRIPTION OF DRAWINGS

FIG. 2 shows Administrator's page "View Project Managers."

FIG. 3 shows the page for Administrator to assign project managers.

FIG. 4A shows the page for a newly assigned manager to change password together with a left-side menu.

FIG. 4B shows the page for modifying project setup.

FIG. 4C shows the page for viewing all project members.

FIG. 4D shows the page for assigning user accounts by direct input and by uploading a file.

FIG. 4E shows the page for updating the shared account name and shared password for the project group.

FIG. 4H shows the page for resetting data table configuration for the group.

FIG. 5A shows the page containing all menu items under the "setup tables" link.

FIG. 5B shows the page for creating a database table for the group.

FIG. 5C shows the page for adding, deleting and modifying columns or fields and the "setup" link for setting up interactive search and phrase construction features.

FIG. 5D shows the page for modifying a column or field after the user selects a field from the associated table and clicks the "Modify" bottom in FIG. 5C.

FIG. 5E shows the page for advanced setup: changing navigation name, table name, access rule, data validation route, data validation methods, and display scope.

FIG. 5J shows a page for setting up a history table for a Changes table.

FIG. 5K shows an Instructions page containing a link for creating each of a list of topics.

FIG. 5L shows a page for updating a topic under instructions.

FIG. 5M shows a page for uploading data through a file.

FIG. 6A shows the voting status of the record No. 1223 in the validated table of the Names table under a manager's account.

FIG. 6B shows the voting status of the record in the tentative table of the Names Table under a manager's account.

FIG. 7A shows a Names table in a tentative table with a "Vote" and "Revoke" buttons and a record marked in the unique color and look indicating that the user has voted.

FIG. 7D shows a Names table in a whole table opened from a manager account, where the validation method is set to both manager validation and voting validation and the display layout is a default one-field-per-line display layout.

FIG. 7E shows a Changes table in a whole table, where four records (Nos. 174-177) were marked as having been voted and the user is about to vote for four records (Nos. 178-181) for validation.

FIG. 7F shows the data records in the order of reverse record ID, which have been retrieved from searching the Changes table's whole table by using search key "first."

FIG. 7G shows a Global Search Result where data records are found from all configurable data tables and non-configurable tables and the user can select the first table and a sorting field for the first table.

FIG. 7H shows an "Add Records to the Changes" table, where the user has entered a prior record (ID 211) and typed a data record for next submission.

FIG. 7I shows an "Edit Records" page for the Changes table, where Record No. 213 is under edit and the record Nos. 212 and 211 are in a line for edits.

FIG. 7N shows a Discussion Board in the conventional view.

FIG. 7O shows message details for a message in the Discussion Board.

FIG. 7P shows a search page for conducting searches in the Discussion Board using various criteria.

FIG. 7Q shows a page for posting a message on the Discussion Board and a pop-up confirmation window right after a clicking of the Submit button.

DETAILED DESCRIPTION OF PREFERRED EMBODIMENT

A. Hardware Components and Software Components

Figure 1:
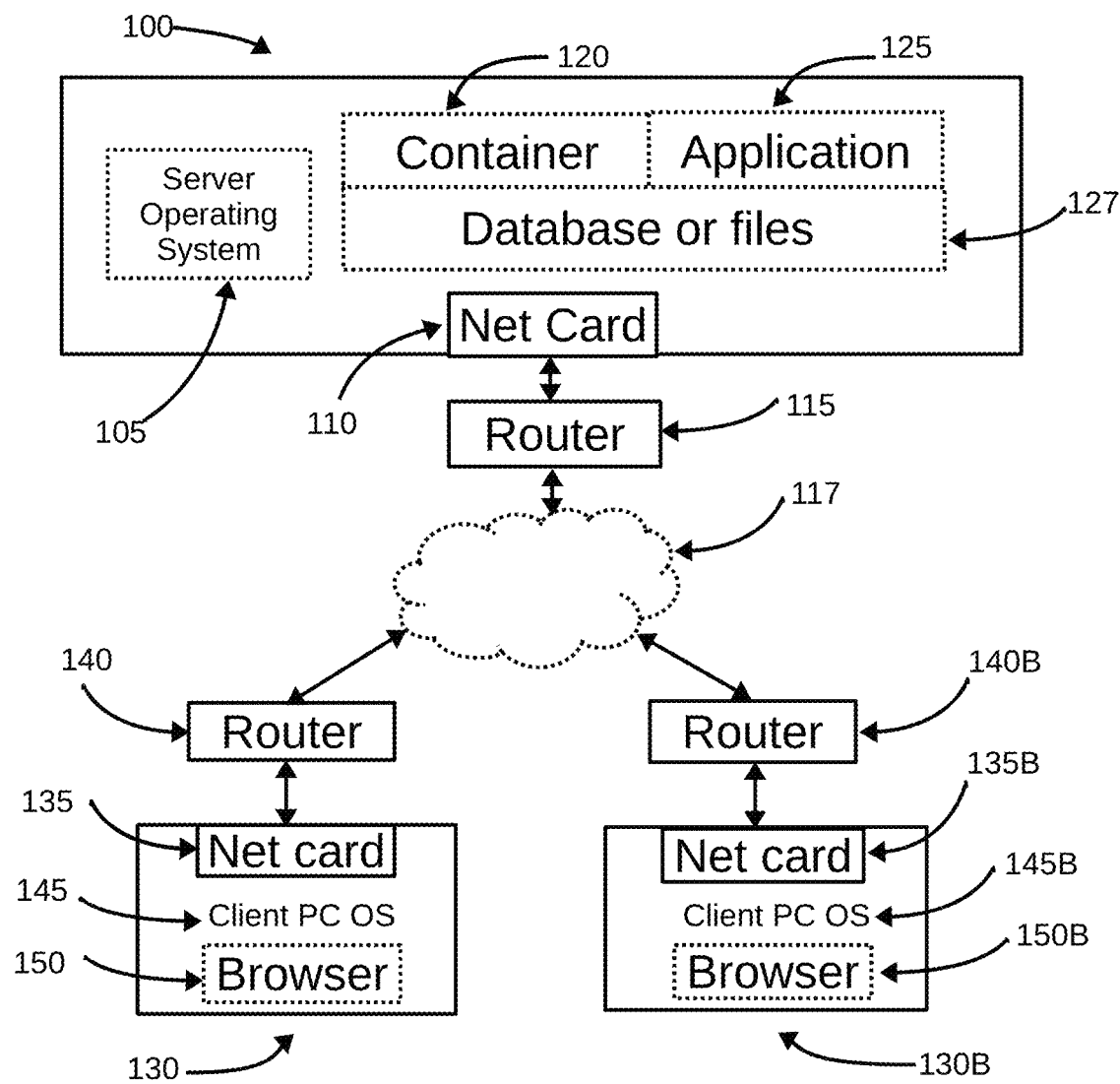
FIG. 1 is a schematic diagram showing the necessary hardware components of the present invention.

The system (FIG. 1) comprises a server 100 and client computers 130 and 160, which are connected in a network so that they are able to exchange data using common data transmitting protocol such as TCP. The server 100, which runs an operating system 105, has a network interface 110 and is connected to the Internet 117 through a router 115. The server comprises a processor operated by an operating system installed on a hard disk. Java Development Kit (JDK version 1.5.06) is installed for compiling Java class files. In the ext folder inside the lib folder of the Java Runtime Environment (/usr/share/jdk/jre/lib/ext), activation.jar and mail.jar are placed. To handle file uploading, a package known jspsmartupload (or equivalents) is used. The server is installed with Apache Tomcat 5.5.15 and a database application MYSQL 5.0.27. To allow Tomcat's Java class component to access the MYSQL database, mysql-connector-java.jar is used.

The client computer 130 is also operated by its own operating system, has a network interface 135, and is connected to the Internet 117 through an interface 140. The client computer 130 runs a browser or a similar HTML rendering application so that it is able to browse standard web pages rendered by the server 100. Optionally, it has a second client computer 130B containing all components. Each of the client computers is able to access the server using WWW protocol and access the web pages sent by the server according to any of current standard HTTP protocols (1.0, 1.1, and 1.2).

The application source files developed for this invention include JSP programs, Java class files and JavaScript and other support files. After installation, all files necessary for running the web application are saved in a hard disk of the server 100. Computer program files, lib files, and database data were routinely stored in portable computer storage media for backup.

A computer readable storage medium commonly used in computer application development include floppy diskette, a hard disk, a random access memory, a read-only memory, an erasable programmable read-only memory, a portable compact disc, an optical storage device, and a magnetic storage device.

B. Server Administration

The system may host plural projects and it thus has three different log in pages: a log in page for the server administrator, a log in page for project managers, and a log in page for project users.

Each of the projects is run by at least one privileged user ("manager" or "project manager") and a plurality of project users under ordinary accounts. Each project is totally independent from other projects on the system. No file sharing and data exchanges between the users of two projects are allowed although modification can be made to allow data to be shared between projects. In using this system, the administrator first creates accounts for managers.

Upon logging in, the administrator can see the default page showing a list of active discussion boards (FIG. 2). Each entry indicates a running project. The administrator can see assigned managers by clicking the "View Managers" on the navigation bar (FIG. 3). To create a manager account, the administrator first logs in the server and can see the page in FIG. 2. Each of the project entries is followed by three links: View, Modify and Delete. By clicking "View", the administrator can view manager account details except the password. After the administrator resets a manager's password, and the manager will be prompted to change password in next sign-in process.

By clicking the "Assign Project Manager" button on the navigation bar in FIG. 2, the server opens the "Assign Project Manager" page shown in FIG. 3. The administrator assigns a log in name, a tentative password, and an optional email address. The administrator can assign as many manager accounts as practicable by responding to a prompt for assigning more manager account at the end of each assignment. Whenever the administrator has assigned a manager account and given the log in name and password to the assigned manager by any arrangement such as phone, email or regular mail, the administrator's duty is discharged. The rest authority of managing projects is passed onto the project manager.

The administrator has assigned two project managers (e. g., g-admin1 and g-admin2) (FIG. 3). After the initial assignment, the passwords are shown in this table. However, after managers have changed their password, the passwords are shown in stars (not shown in the figures). If the administrator clicks the View link for a manager (on FIG. 2), the server opens a page where the administrator can view the information about the manager: log in name, account password, company, manager's initials, legal name, full address, phone number, email address, and IP address used for changing the password. The initials are used for the convenience of managing the project. The password is displayed as stars if the manager has changed the password. By clicking the Modify link in FIG. 2, the server generates a page containing editable fields (except IP address) that are filled with original account information. The administrator can use this page to update any of the fields except the IP address, which is automatically filled when the manager resets the password. The administrator can reset password for the manager by changing the password, and it could cause the manager to change password again.

The administrator can also delete any of the manager accounts from the server. If a manager account has been associated with a project, the administrator is advised of the effect of deletion and prompted to type in "yes" in a pop-up window to confirm. After the deletion, the project associated with the manager's account is inactivated so no users are allowed to access the project. The project data are not be deleted by this operation alone. It is preferable to allow the administrator to create a compressed encrypted file by using a project password such as group log in password stored on the system so that the project data may be reloaded in the future. The administrator is not allowed to access project files. The project manager should properly delete or archive the project data before the manager account is arranged for deletion. Additional back-end tools may be used to delete abandoned projects.

The administrator can view the discussion board for a project just like the users of the project if the administrator has been granted the right to access to the project board. The discussion board has conventional view and expanded view. By clicking "Open View" or "Conventional View" button, the administrator can view the discussion board, which is substantially same as those shown in FIGS. 7N-, 7Q. Any of the managers can prevent the administrator from accessing the project data by using the manager's setup page. If the project manager does not grant the right to access to the discussion board to the administrator, the administrator cannot view pages. While the administrator can reset the manager password, the project manager will know this action upon next sign in. If the project manager changes its log in name, the server keeps track of its associated project. This can be achieved by using a manager ID as an association field. If there is a need for assigning a new manager account as a replacement account, it is possible to change the field in the project data so that the project is associated with the project manager. The system is implemented so that each project may be associated with plural manager's accounts and they can manage projects by rotation.

The administrator may send and receive email from any of the project users on the server. This internal email is intended for communication between administrators, project managers and users.

Other administration functions include suspending, archiving, and delete projecting at server level. However, the server administrator must go through a series of steps of authorization before such an operation can be performed. In order to suspend an on-going project, the server administrator must fill a certificate, which states that a notice has been sent to the project manager on a certain date and a response has been received, and provides a statement of certification to the server before deletion is allowed. The certificate is kept in a system file for tracking project history. If the administrator tries to delete an obsolete project or archives a finished project, the administrator is prompted to provide information on the status of the project and the time lapse since the closing of the project. The server deletes the project only after the administrator has provided satisfactory answers. Before deletion is performed, the administrator is asked to consider archiving the project for off-the-system storage. The administrator can use an export tool to archive the project. When the project is archived, the administrator gets a compressed project file. A user with project management privilege may render the project on this or another system. In the alternative, the administrator can periodically dump project data by using mysqldump or equivalent command of the database application. The dumped file may be stored on an independent system or on a storage media.

It is understood that the system may be modified to allow the administrator to configure and manage projects. In this case, the user would be in the administrator's position to set up projects. In the simplest implementation, the server may be designed to host only one project.

C. Basic Functions and Features

The default navigation buttons, after all data tables are deleted, comprises Table1, Table2, Table3, Table4, Table5, Discussion, Pad and optional Instructions. Each of the navigation buttons except that the "Discussion", "Pad" and "Instructions" buttons is associated with a configurable data table and can be changed within a project life cycle or between two project cycles. When a data table is deleted, its navigation name on the navigation bar is replaced with "Table #" (where # is a numeric number) implying that it is not set up for use. An alternative implementation would be that the data tables are set up with the most useful table structures. The table structures of the data tables (the database tables) can be changed, and thus they are referred to as "configurable data tables."

If a user clicks any of the navigation buttons, the server responds with a message that the table has not been set up. If a data table is set up, it can be opened in one of the three views: validated table, tentative table, or whole table. They are tables on a web page and does not means database tables. A given view of different data tables presents similar type of data records such as validated records, tentative records, or all records. Each of the views has a table name (i.e., a table title on the web page), a search box at the top, a table body containing data records, and plural action buttons at the top or the bottom. The number and nature of fields depend on application need and can be determined at setup.

All data tables have similar views and navigation patterns but vary in their table structures such as field number, field types, and field names, and action buttons. For each table, new record is entered on a tentative table or a whole table ("combined data table") and is validated as permanent record by a validation method. The tentative table and the whole table are referred to as validation route or validation page. After a record is validated, it cannot be edited or deleted by any ordinary user. Only a privileged user can further edit or delete it. Validation methods include manager any records on both validated table and tentative table, while each of the ordinary users is allowed to delete his own tentative records if data access rule is set for private edit or delete any of the tentative records if data access rule is set to public edit; the privileged user uses the Validate button on the validation page to accept or validate data records, while each of the users uses the Vote and Revoke on the validation page to cast vote or retract vote; and a validation button is placed on the tentative table and whole table. When a tentative record is validated by any method, it disappears from the tentative table (the whole table if the data entry route is set to the whole table) but appears in the validated table.

The tentative table has a check box on the left of each of the data records. Those check boxes can be used in conjunction with plural action buttons placed at the top or the bottom of the table. For the whole table, a check box is placed in front of each of the tentative records. On the pages for a privileged user, a check box is placed in front of each of the records so the privileged user can edit and delete the record. Of course, a data table may have all of the three views in an alternative implementation. The number and type of the action buttons depend upon the view table, validation route, validation method, and record ownership. It can be summarized in the following table:

TABLE 1

Functional Buttons on Different Web Pages in the Preferred Embodiment

| User | Validation Method | View Tables | Functions/Buttons |
| --- | --- | --- | --- |
| Manager | Manager | Validated | Edit, Delete, Enter, Remand |
| Manager | Manager | Tentative/Whole | Edit, Delete, Enter, Validate, Validate all |
| Manager | Vote | Validated | Edit, Delete, Enter, Remand |
| Manager | Vote | Tentative/Whole | Edit, Delete, Enter, Vote, Revoke |
| Manager | Manager/Vote | Validated | Edit, Delete, Enter, Remand |
| Manager | Manager/Vote | Tentative/Whole | Edit, Delete, Enter, Validate, Validate all, Vote, Revoke |
| User | Manager | Validated | (None) |
| User | Manager | Tentative/Whole | Edit, Delete, Enter |
| User | Vote | Validated | (None) |
| User | Vote | Tentative/Whole | Edit, Delete, Enter, Vote, Revoke |
| User | Manager/Vote | Validated | (None) |
| User | Manager/Vote | Tentative/Whole | Edit, Delete, Enter, Vote, Revoke |

*A user can edit and delete tentative records of the user, and all tentative records if the data edit rule is set to public. Remand button is to change the record from validated status to tentative status.

validation and voting validation ("user validation" or "member validation"). If a data table is set up with a tentative table as validation route, the tentative table shows only tentative records while the validated table shows validated records. If the data table is set up with a whole table as the validation route, all validated and tentative records appear in the whole table, while only validated records appear in the validated table. The system may be set up with an additional option for viewing all three tables. The view selecting bar 202 (FIG. 6A) allows the user to select a view table.

The whole table shows all records just as in a conventional table. A whole table uses different display colors for tentative records and validated records, and contains additional action buttons for voting, revoking, and validating. When those functions and unique marking colors are removed, the whole table becomes a conventional table except that the whole table supports default display layout and user-configured display layouts. Accordingly, the invention encompasses the traditional table.

All tables have tools for the users (managers or users) to input records and edit records; the privileged user can delete If the table is set up with manager validation, the action buttons on the user's validation page consist of "Enter", "Delete" and "Edit". The user's ability to edit and delete records depends upon data access rule and record ownership. The action buttons on the manager's validation page include "Enter", "Delete", "Edit", "Validate" and "Validate All." The manager is allowed to delete and edit data records on the validation page while the user's ability to delete and edit data records depends upon the data access rule and record ownership.

The user can edit only the user's own records if data access rule is set to private edit, but can edit any tentative record if the data accord rule is set to public edit. In addition, the manager's validation page contains an optional action button or link ("Accept All" or "Validate All") for accepting all records. When data validation route is a whole table, the action buttons are same as they are on the tentative table.

If a data table is set up with voting validation, the action buttons on the user's validation page include "Enter", "Delete", "Edit", "Vote" and "Revoke". The Edit button is added in the latest version so the user can edit records according to the data access rule and it is not shown in some drawings. The manager page has the same buttons because no validation button is on this case. The manager can cast vote for any tentative records. The buttons are placed on the tentative table or the whole table.

If a data table is set up with both manager validation and vote validation, all six buttons "Enter", "Delete", "Edit", "Validate" (Validate All), "Vote" and "Revoke" are placed on the manager's validation page. The manager can validate records by directly validating them or voting on them. Five buttons "Enter", "Delete", "Edit", "Vote" and "Revoke" are placed on the user's tentative table page or whole table page. The manager can delete and edit records on the validation page while the user's right to delete and edit records is limited by the data access rule and the data ownership. When a user tries to delete or edit a record of another user when data access rule is set to private edit, the user will get a message that the user has no permission to do it.

Each of the functions for deleting, editing, voting, revoking vote, validating data records is designed to handle a plurality of data records. The edit function allows the manager to sequentially edit selected records. If a user selects 3 records (213, 212, 211) and then clicks the edit button, the user is promoted to edit one record at a time. The edit page shows record number 213 under edit, and the records, 212, 211 stand in a line for edit. If the user runs into a record that the user is not authorized to edit, the server responds with a message, and prompts the user to skip it, and, upon skipping the record, the user is presented with next record for edit together with a list of the records in the line. The records standing in the line will decrease one by one until all selected records have been edited.

A validated table holds only validated records and users are not allowed to delete or edit any validated records. However, the manager may to delete or edit validated records. The action buttons on the manager's page consist of "Enter", "Delete" and "Edit." If the manager wants to have users to rework on certain data records, one way the manager can do is to change the statuses of those data records so that they are routed back to the validation table where the users can edit them. If corrective work is done by all users, the manage may change the data access rule to pubic edit. After the users edit, the data records are then validated by using "Validate All" function and routed back to the validated table. The validation scheme and validation methods can work together to meet a variety of needs.

Sorting function is associated with each of the column headers, each of which is also link for sorting records using the field as the sorting key. By clicking a column header such as "Events", "Date" or "Comment" in the transaction table, the user causes a script to call the server program to send an updated page with the selected column as a sorting key. Therefore, the server sends the data records that have been sorted by any of the fields.

Two kinds of search methods, local search and global search, are available on each of the tables. Local search is limited to the data records that would be viewed under the view table, and global search (also "combined search") is for searching all configurable data tables and non-configurable discussion board and personal pad. A search on a tentative table will search only tentative records, a search on a validated table will search only validated records, and a search on a whole table searches both validated and tentative records, and global search searches all data tables, the discussion table, and personal pad. Search function may be implemented across view tables to find both validated and tentative data records.

All view tables have a page size control bar at the bottom. One example is "Page 1 of 2, Go to page [ ] [GO]: Records per page [5]: Next Last." [ ] denotes an input box, and [Go] is a button. The input box is for the user to enter a target page number, and a drop-down box for changing the number of records per page. The user can go to any page by typing a number in the input box and clicking the "Go" button. The options of number of records per page are 5, 15, 40, 60, and 100 by default. Those displayed links change, depending upon the current page number in light of total page ranges. The page size control bar is placed on all tables, the email tables, and the discussion board in all their views, under all user accounts, including the administrator, project managers, and project users. It is also used in all search result pages. The page size control bar shows up only when the number of retrieved records is more than the selected record number per page.

When the shared log in method is set up for use, the registered users are allowed to log in as a group. To keep track of activities on the project, the IP address is recorded for each message posted on the discussion board. For example, a message posted by a shared account contains the header information: "Member Name: SHARE | Post Date: Feb. 25, 2009 | IP: 192.168.41.10". A record submitted by a user to a data table from a shared account is identified as "SHARE" in the initials field. On a manager's account, "SHARE" is a link for displaying the sender's identity information. By clicking "SHARE", the manager can see log in name, SHARE, and IP address. This allows the manager to know the IP address of the sender.

Managers can use any of those features in connection with data tables or static tables including discussion, email and server pad in the same way as any project user does.

D. Project Management

A manager is any person who has a manager account that has a special privilege for managing the project for the group. By using such an account, the manager has the privilege to manage project for the group and thus becomes a privileged user. An manager can log in the server by using his log in name and password. After the manager logs in, the manager can set up a project and configure data tables. In the disclosure, a user means either a project manager or an ordinary user.

Upon logging in, the manager is prompted to provide some basic information such as his first and last name and his initials for identification purpose. However, it is understood, any other notation, and number and string may be used in lieu of initials. After the password is reset, the manager is allowed to access all functions and features intended for managers. Upon signing in, the manager has an opportunity to set up a project. The manager is first prompted to provide only certain critical information. On an initial setup page (similar to FIG. 4B), the manager enters project name or group name, project code, selects an option for log in method and provides shared password in duplicate. The manager enters a value or selects an option for global data validation route, validation method, default personal pad's record size, and administrator access right. Data validation route has a system-wise effect, but the manager can change the validation route for each of the tables under the Setup Tables page. The manager can set server pad's record size for all users of the project group, but the each of the users can overwrite this choice. The maximum suggestion number is the maximum number of data entries to be displayed in a dynamic selection box for an input box of a data entry from.

Data validation in this disclosure means that data validation ("human validation method") by one or more users exercising judgment, this term is intended to exclude all non-human data validation methods by computer algorithms on the basis of data characters such as text formats, variable types, value ranges, lack of value, value comparison (such as password validation), special characters, and character features. Non-human data validation methods are used to achieve different purposes. Data validation methods determine who has the authority to validate tentative records and how tentative data records are validated, whereas "data validation route" or "data validation page" determines where tentative records are lodged initially and validated. The system allows the manager to select one of three choices: Manager validation only, voting validation only, and both manager validation and voting validation. If a table is configured with manager validation, only the managers of the project can validate tentative records. If a table is configured with voting validation, a data record can be validated when a predetermined number of users have voted in favor of acceptance. When a data table is configured with both manager validation and voting validation methods, the manager can validate tentative records, and the users can validate tentative records by a vote.

Figures 7B, 7C:
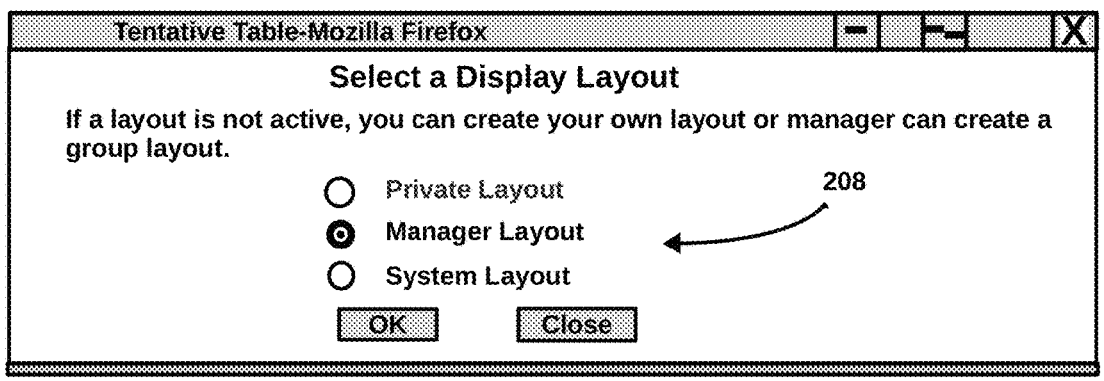
FIG. 7B shows a Names table in the whole table using user's personal display layout.
FIG. 7C shows a page for selecting display layout that has been opened by clicking "Change Layout."

When the validation route is a tentative table, new records enter into the tentative table as tentative records (See FIG. 7A). Upon validation, their statuses are changed so that they "appear" on the validated table, and "disappear" from the tentative table (FIG. 7B). This validation route allows the manager to keep track of all tentative records. The other validation route, "whole table", allows new records to enter the whole table that shows both validated records and tentative records. All data records are stored in the same database table with different values in their validation status so they can be retrieved for different views. Use of whole table as validation route allows users to see all data records, regardless of their validity. When a record in the whole table is validated, its status is changed, it appears in the validated table, but remains in the whole table as a validated record with its marking color changed.

If a data table is configured with a tentative data route and the manager validation method, the manager validates tentative records on the tentative table. On this page, there are a search box at the top, the body of the table in the middle, and four buttons: Enter Delete, Edit, Validate, and Validate All (similar to FIG. 7A except that FIG. 7A also has the Vote button and the Revoke button because this table is set up with both validation methods.).

To validate data records, the manager selects the records to be validated by checking their boxes and clicks the Validate button. The browser responds with a pop-up window prompting the manager to confirm. Upon confirmation, those checked records are validated, and they disappear from the tentative table and appear on the validated table. The manager may use the "Accept all" or "Validate all" link to validate all tentative records. This operation requires the manager to confirm on a pop-up window by typing in "yes" and sending it. After the records are validated, they cannot be edited or deleted by the users.

The manager can delete any records from the tentative table by checking the corresponding check boxes and pressing on the Delete button. The server deletes the records after the confirmation by a pop-up window. The manager can edit any tentative records by using the Edit button. Upon editing, the initials or identity of records creator are changed by attaching "-R". Thus, "TST" will become "TST-R" indicating that the record, created by TST, has been edited by the manager. The Enter button works independent of the check boxes in front of data records.

After a data record in the validated table is edited, the value in the APP field is attached with "-R". The value "MAN" or "VOTE" thus becomes "MAN-R" or "VOTE-R" respectively. In FIG. 6A, the record no 1223 was originally created by TST, it was validated by three votes by TSF, TST1 and TST2. After the record was admitted as a validated record, one of the managers edited the record as revealed by "VOTE-R".

If the table is configured with a whole table route and manager validation method, the manager can validate data records by a similar method used in the tentative table. In this case, the whole table contains both validated and tentative records. However, the two kinds of data records are marked in different colors in their number fields or any related fields, and with different values in the APP field (the manager's initials). In contrast, each of the tentative records is in a different color and contains nothing or null in the APP field.

The manager can find target tentative records by using the search function at the top of the table by suitable keys such as creator identity, entry date, record ID, unique search key, and so on. The manager can also use the page size control bar at the bottom to go to a page containing target tentative records. After the manager finds target tentative records, the manager checks the boxes in front of them, and clicks the "Validate" button. Upon confirmation, those records are validated, and show up in the validated table while remaining in the whole table as validated records.

An Edit, Delete, and "Enter Record" buttons are placed in the whole table so the manager can edit any of records just as the manager does on the tentative table. After a record is validated, ordinary user cannot delete it. The manager can delete it by checking the corresponding check box and clicking the Delete button at the bottom. The server deletes the records upon confirmation. On the whole table, the Enter button is used independent of the check boxes for data records.

As in the tentative case, the initials of the creator of the data record are appended with "-R" after the manager has edited the tentative record. The data record remains in the whole table. Thus, "TST-R" under the initials field means that the record is created by TST, has been edited by the manager, but has not been admitted as a validated record. If a data record is both edited and validated by the manager, the manager's initials are added to the App field and "-R" is appended to the initials of the creator.

FIG. 4A shows the manager's home page for the manager to manage the project or working environment. It contains a topper menu 151 including links: Email, Setup Project, Setup Tables and Logout and a main navigation bar 152 and a left-side menus 153. "Setup Project" is a link for opening the page for setting up a project. "Setup Tables" is a link for opening the page shown in FIG. 5A, which contains an embedded link at the bottom for creating additional table if the default table number is insufficient. "Email" is a link for calling the page for viewing and sending email. The manager is allowed to send email to the administrator, co-managers, and the users. On the "Setup Project" page (FIG. 4A), there are nine left-side menus 153: (1) Change Password, (2) Update Account Information, (3) Modify Project Setup, (4) View Project Members, (5) Assign New Members, (6) Update Shared Account, (7) Export Project Files, (8) Import a Project Zip, and (9) Reset Configuration.

By clicking the "Change Password," the manager can change the password for the account. Manager can also amend account information by using an "Update Account" page.

FIG. 4B shows the page for the manager to modify project setup in Block 154. In an initial setup, the manager has an opportunity to set up project. By using this page, the manager can modify project setups including full name, project code, user's log in methods, data validation routes (via tentative table or whole table), and the right of the administrator to access project data. If data validation route for the whole system is tentative table, all new data records are lodged on the tentative table, and validated records are lodged in a validated table. If data validation route is whole table, all new data records are shown in the whole table. Tentative records in the whole table are marked in distinctive a color and look. The specific setting for each of the data tables will supersede this system-wise data validation route. Maximum suggestion Number is the maximum number of data pieces to be displayed in selection box for interactive search feature.

FIG. 4C shows the "View Project Members" page, on which the manager can view, modify and delete any of the user accounts by clicking a respective link 155. By using those links, the user can view the user's account, modify user account and delete the user account. The account information page shows log in name, password, company, user initials, user name, address, phone number, email address, and numeric IP address. The page for modifying user account contains editable all fields except for the IP address field.

FIG. 4D is the "Assign Project Members" page for assigning a new user account. After the manager provides log in name and password in input boxes 156 and submits the page, the manager is prompted to assign more user accounts. The manager can repeat this process until the manager has ends the process. The manager may upload a text file containing log in-name and password pairs to create accounts quickly by using the file path 157. The file contains data in the format: "person-1, 111111; person-2, 222222; person-3, 333333." The name-password pairs may be delimited by a carriage return or semicolon. Upon successful upload, the server sends the page showing project users. From the displayed result, the manager immediately knows if accounts have been created successfully. The manager can assign accounts for managers who have the same privilege as the manager except that they do not have the authority to assign manager accounts to other users. In an alternative implementation, the system includes a program for generating passwords for a list of users automatically. The program ensures that two identical log in names are not assigned to two users. By adding additional feature, the manager uploads a file containing a list of properly delimited email addresses to the server, or inputs the email addresses into a large input box on a web page and submits the page to the server. The server generates a log in name and temporary password for each email address, and sends an invite message containing the log in name and the password to each of the email addresses. The email message may contain a link for accessing the newly created account or an instruction on logging in the new account. Each of the project users will be prompted to change password when the user logs in the account the first time.

FIG. 4E shows the page for the manager to change shared log in name and shared password in Block 158. The user log in method is defaulted to private or personal log in method. Three log in options are (1) group shared log in method, (2) personal log in method, and (3) both. When a personal log in method is set up for use, each of the project users can access all features and functions under the personal account. When the group or shared method is used, all project users can log in and access the project by using a common log in name and a common project password. In this case, the project users cannot use personalized features such as email, account management, and server pad. When both log in methods are selected, a registered user can log in by using the group account or personal account.

Figure 4F:
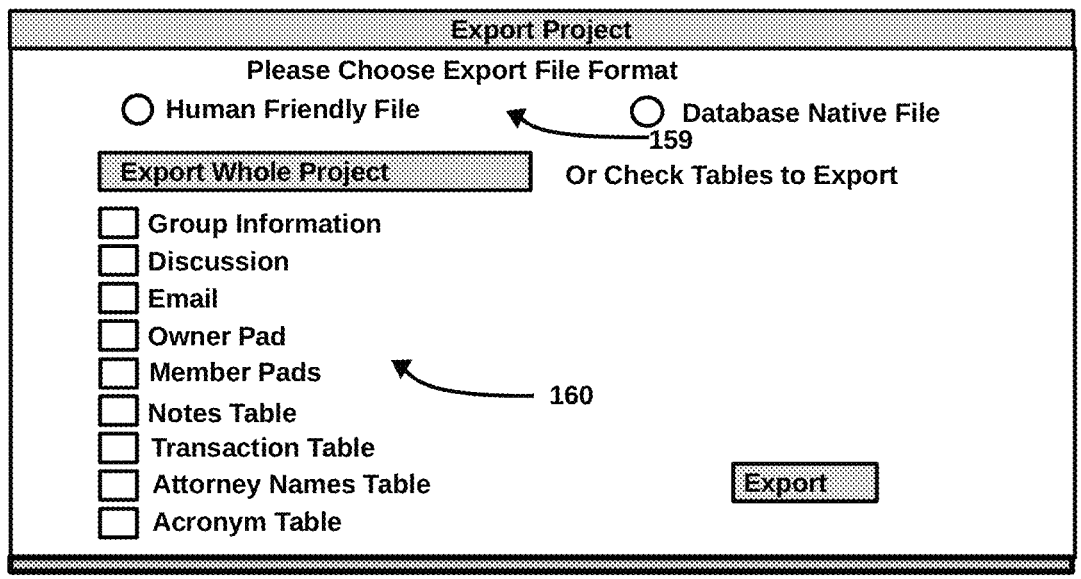
FIG. 4F shows the page for exporting project data for the project manager.

FIG. 4F is the page for exporting the project in database native format or human-friendly format ("HFF"). The manager can select file format at Block 159 and select data tables and fixed tables at Block 160 for export. In exporting, the system creates two files, data.properties and struct.properties, for keeping track of exported data. Struct.properties is a map for finding the files containing table structures of the data tables and data.properties is a map for finding the files containing the data for the data tables.

Figure 4G:
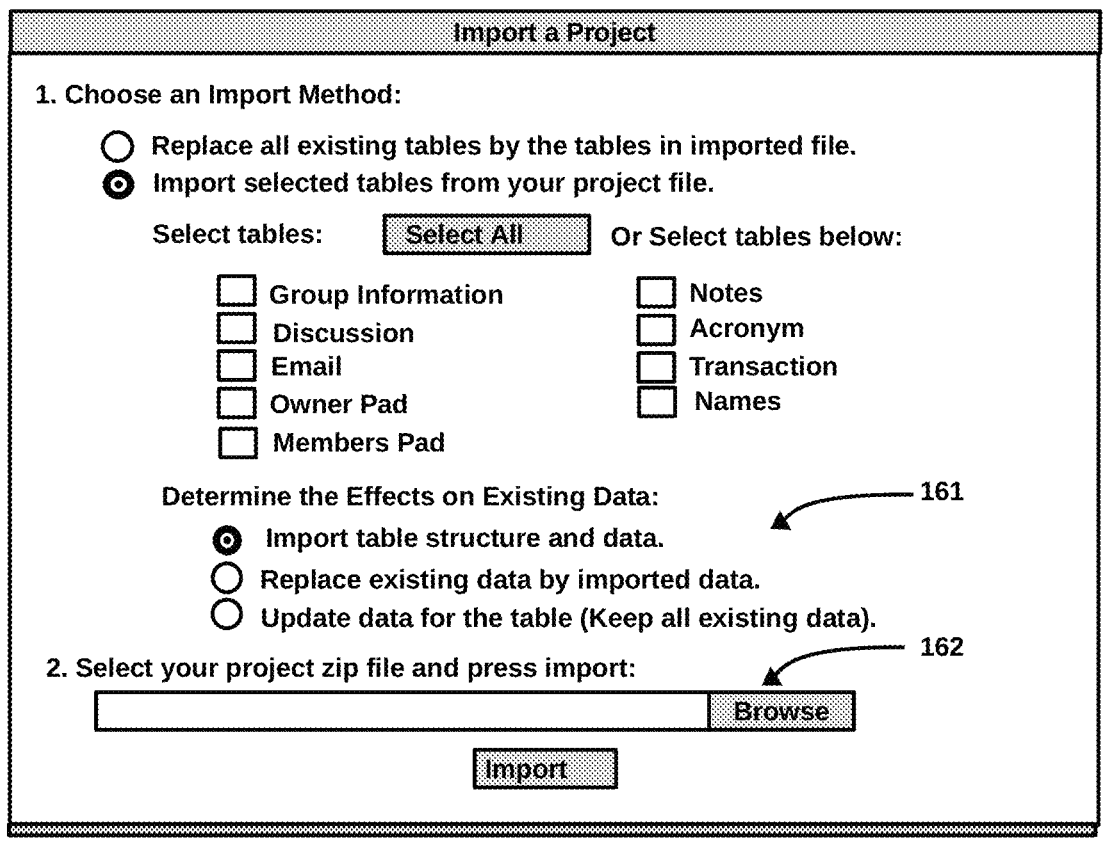
FIG. 4G shows the page for importing a project zip file.

FIG. 4G shows the page for importing a project by a zip file, which is opened from clicking the link "Import a Project Zip". The system allows the manager to (1) replace all tables and data by tables and data from the uploaded zip file or (2) import selected tables from the project file. When the second option is selected, the system displays existing data tables, owner pad, discussion board, and group information so that the manager can choose any of them as import targets. The manager can further choose from radio buttons 161 an option to (a) import table structure and data, (b) replace existing data in the table by imported data, and (c) add data in the table (keep all existing data). Option (a) causes the system to drop selected tables and create a new table, and copy the data into the newly created tables. Option (b) does not affect the table structure of target tables, but restores the data in the target tables to the state right before the project was exported. Option (c) keeps original data and adds new data records to the table. The page has a file path browser 162 for browsing project zip file for import.

FIG. 4H shows the page for "Reset Configuration." On this page, the manager has the four options (Block 163) to (1) restore all project settings to system's default, (2) delete all project data from all tables including email and the discussion board, (3) reset selected tables by a configuration file, and (4) reset all tables by a configuration file. The details of those functions are discussed in the section for code implementation and program structures. Data tables may be configured by using a pre-tested configuration file in a few seconds and data tables may be added, deleted and changed in the order of minutes. When option 3 is selected, the user may select tables at Block 164 and choose additional options at Block 165. It has a file finding path 166.

FIG. 5A is the "Setup Tables" page, containing seven links 167: Data Entry, Modify Table, Delete Table & Backup Data, Advanced Setup, [Display] Layout, History Table, and Upload Data. Each of the functions is associated with the data table on the same row. If the project requires more tables, the manager can use the "Setup more table" link at the right bottom to create more data tables.

FIG. 5B shows the page for creating a new data table. This page has two input boxes 168, the buttons 169 for adding or deleting input rows, and an initial row of input boxes 170. On this page, the manager first enters a word such as "Names" in input boxes 168 as the navigation name and table name. This value is saved in the Head table on the server. The table name should be one single string without any space, and may not contain special characters and words and phrases that have been used as system fields. The manager defines each field by providing a field name and the length. The field name should contain no space, no "-" and special characters. Type can be selected in the drop-down menu, and available types include integer, tiny integer, char, varchar, double, year, date, time, and date and time. Each field should be assigned with a data type, the check box for Not null is checked if the field cannot be null, and the check box for uniqueness is checked if the value in the field is unique. The filled the form is submitted to the server for processing. If the operation is successful, the server shows the same page (FIG. 5A) with the newly created table in it. If the server encounters an error, it responds with an error message.

FIG. 5C shows the table structure of a data table with three function buttons 171, which can be used to modify the data table. The manager can select any field and click the "Modify" button to modify the field or click "Delete" button to delete the selected field. The manager can also use the "Add" button to add a new field. The page for modifying data field is shown in FIG. 5D. Each entry on FIG. 5C also has a link "Setup" 172 for setting up interactive search and feeding function for the field.

One of the links on FIG. 5A is "Delete Tables & Backup Data." Upon clicking this link for the Notes table, the server presents a page titled "You can delete the Notes and/or backup the data for the table" followed by three choices: (1) Delete the data, (2) Delete the table without saving its data, and (3) Backup its data only. The option 3 is followed by a check box for selecting a human friendly file format. When this check box is checked, the server extracts and writes data in a delimited text file. All of those functions require the manager to confirm by typing "yes."

After a table is deleted, a "Setup" link is automatically placed next to the table entry on the "Setup Tables" page. The manager can recreate the same table or a different table by clicking the "Setup more table" link. When the first data table is deleted, the table name will become "table1" on the "Setup Tables" page, and its navigation name also becomes Table1. When the manager clicks the navigation button "Table1", it sends the manager a "Setup Tables" page. If a user clicks the navigation button, it sends the message: "This table is not set up for use. If you need it, ask your manager to set up." The Modify link for the Pad entry allows the manager to change pad record size for all users (but the user may change the size for his own pad). The discussion board, email, and all other tables for the "Instruction" page are not configurable in the preferred embodiment.

FIG. 5E shows the page of "Advanced Setup" opened from the page in FIG. 5A. The server sends a page titled "Change Navigation Name, Table Name, Access Rule, and Validation Route and Method." The manager provides table name and navigation name, sets data validation route to a tentative table or a whole table, selects a data validation method in the drop-down box, sets data access rule to private edit or public edit, and sets "edit table display scope" to "show editable records only" or "show all data." Data validation methods include manager validation, voting validation, and both methods. When the manager validation method is selected, the system allows the manager to validate newly entered data records. If the voting validation method or both the methods are selected, the page opens an input box right below the validation method box to prompt the manager to type in a numerical value. The number determines the number of votes, exclusive of the owner, is required to validate tentative records. The owner may also cast its vote. It is understood that the system can be adjusted to count owner as one vote or prevent the owner from casting a vote. If an inputted vote number is a reasonable integer smaller than the number of users on the project, the system accepts it and uses it for the data table. If the number is not good, the server prompts the manager to provide a new number. The private edit option allows the owner of a record to edit the record before it is validated. The public edit option allows users to edit all tentative records. In the new version of the embodiment, when the edit table display scope is set to "show editable records only", only tentative records are shown in the "Edit Table" page. When the second option "show all data" is used, validated records also appear on the page. Inclusion of the validated records allows the user to copy and paste validated records onto other records for modification.

More sophisticated access control may be implemented by limiting access to web pages. A field may be added to the Head table with a plurality of values, each denotes one access level. Some tables appear only under the accounts of the privileged users such as managers while others appear under the accounts of both privileged users and non-privileged users. The preferred embodiment has only two classes of users in addition to the administrator. As an improvement to the system, different access levels are established for different users. The roles are expanded to include several classes such as role-1, role-2, role-3, role-4, and role-5. The access levels of any data table may include level-1, level-2, level-3, level-4, and level-5, with the level-1 having the highest restriction and level-5 having the least restriction. Thus, a level-1 table can be accessed only by role-1 users, a table of level-3 can be accessed by the users of role-1, role-2, and role-3, and a table of level-5 can be access by all. Besides the multiple levels of access control, the data tables may also have an exclusion field in the Head table for exclusion of the users of any role class. For example, the role-3 value in the exclusion field of a data table means that role-3 users cannot access the table. Each time, when the system generates navigation buttons, it gets the user's role, and the value of the access field and the value of the exclusion field in the Head table to build proper navigation button.

Figure 5F:
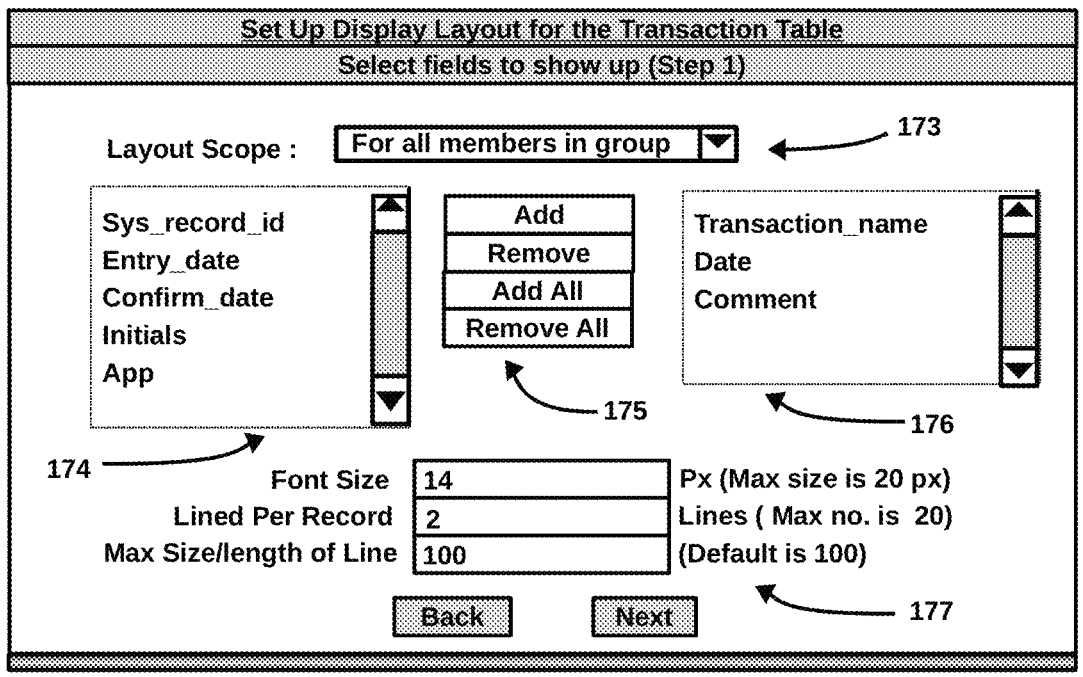
FIGS. 5F-5I show the steps for setting up a display layout, where fields, total line number, and maximum line length are provided (5F), selected fields are allocated to the lines (5G), space size is provided for each field and alignment is set for each line (5H), and the final display layout is shown (5I).
Figure 5G:
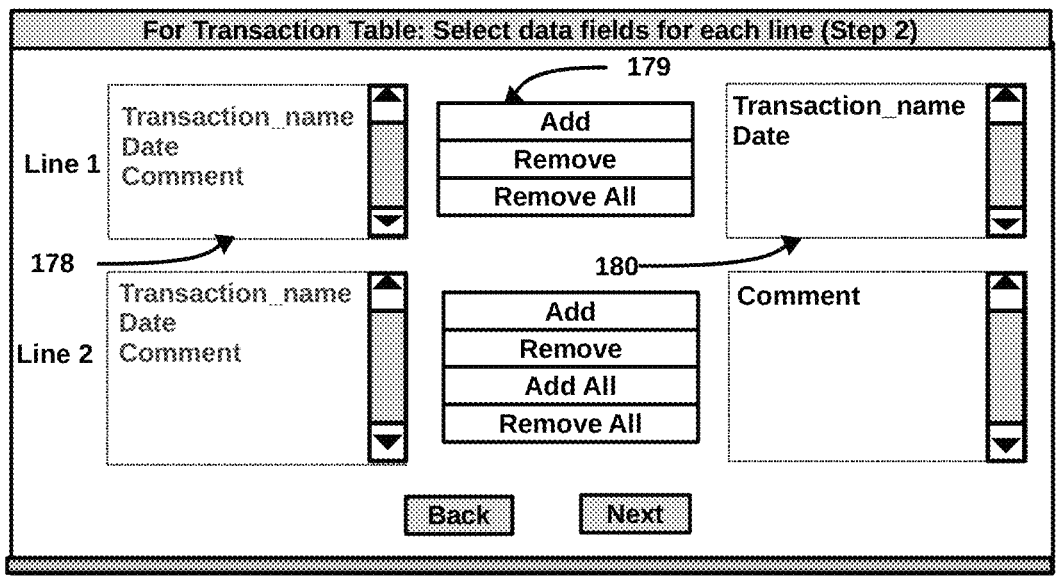
Figure 5H:
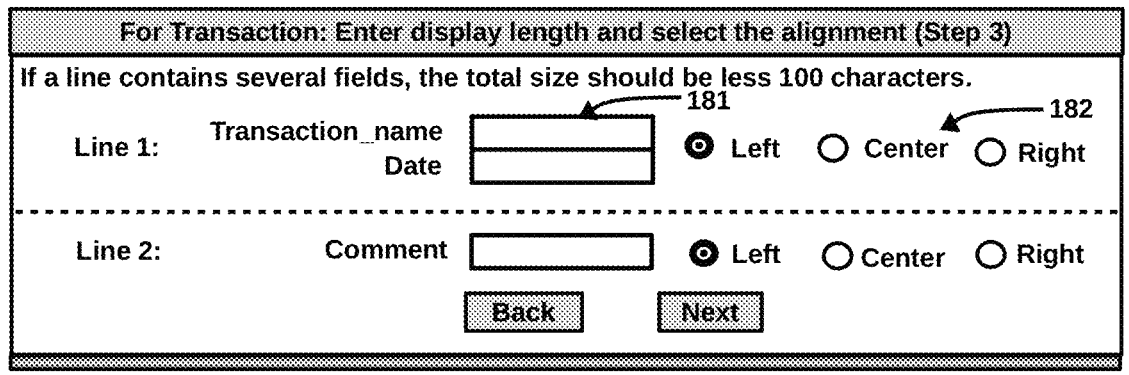
Figure 5I:
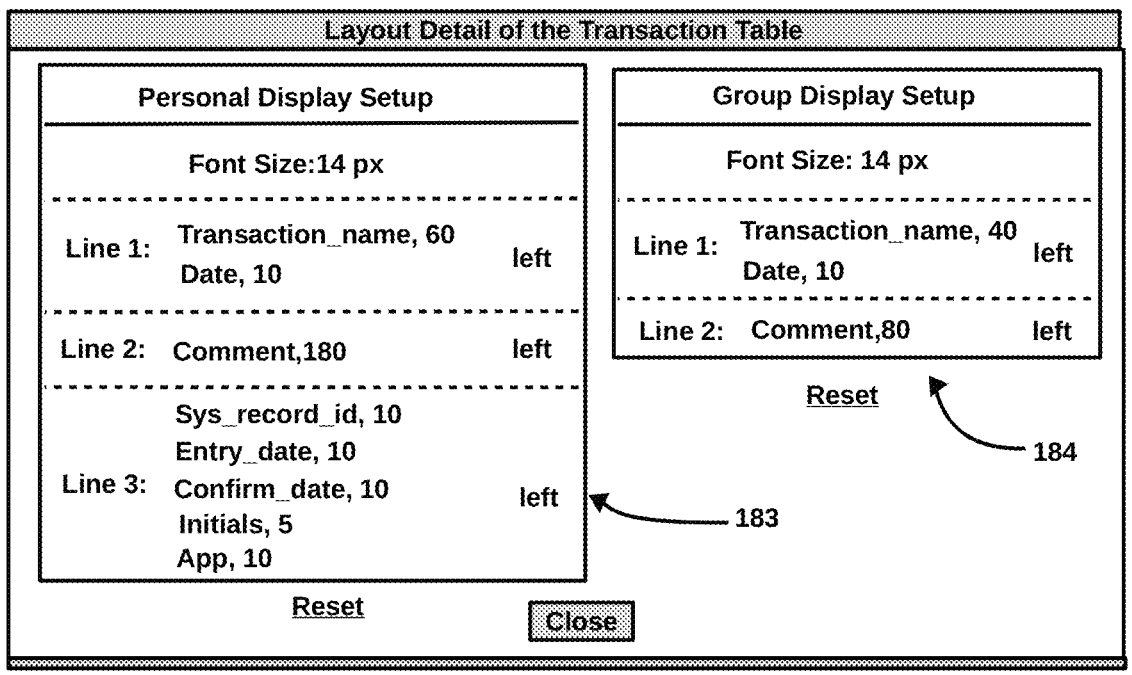

FIGS. 5F-5I show the web pages for creating a display layout for a data table. The user selects layout scope in the drop box 173. FIG. 5F shows all available fields 174 and the selected fields 176. A similar page may be opened from the "View" link at the topper menu (The user's page does not have the layout scope 173.) The user knows the maximum display length, the total fields, and the required size of each field, and may want to arrange the fields in a preferred order. Assuming that the maximum display length is 100-character, a comment field may need more than one line while an event name and date may need less than one full line. Other fields such as Initials, Entry_date, Confirm_date, and App may be placed in one line. For a Transaction table shown in FIG. 5G, the user selects available fields 174, and moves them to the allocated fields 176 by using the "Add" and "Remove" buttons 179 (same as 175 in FIG. 5F). The user types font size, lines per record, and maximum field length in the input boxes 177. After the page in FIG. 5F is submitted, the server generates a page for the step 2 (FIG. 5G). This page has 2 lines of input boxes and the user selected fields in all left boxes 178. The user then distributes all selected fields 178 among the right boxes 180 by using the "Add" and "Remove" buttons. Upon submission, the server generates the page for the step 3 (FIG. 5H). On this page, the user fills display field length for each of the fields in the input boxes 181 and selects alignment for each line at Block 182. When the page is submitted, the server creates a display layout and shows all display layouts for the table (FIG. 5I), which has a personal display layout 183 and a group display layout 184.

FIG. 5J shows the page for moving data between an active data table and a history data table, which is a different database table. This page has a search tool 185 and four archiving buttons 187 and column headers 186. By using the four buttons, the manager may move selected records, displayed records, found records (including records not displayed on the view table), and the whole database table to the archival table. The manager can move data back from the history table to the active table in the similar way on the Archive table.

FIGS. 5K and 5L show the pages for the manager to set up project instructions. The page in FIG. 5K has "Update" links 188 for the topics. The page opened from this link has an input box for title 189, a large input box 190 for accepting data, and a file path browser 191 (with an "Add more file path" link and a dynamically generated "Fewer file path" link) for uploading one or more files. The manager can provide text in the large box with or without attachments. Upon successful submission of the page, the topic is set up.

FIG. 5M shows the web page for uploading data from a delimited text file into the associated data table. This page shows the state right after the manager has selected a file path and uploaded the file containing data. This page contains current data fields 193 and corresponding input boxes on the left, available fields 195 on the right, and the "Clear" and "Add" buttons 194. It also contains two buttons "Sequential Placement" and "Field Name Match" in Block 192. When the user clicks "Sequence Match," script copies all right fields into the left input boxes according to their appearance sequence. If the manager presses on "Field Name Match," the browser copies the field names into the input boxes for the fields having the same names. The manager can select a right field and add it to an input box by clicking "Add" for the input box and delete a field name from any input box by clicking "Clear" for the input box. Upon submission, the server gets their field name relationship and imports data according to the field relationship.

To set up interactive search and data-feeding function for a data table, the manager clicks the "Setup" link 171 in FIG. 5C. The server opens a page with four options: (1) Simple data source, (2) Composite data sources, (3) Copy context, and (4) Delete data source. Upon clicking the first option "Simple data source," the server sends the page titled "Set up simple data source for Table: Privilege-Log, Data Field: comment." This page contains a large input box on the left, data tables and fields in a two-level tree (similar to the Table Names and Fields Structure 199 in FIG. 5N), and a submission button at the bottom. The manager can type in data pieces with proper delimiter in the left input box. Each of the table names on the right has a front check box and below each table name is a column of field names in a nested level, and each of the fields has a front check box. Therefore, the manager can select any of the tables by checking the first-level check boxes, and select any of the fields for the selected table by checking any of the nested-level check boxes, as data source for the destination field of a target data table. This function allows the manager to set up data source using static data pieces only, database fields only, and a combination of both static data and database fields. After the manager provides static data pieces in the large box, and selects table names and associated fields, the manager submits the page to the server for processing. The manager must consider field type, field storage size, and data compatibility. This function is unavailable for certain fields such as float and integer and small text fields. A data field can be a destination field or data source field, or both.

Figure 5N:
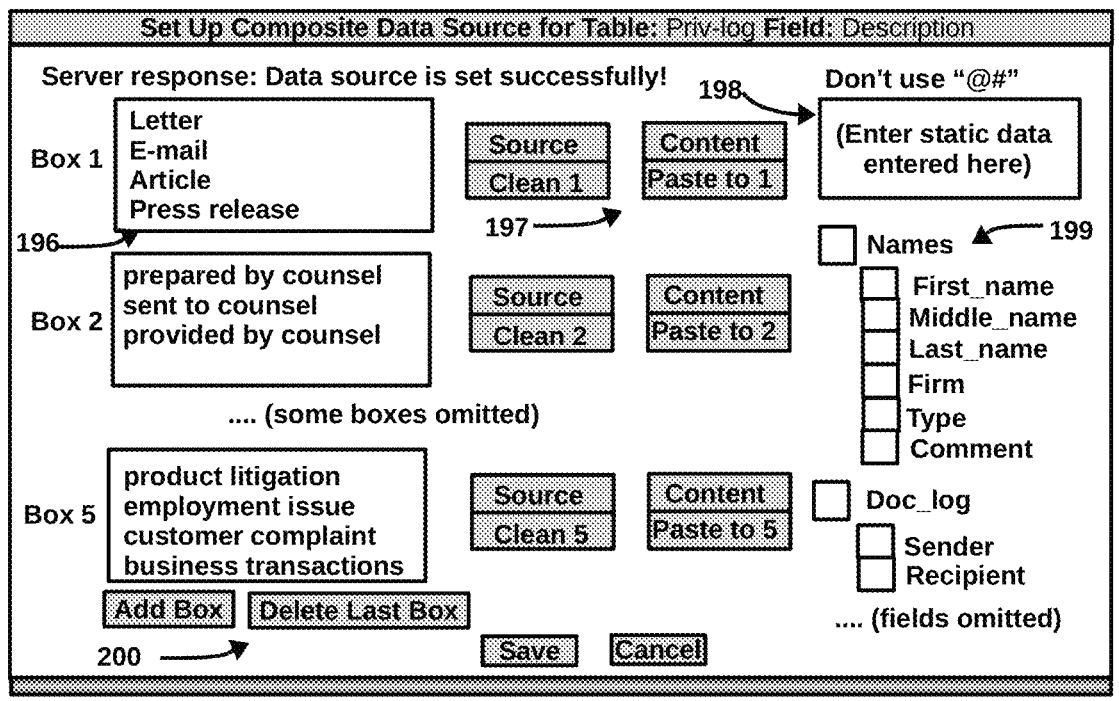
FIG. 5N shows a page for setting up an interactive search and data-feeding method for a destination data field, the description in the [attorney] names table, using static data sources and data fields.

FIG. 5N shows how to use "Composite data source" to set up a phrase construction function for any destination field. On this page, there is a large input box 196 on the left, field-allocating buttons 197, a large top input box 198, available data tables and their fields 199, box-adding and box-deleting buttons 200, and a submission button at the bottom. The manager determines the destination field, the number of component input boxes, construction method, and source method, which determines where data pieces are retrieved. The manager may provide data pieces as data source for one or more components. This page on FIG. 5N initially has only one left box. The manager can create an input box by clicking "Add Box" and delete an existing box by pressing "Delete Last Box." To create five components, the manager presses "Add Box" in Block 200 four times. Each of the blocks has "Source" and "Context" buttons 197. When the manager clicks "Context," the page shows up the fields of the same table on the right so that the manager can select any of the fields as data source. If the manager presses "Source," the page shows all data tables and associated fields on the right. The manager can check any tables and fields as data sources and type data pieces into the input box 198 with suitable delimiter such as ";". The manager can move the entered data pieces and selected table names and field names into the left box by pressing associated "Paste to N" (N being a box number), and can delete all data from any of the left boxes by using the corresponding "Clean N" button. After the manager has finished setup for one box, the manager repeats the same process for a second and third input box. After data sources are set for each of the component input boxes, the manager finally submits the page to the server, which saves the setting on the system.

The third option "Copy context" allows the user to copy data from one or more fields of the same table to the input box for a destination field. When this page is opened, it shows all field names of the same table in a column, a list of check boxes in a column, and a list of input boxes in a column. The field name, check box, and input box at the same column position are related. The user can select any of the fields by checking associated check boxes. If the user wants to copy data in a different order on the data entry form, the user just types in order numbers in the order input boxes. When the page is submitted, the server processes the page, retrieves the setup data, writes records in the setup table, and sends the same page with a success message at the top. The last option allows the user to delete the setup data for the destination field. Upon confirmation, the server just deletes the setup records for the destination field.

One of the links on FIG. 5A is for adding data records in the data tables. When this page is opened, it is similar to the user's page for adding data records shown in FIG. 7H. The "Refresh Table" button will cause the server to resend the parent page for displaying the same view table. FIG. 6A shows a validated table where the manager can find the voting data for a validated record. FIG. 6B shows that the manager can view the voting status of a data record in a tentative table. The info pane in FIG. 6B shows current vote number (pointed by numeral 206) and voting information 207, which includes user ID, initials, and voting date/time.

D. Common Functions and Features

The access right of each of the users is granted by the project manager as discussed above. In order to sign into the server, the user needs to use project code, log in name and password to log in. Upon signing in the server using a personal account for the first time, the user is prompted to change password and update account information. After the user provides required information such as email address, initials, first name and last name, the server creates a special data table for storing data for the user's server pad. The user's a top navigation bar under a user account includes the links: Email, View, Acct, Info, Tabs, and Logout. "View" is for calling the page for setting up a table display layout, "Acct" is for managing the user's account, and "Email" is for viewing and sending email. On this account page, there is a link "Change Password." The account data include email address, prefix, first name, middle initial, last name, title, company name, street address, city, state, zip code, country, and phone. Only email address, first name, last name and initial are required. All known account management components may be used. In changing password, the user provides old password and new password in duplicate and submits the page. Below the small topper menu is the status information of the user: today's date, project code, user first and last names. In the center is also the full name of the project such as "Corporate Litigation Site" or "My Discussion Group."

Right below the project name on all web tables is an input box for conducting global search (outside the drawing's scope). The global search tool is placed on all web tables for data tables, the server pad, and discussion board. When a search key is typed in this box and the page is submitted, the server searches through all configured tables, user's server pad table, and the discussion board, and retrieves all records matching the search key. A search result from a global search is shown in FIG. 7G, where the user can select first table in Block 212 and select a sorting key for the first table in Block 213. Each of the tables also contains a local search box (See FIG. 7B, 7F). Search is conducted within the scope of the searchable records and plural search keys are treated as alternatives.

FIG. 7A shows a tentative table containing two data records in names table, while FIG. 7B shows a whole table containing 1205 records in the names table. Those pages comprise a "Change layout" link 201, view selecting bar 202, functional buttons 203, and table search tool 204. The unique background color in the check box region 205 of record number 18 indicates that the user has voted. The user may enter the name into the names table by using the "Enter" button (FIGS. 7A, 7B). If data validation route for this table is a tentative table, each new record shows up in the tentative table. The tentative records in the names table are within the scope of global search, but their tentative statuses are indicated in red record numbers or any other marks in the search results. The initial in each record under a regular user account is not a link for viewing the information about the record owner.

FIG. 7C shows the page for the user to change the display layout for the view table. The user can change display layout by clicking "Change Layout" link 201 at left top in any of the web pages for data tables. In response, the server sends a dialog with three options 208. The user then selects manager layout, system layout, or personal layout for the data table. The broken line in FIG. 7C indicates that a display layout has not been set up.

Figures 7D, 7E:
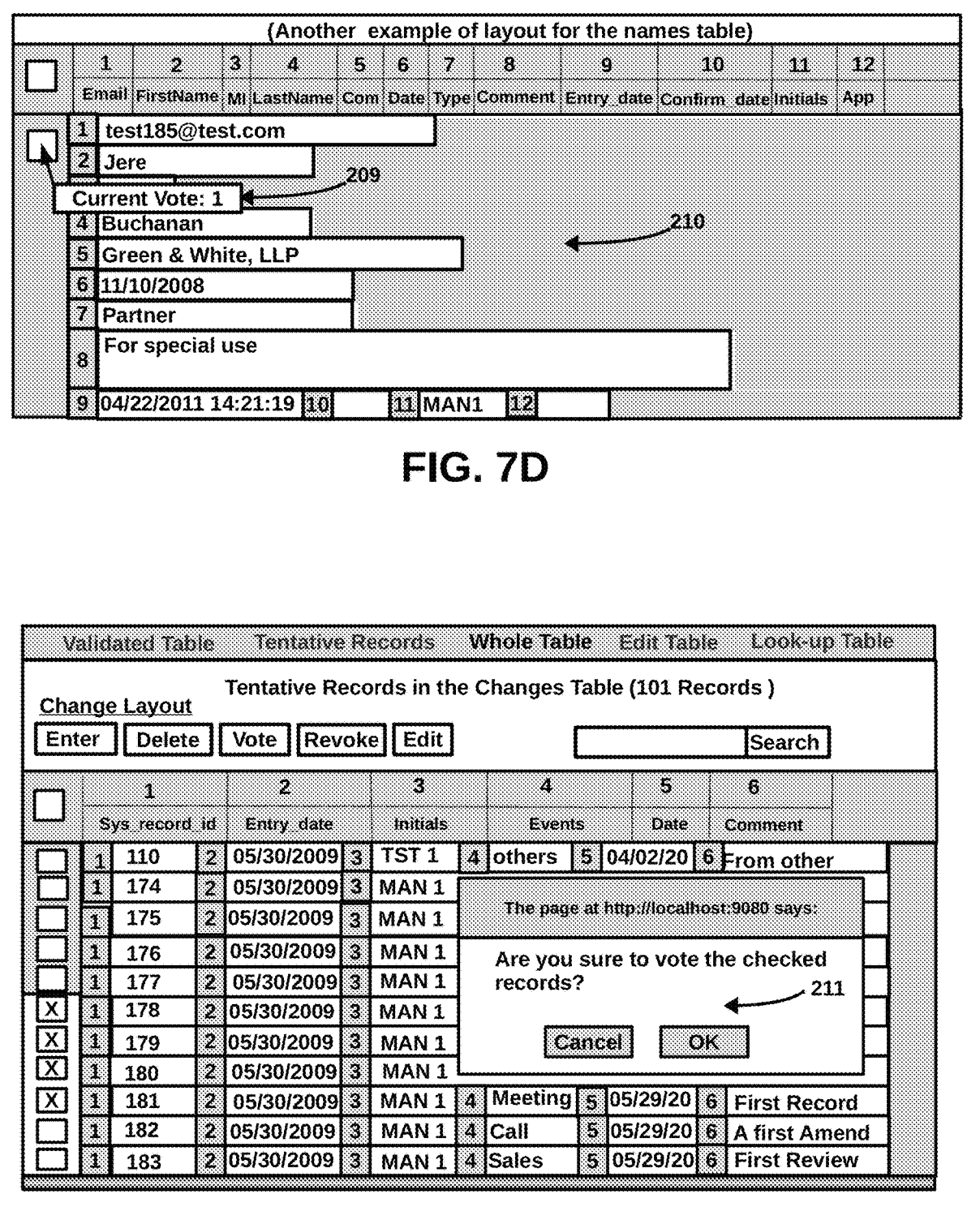

FIG. 7D shows a one-field-per-line display layout (210) created by the system for the names table. This display layout is available to any new data table upon its creation. In default display layout, system fields such as entry_date, confirm_date, initials, and app may be placed in one line on the web page. On this page, the user may get the vote number (indicated by Block 209) for the data record.

FIG. 7E shows the page of validating data for a data table by user votes on a whole table. A record is admitted to the validated table when a predetermined number of users have voted the record. The project manager can set and change this predetermined number. This page contains a search box on the top, a body of the table, and four buttons: Enter, Delete, Vote, Revoke and Edit. A checking box for selecting all records is placed on the column header at the far left top, and there is a check box in front of each of the records. To cast a vote for a record, the user selects a record by clicking the front check box and clicks the "Vote" button. The server takes and saves the vote upon user's confirmation (in Block 211). Upon successful vote, the record number or the background color of the check box changes its color from black to green. From the color or other notation, the user knows this is a record that the user has voted. The user can revoke his or her vote before this record is admitted as a validated record. Upon being revoked, the number color or background color becomes black again in web page. When the last vote is cast, the status of the record is changed. The record remains on the whole table, and appears on the validated table. The server informs the user that the record has been validated and moved into the validated table. If the user opens the validated table, the user can see that the newly validated record is marked with "VOTE" in the App field with proper date and time in the confirm_date field. If the manager opens a validated table, the manager can see all votes by clicking its record number or the area for the checking box (FIG. 6A). The identities of all voters can be ascertained from their initials. If the table is set up with tentative table, data validation can be done in the same way except that data validation is conducted on a tentative table. In this case, the record disappears from the tentative table upon validation.

If both voting validation method and manager validation method are used for the data table, one additional button, "Validate," is placed on the validation page under the manager's tentative table. The manager can vote a record or validate it directly. If the validation route is a whole table, the process of validating records by vote is substantially the same as on a tentative table except that all votes are cast on a whole table.

FIG. 7F shows three records found from searching "first" from the Changes table, the whole table, under the user's account. Page size control bar does not show up in any view tables unless the page has more than one page of data records.

FIG. 7G shows the search results from searching "tex" in the global search. Plural search keys separated by space are treated as alternative keys. Retrieved data records are arranged in the order of the tables. On the result page, the user can change the appearance order by selecting a table as the first table in drop-down box 212. In addition, the user can select a sorting key from the choices available for the selected table at the drop-down box 213. If the records from the discussion board are displayed first, the sorting key can be selected from ID, email, phone, issue, IP, post date, search key, and content.

FIG. 7H is a page for adding new records to a data table. All data entry page has a brief navigation bar 214, and a server response region 215. Any of the data fields may use a static data source or one or more table fields of one or more of data tables as data source on a data entry form. Assuming that the input box for the comment field has been setup with fixed data pieces: "excellent comment," "fair comment," and "bad comment." When the user places cursor to the input box for comment and types, the server retrieves those data pieces, sends those data pieces to the client computer, and displays them in a selection box. If the user moves the cursor to select one data piece in the selection box, this data piece is copied into the input box for the comment. If the data source contains a large number of records, the server has the ability to progressively narrow down data pieces for selection (similar to the feature in the server pad in FIG. 7L). The primary field (i. g., Events) may be set up with itself as a data source so that the user can look out to avoid entering a duplicate record.

By using the "Setup" link 171 in FIG. 5C, the manager may use the event field of the Notes table as the data source for the event field of the Transaction table. In one embodiment, when the user types in the input box for the event field of the Transaction table, the keystroke causes an embedded script to call a server's search program with the key, table names, and field names as parameters. The server program searches the event field of the Notes table, retrieves matched data pieces, sends them to the client computer, and displays them in the selection box for the user to select. The user can select any of the displayed data pieces as the input data. If no data is found, the user can type in a suitable data. The project manager can change the data source for any destination field anytime. The selection box has the page forward and backward buttons, which show up when the total number of suggested data pieces is large.

FIG. 7I shows the page for editing records for a data table. This page allows the user to edit a plurality of records. The display text area 216 contains a list of records to be edited. After a record has been edited and the form is submitted, the system presents next record for edit, with a server confirmation message at the top of the page (not shown in FIG. 7I, but it is similar to the server message in FIG. 7H) while one fewer record numbers remain in the input box for edit. The process is repeated until all records are edited.

Figure 7J:
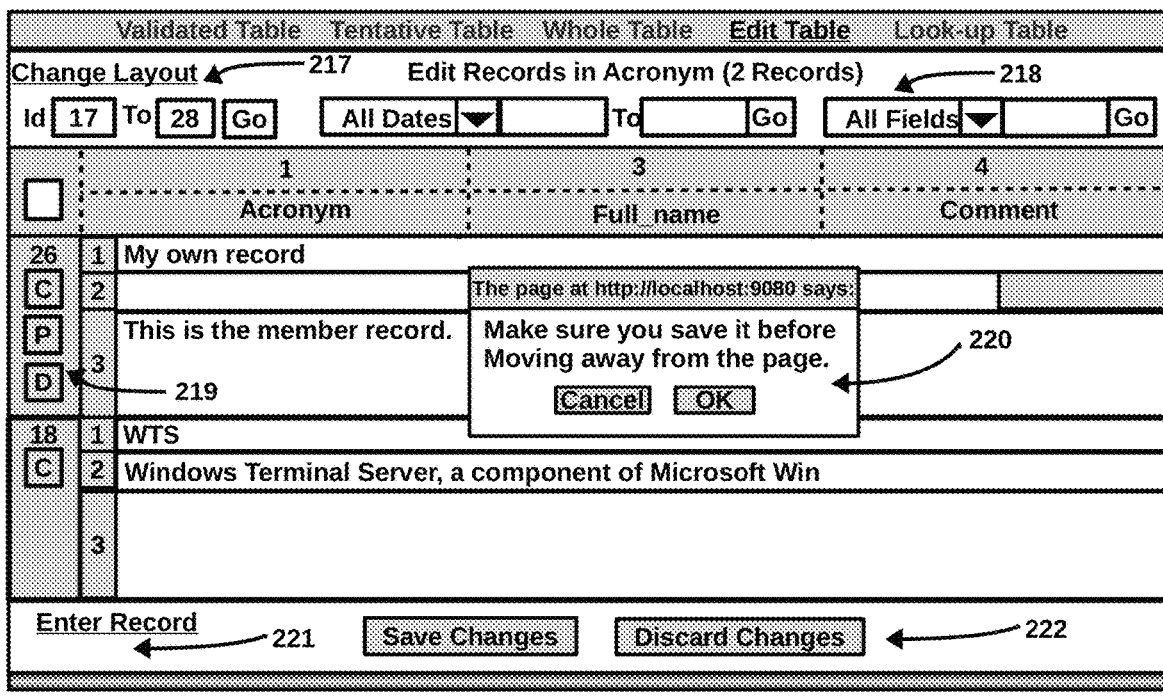
FIG. 7J shows an "Edit Table" page for the Acronym table, where 2 records have been retrieved from searching record IDs from 17 to 28, and a message prompts the user to save changes before moving away from the page.

FIG. 7J shows an "Edit Table" page for editing a plurality of tentative data records in a view table. The user opens this page by clicking "Edit Table" under the view-selecting bar. This page has a "Change Layout" link 217, embedded search tools 218, small operational menus 219 for each of the editable data records, an "Enter Record" link 221, and "Save Changes" and "Discard Changes" 222. The small operational menus 219 comprise Copy, Paste and Delete, responsively, indicated by C, P, and D. This page allows the user to delete any editable records, create new records, copy data from an existing record to an editable record or newly created record, and save all changes in the data table on the server. If the table is set up with public edit, the user can edit and delete any tentative records. If the table is set up with private edit, the user can edit and delete the user's own tentative records.

Each of the data records may have plural data fields or columns, depending upon the table's display layout. Each of the data is shown in one editable input box. If a record in the table has five fields, it has five editable boxes, and the user can edit all of them. Each of the small operational menus is implemented with infotip feature. If the mouse is moved over the C icon, the browse shows "Copy" below the mouse's arrow. The page also has a page size control bar, which shows up only if found records are more than the maximum record number per page. Each of the column names is also a link for sorting the table using the field as a sorting key. When data access rule is set up with private edit, the user can edit or delete only the user's own tentative records. To delete a record, the user just clicks the Delete icon on the left of the record, and the record will be deleted from the web page, but has not been deleted from the database table. To enter data at the end of the table, the user first creates a block of input boxes at the end of the table by clicking the "Enter Record" link. The user can type data into the boxes and save the record by pressing on the "Save Changes" button. If the user wants to copy data from an existing record to this empty record, the user just clicks the copy icon on the left side of the existing record, and pastes the data onto the empty record by clicking the paste icon associated with the empty record. Of course, data can be copied from any existing record and pasted onto any exiting record of his own. Selecting individual fields is not necessary. The user can copy data from one field to another field on web page by using the system's copy and paste tool.

To make permanent changes to the database table, the user clicks the "Save Changes" button. All changes are saved. If the user does not want to save the changes, the user can click the "Save Changes" button. Use of the search function would cause the server to retrieve the data records, reconstruct a web page, and thus discard the changes. Conspicuous instructions are placed on the web page to warn the user that navigating pages, conducting a search, and sorting data records would cause the server to discard all changes made on the web page. An embedded script throws a warning message 220 whenever the manager tries to do anything that causes the server to discard the changes.

The tentative records that the user is not authorized to edit are shown as inactive records. The user can view and copy inactive tentative records, and paste them onto new records. When edit_table_display_scope is set to "1", validated records appear in the Edit Table page. They can be viewed, and copied for paste and modification. While data access rule determines what records can be edited, search function and page size control bar allows the users to limit the number of data records displayed on the web page.

Figure 7K:
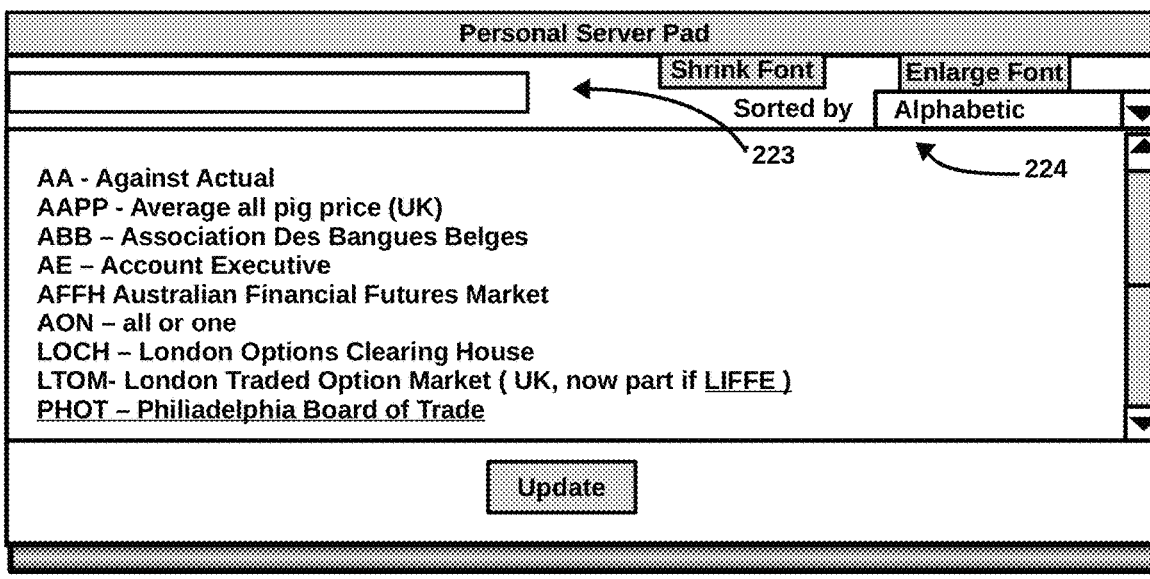
FIG. 7K shows a Personal Server Pad where data pieces are shown in an alphabetic order in input box.
Figures 7L, 7M:
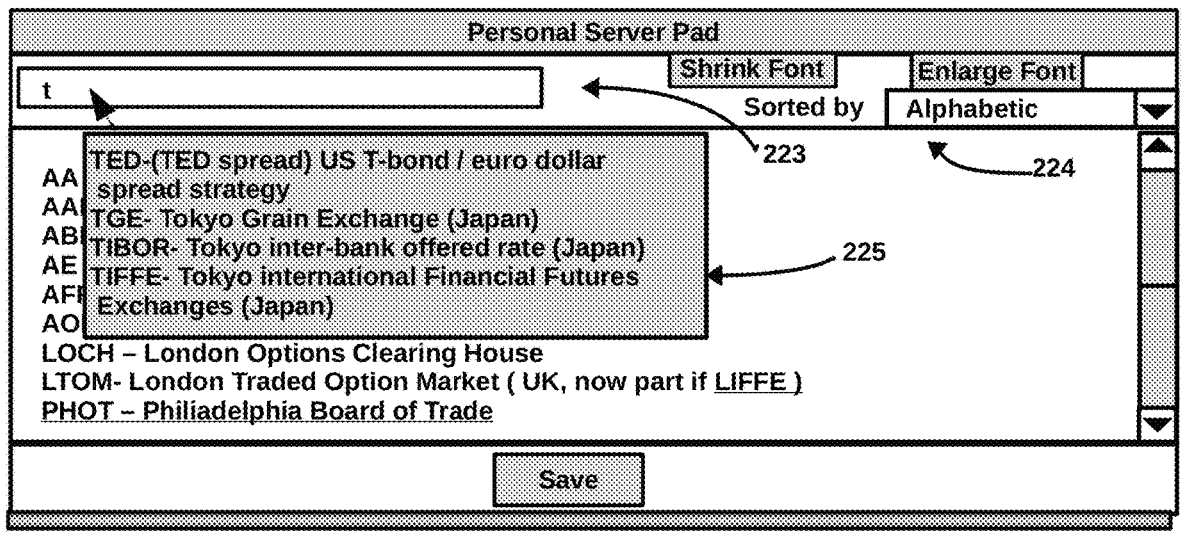
FIG. 7L shows a Personal Server Pad where the server has sent a list of data pieces in response to the key that the user has typed.
FIG. 7M shows a data entry page where a phrase is constructed by using four component input boxes, and the server provides a list of suggested names in response to the user's keystroke in the third component input box.

FIGS. 7K-7L show a personal server pad, which contains a conventional search (outside the drawing scope), interactive search tool 223, drop-down box 224 for changing sorting key, a text body, and submission button. The server pad allows a user to enter data in the body and find information by conventional, interactive and global searches. When a use types in box 223, the server generates a selection pane 225 showing found data pieces. Each of the server pads uses an individual database table or a common table without sharing data. By using global search, each user can find data pieces from the user own server pad but not from others pad tables. As a notepad, the data must be inputted in a continuous window. The data are entered in the window by suitable delimiter and saved in data records in a database table. The default delimiter may be carriage return. When data are saved on the server, each of the data pieces is stored as one record in the table. This can be done because data format is unimportant for the use purpose. There are several ways to sort the data. Whenever a user clicks the drop-down box 224 to select a sorting method from the possible lists: data entry order, reverse data entry order, alphabetic order, and reverse alphabetic order, it calls a JavaScript to call a server program to retrieve the data pieces again, sort them according to the selected sorting method, and send the data again. This could throw away all unsaved changes on the pad. Therefore, the pad throws a message to ask the user to save changes before proceeding with sorting.

A powerful server pad may be created using "Edit Table" (FIG. 7J) and a private data table. By designing its table structure, the user can create a calendar-like server pad. The server pad has a powerful search tool, interactive search tool, global edit capabilities, copy, paste and deletion menu, and the capability for adding new records.

FIG. 7M shows how phrase construction function intertwined with interactive search and data-feeding function. On the data entry form, a long data input box 226 (also "construction box") is disabled and replaced below by a plurality of component input boxes 227. Each of the component boxes may be set up with an interactive search and data-feeding feature. On the page, the component input boxes 227 have four boxes indicated by A, B, C, and D. When the user types in a key in the first component box, the server retrieves data pieces for the first component, sends them to the client for display in the selection box 228. Upon user's selection of a data piece in the selection box, an embedded script copies the selected data piece into the first component box and appends it with a space to the phrase in formation in the construction box. The user repeats this process until all of the component boxes are filled. Upon submission of the filled data entry form, the server gets the phrase and saves it in the destination field.

The data used in a first input box may also appear as a component data for a second input box. The second input box for constructing the phrase and all component boxes for accepting component data should be placed after the first input box so that the second input box is able to use by the data from the first input box.

The user can view project instructions by using a page similar to FIG. 5K. The user can view any of the topics by clicking its topic, and can download any attachment to the client computer by clicking its name. When a topic is opened, it has title, a text body, and one or more attachments. If a user clicks any topic, which has not been set up, a pop-window informs the user that it has not been set up for use.

FIGS. 7N-7Q show the discussion board for users. The discussion board has two views: open view and conventional view. In the conventional view on FIG. 7N, each of the messages is docketed with subject, date and owner's name, and each of the subjects is a link for opening the message. It has links 228 for submitting messages and searching messages. When the discussion board is in the open view, everything about the messages is displayed on the page: subject in the first line, the author information on the second line, the body of the message and attachments at the end. Attachments are shown as links just below the message body on the right. Each of the attachments can be downloaded for view by clicking its name. An opened message under message details is shown in FIG. 7O. Four links (229) "Back," "Submit Message," "Related message," and "Search Message" are placed at the bottom. The user can use those clicks to submit a message, find related messages, and conduct a search. FIG. 7P shows a "Search Message" page, which offers two search methods. The simple search method at the top allows the user to find all messages containing the search key. The second method allows the user to set criteria for conducting a search. The first criterion is message's subject. Leaving this input box blank will cause the server to ignore this criterion and to include all possible subjects. Providing keys in this box narrows down the number of possible hits. Search range can be further narrowed down by date. The user may use any date or specify a specific date range. In addition, the search page contains a link "More Search Key" 230. This link allows user to create more boxes for entering search keys. By clicking this key once, one more search-key box is generated, which is followed by a button "Fewer search key" for deleting it. Search keys entered on the web page are matched with only the search keys in the database. Leaving the search-key box blank causes the server to ignore the search keys in database. Records are found and returned when they meet all of the criteria specified on the search page.

FIG. 7Q shows the page for submitting a message to the discussion board. This page contains data input fields that are shown in the figure. The search keys provided by the user are not to be shown on the discussion board, but stored in the database table as search keys. Below the large input box, there is a link "Add more file path" 232. A clicking of this link once causes the browser to create a file path box with a browse button and two links: a link "Remove file path" next to the created file path box and a link "Add more file path" below the file path box. The file path is for finding a file. The user can remove this file-path box by clicking "Remove file path" or create more file paths by clicking "Add more file path." Therefore, the user can upload as many attachments as necessary and practical. After the user fills in the data in all required fields, the user submits the page. Upon confirmation by using a pop-up window 231, the message is sent to the server and written in the data table.

Any of common models of discussion boards in public use can be adapted to include the table within the scope of the global search. For native attachments, a plurality of search keys may be stored in a special field so that global search will search the keys in this field. For database application that is able to search native files stored in a database field, a search should be conducted against the native files.

The system allows the users, managers and administrators to send internal email. This email component is intended for private communication among project users, managers and administrators. Any other email systems such as company internal email system, web mail system, or commercial email may be used to replace this email component. The email system should contain all functions such as search, sorting, deletion, and archival features. One preferred feature is that the system can display all project users, managers and administrators as potential recipients on the page for composing email.

E. Code Implementation and Program Structures

The system uses three types of database tables: configurable data tables for storing project data, fixed database tables for storing discussion dialog, email, and project instructions, and special database tables used by the system. All substance disclosed in U.S. patent application Ser. No. 12/420,817, filed Apr. 8, 2009, and U.S. Patent Application No. 61/506,149, filed on Jul. 10, 2011, is incorporated in the entirety by reference.

1. Creating a Working Environment for a Project or Work Group

The process of creating a working environment for a group includes creating project-creation form, entering essential data in the form, sending the form to the server, getting the data from the submitted form, deleting existing data from static tables such as email and discussion board, creating a group ID or identity, and writing data in the groups table. The groups table has the structure ('group_id' int(11) not null auto_increment, 'group_code' varchar(10), 'group_name' varchar(50), 'login_method' enum('g','p', 'a'), 'allow_admin_access' enum('y','n') default 'y', 'board_status' enum('t','f') default 't', 'reg_date' timestamp not null default current_timestamp, 'logindate' timestamp not null default '0000-00-00 00:00:00', 'pad_record_size' int(11) not null default '500', 'max_suggestion_num' tinyint (4) not null default '100', primary key ('group_id')). Two sample records are (1,'gp1','project green forest','a','n','t', '2009-03-03 13:44:52','0000-00-00 00:00:00', 500,100, null, null, null), (2,'gp2','project oak','a','y','t','2009-04-15 01:09:32','0000-00-00 00:00:00', 500,100, null, null, null). The board_status value determines global default data validation route: "T" denotes tentative table and "F" denotes whole table.

At the setup stage, most of the options for the project can be blank. If a project name has already been used, the server asks the user to use a different name. To fill the values for options, the user opens the "Setup Project" page (Similar to what is shown in FIG. 4B) to fill data for the options such as project name, log in name, group log in name and password, global validation method, and global validation route. The features of the project management may be expanded to allow a project manager to manage more than one project. In this implementation, when the manager logs in the server, the server shows a list of active projects and each project is a click for opening it. After a project is opened, all functions should be the same. The records in Head, display, suggest_source, and records_circumstance must have a unique value for each project or group.

2. Method of Tracking Data Tables in the Database and the Navigation System

For the system to be useful for managing massive of unknown information, it allows for change of data table configuration during application cycle. This feature not only poses the risk of destroying data tables from human errors and other unforeseen risks, but also adds numerous complications to the presentment of data records on web pages. Therefore, the present invention uses a unique and reliable method to track database tables for the database and the navigation system. All configurable data tables are tracked by using a unique system table or one or more system files. The tracking table or the file contains the following information: (1) project group identity, (2) the data table names so that the system can use the names for identification purpose, (3) navigation names for constructing part of the navigation system, (4) the structures of data tables if the data tables tracked in a file, (5) the relationship among navigation names, the table names, and the table structures of data tables, and (6) optionally, the features such as validation method, validation route, data access scope, and data display scope for the Edit Table function. In addition, the system must ensure that each of the data table names is unique.

The tracking scheme may be implemented in one or more files, one or more database tables, and various files and tables combinations. The scheme is capable of being updated instantly and the manager can change the information in real time within a project life cycle and between project life cycles. The preferred scheme is that navigation names, table names and table structures are stored in one single database table or a single file because it shows their obvious relationships. Any scheme to meet the criteria is within the scope of the present invention.

The preferred embodiment uses a special database head (board_id int auto_increment primary key, group_id int, navigation varchar(15), board_name varchar(20), board_status enum('t','f') default 't', has_records enum('y','n') default 'n', validation_method enum('0','1','2') default '0', votes int, access_rule enum('0','1') default '0' create_date timestamp not null default current_timestamp, edit_table_display_scope enum('0','1') default '0', has_history_table enum('y','n') default 'n'). Board_status denotes record validation route for the associated table: t=tentative table and f=whole table; validation_method is for validation method: 0=manager validation, 1=voting validation, and 2=both; vote is the number of vote required to validate a record by voting method; "Access_rule" ("data access scope") defines data access scope: 0=private edit and 1=public edit; has_records indicates if the data table has data: N=no data, and Y=have data; edit_table_display_scope determines whether the permanent records are displayed in Edit Table: 0=No and 1=Yes; and has_history_table indicates if a data table has a history table: Y=Yes and N=No. Board_name stores common table names ("board" means table), which are not the table names used in the database application. The table names in the database (i.e., t1, t2 . . . tn or t_h1, t_h2 . . . t_hn) are formed by adding a prefix "t" or "h_t" to table Ids. This ensures that table names in the database are unique and the relationship between unique table names in the Head table and the table names in the database can be maintained.

An alternative table-tracking scheme, that meets the above requirements, comprises statements "Ownership", "Tablename1; Tablename2; . . . TablenameN", "Navigation1; Navigation2; . . . NavigationN;" "table-structure1; table-structure2; . . . table-structureN" and "feature1; feature2; . . . featureN." Tablename, navigation, table-structure, and feature are for the same data table if they contain an identical affixed index number. Those statements may be in one or more files, in one or more tables, or even in file and table combinations. A file may also be in binary, text or any suitable format as long as the system can read, write, delete, and change any entries and anything within an entry. Table names may serve the role of the table ID if their names are unique. Table structure can be omitted because the database can return the field names and types for all tables.

Another table-tracking scheme is "Ownership", "navigation1; tablename1; strucutre1; feature1" "navigation2; tablename2; strucutre2; feature2" . . . and "navigationN; tablenameN; structureN; featureN." Those statements may be stored in one or more files, in one or more tables, or in various file and table combinations. In this scheme, the affixed index may be omitted because their relationship can be established by their appearance order and their index number can be established by their positions. The scheme may be reduced to "tablename1; table-structure1; feature1"; "tablename2; table-structures2; feature2"; . . . and "tablenameN; table-structureN; featureN." The system uses a string affixed with a unique index number as navigation name. Another simplified scheme is "navigation1; structure1; feature1" "navigation2; stucrture2; feature2." . . . "navigationN; structureN; featureN." The system can use a string affixed with a unique index number as table name. Table structures can also be omitted because this information can be read by the database application.

When the database application malfunctions, the system is unable to provide the information for constructing the navigation structures. Several methods can be used to remedy this problem. One of the methods is that a program is designed in such a way that it creates the navigation structures when it is unable to get navigation names from the database. For example, the program adds default navigation buttons like Table1, Table2, . . . , TableN. This will preserve the web page's look in the event of database failure. Another method is to create a file in text or JSP format, which is generated by using the most current data from the tracking table or files. The file contains navigation information. When this method is used, the program uses the text file or the JSP file to construct navigation buttons directly. It does not read the navigation names from the tracking table each time the system sends a page containing the navigation buttons. When this method is used, this file must be updated each time when the tracking table or file is changed, modified or updated.

Still another method is omitting navigation names and table names in the tracking table or file, but placing them in a second file. In this case, the relationship between the navigation names, data table names, and data table structures in the tracking table are determined by their entry order or special marks in both the tracking table or file and the second file. The server reads the navigation names from the second file each time the system needs navigation information or needs access data tables. The system needs to update navigation names and table names in the second file when a data table is dropped or a new table is created and when a navigation name or table name is changed. Many tools such as configuration tool, the setup project tool, the "Setup Tables" tool, and the import and export tools, and system utilities should be modified to support those methods. The table names or navigation names may be omitted from the tracking file or table. This scheme works in a way similar to the above method except that navigation names are derived from table names or vise versa. It is even possible to omit both table names and navigation names. In this case, the system uses a string affixed by an incremental index as navigation names and uses another string affixed by an incremental index as table names. While this scheme can avoid system total failure in the event of failure of database application, it is useful only for a system containing limited database tables.

When database tables are configurable within a project life cycle, the server must be able to construct navigation button for newly created data tables and the navigation buttons must be fully functional in all aspects. To generate navigation buttons for the data tables, the server uses class Navigation and JSP code in creating navigation buttons. The JSP page contains the following server code:

```
<jsp:useBean id="blm" class="dforum.Navigation" />
<% ArrayList boardlist=new ArrayList( );
try{
    blm.allNavigations((String)session.getAttribute("group_id"));
    boardlist=blm.getNavigationList( );
}catch(Exception e) { [the code for handling exception]}%>
```

The above code declares an array list for storing table navigation names. It specifies a navigation class, and then calls the allNavigations( ) method by passing the manager role to get values for the list. The JSP page also contains the following code for creating navigation buttons:

```
<div id="nav"><ul>
<%for(int i=0;i<boardlist.size( );i++){ String[ ] str=
(String[ ])boardlist.get(i);%>
<li><a href="<%=request.getContextPath( )
%>/jsp/member/permanentBoard.jsp?boardid=<%=str[0] %>&
scratchindex=<%=i %>"><span id="curl_<%=i %>"><%=
str[1] %></span></a></li><%}%></ul></div>
```

The web code calls permanentBoard.jsp. However, if it is desirable to inherent a prior view table such as tentative, permanent or whole table, the program name should be implemented as a variable which may hold LoggingBoard.jsp, combinedBoard.jsp or PermenantBoard.jsp, depending on a prior view. The navigation class, dforum.Navigation, returns a list of navigation names. This Java program fills ht[0] with board_ids and ht[1] with navigation name of the data tables. When the JSP page calls getNavigationList( ) in a loop, this method returns an array element for each of the data tables. The table IDs and navigation names are stored in str[0] and str[1], respectfully. When the web page is created, str[0] is replaced by table ID and stall is replaced by navigation name.

While the preferred embodiment allows the user to use any navigation names, navigation names can be omitted. In this case, the navigation name can be derived from table names, from any string affixed with a string, a number, or combination. Navigation buttons are common components in the art, and accordingly, all forms, variations, and looks known in the art can be used an alternative to the preferred embodiment.

All data tables can be dropped and recreated by uploading a configuration file and executing its instructions in the file. This configuration file should be tested in advance before it is used on site. It contains (1) table number, (2) table structure definitions, and (3) optional navigation names, and (4) optional table names. This configuration file is preferably in text format although it may be in any other suitable formats (additional tool may be used to create a file which cannot be read by humans). The purpose is for the program to create data tables in the system instantly anytime within a project life cycle. The data structure for any of the data tables may be:

"Table_Id; navigation_name; table_name; table_structure; feature" A plurality of entries may be used. The statements may be: "Table_Id; table_name; table_structure; feature)", "Table_Id; navigation_name; table_structure; feature", "Table_Id; group_Id; navigation_name; table_name; table_structure; feature." Other scheme for a configuration file is "navigation_1; navigation_2; . . . navigation_N;" "table_name_1; table_name_2; . . . table_name_N" "table_structure_1; table_structure_2; . . . table_structure_N", and optional "feature_1; feature_2; . . . feature_N." This scheme may be simplified by omitting the statement for table names and table names are created using a string such as "table" affixed with a unique index so they look like Table1, Table2, . . . and TableN. The same scheme may be simplified by omitting navigation names. In this case, navigation names are created using a string such as "Table" or "Board" or a user-provided string affixed with an index number.

Group ID is optional because the file belongs to the group for which the manager uploads the file. Table_id is useful but can be omitted by using its appearance order. Table ID or indexed table names (i.e., t1, t2 . . . tn) may be used so that the configuration file supports the common methods of properties class. If a feature is not defined, the system uses the default values and the manager can set up the features later. The table structures may be defined by "field_1 varchar (50), field_2 varchar(20), Date date, Type tinyint" or, in lay language, "field_1 text 50, field_2 file 50000, finish-date date, count int, amount float." The scheme may be in any form, but it is translated into a SQL statement for creating a table. One example configuration file contains the following statements:

Sample format: t(0,1,2 . . . n)=navigation; table_name; table structure
  t0=Change; Change; Events varchar(30),Date date,Comment varchar(300)
  t1=Transaction; Transaction; Transaction_name varchar(100),Date date,Comment varchar(1000)
  t2=Attorneys; Attorney-Name; Email varchar(50),Firstname varchar(20),MI varchar(20),Lastname varchar(20),Company varchar(100),Date date,Type tinyint, Comment varchar(500)
  t3=Acronym; Acronym; Acronym varchar(20),Full_name varchar(200),Comment varchar(500)

The instructions for each table follows the format: t(0,1, 2 . . . n)=navigation_name; table_name; table structure (statements defining table structures). This configuration file contains instructions for creating four tables (Change, Transaction, Attorney-name and Acronym). The instruction for one table is in one line, or terminated with a unique character or a combination of characters so the program that processes it can split up them accordingly. The instructions defining table structures are similar to SQL statements. The table name and navigation name for one table may be the same. This configuration fully supports the common methods of the properties class.

The configuration file may contain display layout definitions for the group and all users of the group. After the table structures of all data tables in a configuration file have been created and loaded on the server, the user can create display layouts for the created data tables by using the interactive method. The display layouts may also be created by using the rules and are then tested. The data records defining the display layouts are dumped or exported from the setup table. The setup data records in SQL format or transformed human friendly format are then appended to the same configuration file. The server program for resetting configuration is modified so that it can detect display layout definitions, read them, and write them in the display table for the group and all users. The configuration function will reset both the table configuration and the related display layouts in one single operation.

3. Changing Table Configuration and Work Environment for the Group

On the "Reset Configuration" page (FIG. 4H) is for changing data table number and table structures of data tables (collectively "table configuration"). The function can change the working environment for the group in a limited scope because it affects all settings related to data tables. Available options are designated by name="configuration method." Its values comprise value="option 1" (Restore all project settings to system's default and delete all data), value="option 2" (Delete data from selected tables), value="option 3" (Reset selected tables by a configuration file), and value="option 4" (Reset all tables by your own configuration file). When the user selects one of the configuration options and submits the page, the client sends the form with a configuration file by a multi-part form. If the user selects option 1, it calls the system to use the default configuration stored on the server to create a default environment for the group. If the user selects option 2, it deletes all data from all storage tables for the group. If the user selects the option 3, the user is prompted to check existing data tables for reset and provides a configuration file, and the system resets those selected tables. If the user selects the option 4, the server uploads the user configurable file and rewrites all data tables for the group.

The general steps for resetting the default configuration under option 1 is as follows:

(1). Check for the existence the path and validity of the default configuration file. If no such file can be found, the server responds with an error message.

(2). Upon finding the configuration file, the system reads the file into buffer, extracts data, and stores the data in proper variables. The information includes table names, navigation names, and table structures of a plurality of data tables.

(3). Read the Head table to get the names of all data tables for the project group by using the statement: "select board_id from Head where group_id='groupID'" and find the tables id (also known as board id). Thus, the program gets the table ids of all data tables owned by the project group.

If the system is designed to host only one project group, it may go ahead to delete all data tables such as t0, t1, t2, . . . , tn.

(4). Delete all data tables owned by the group from the database. It is preferable to use "drop table if exist" statement to avoid error in the event of a data table does not exist in the database.

(5). Insert all records for the group into the Head table. Since the table id is an auto-increment integer, the server knows the last inserted table id.

(6). Create all data tables according to the table structures from the configuration file.

(7). Delete the records for the group from the display table and related tables.

(8). Delete records for the group from other related tables such as suggest_source, records_circumstance, and users etc.

(9). Delete all data from other non-configurable tables such as the discussion table and email table. A sample statement is "delete from discussion where group_id='groupID'".

If the setup operation is limited to only certain data tables, the option will be limited to those records relating to the affected data tables. For example, if the structure of any data table is changed or modified, the server deletes the records for the display layout for the affected tables from the display table. The scope of deletion in all related tables such as suggest_source and records_circumstance is limited to those records relating to the affected data tables.

The class program, DefaultSys( ), may be called with connection handler, group ID and file path. It first makes connection to the database by calling dbhandler.setAutoCommit( ), it then calls dropBoard( ). In this step, it first accesses the Head table to gets all table IDs from the table. The program goes through a loop for all table ids, uses table Ids to drop configurable data tables, and drops the history tables ht_id if a table is configurable data table (named as "tx"). It then deletes the records for the group from the Head table. It then calls cleanBaseTable( ) to delete data from the discussion table, the email table, and all non-configurable data tables. Finally, it creates the new data tables by calling restore( ). The server loads the default configuration file and extracts table structures to be stored in a proper variable. The server then goes though the loop for all tab records. If there is no tab entry, program breaks. For a configurable data table, the server gets the maximum table ID from the database, constructs a proper insert statement using the structure from the configuration file, and inserts the record into the Head table. It then creates a data table for the entry until it goes through the loop. In creating a table, it may use the max table Id or the last inserted table Id. After the system is restored, it sets AutoCommit as true. The default conf. properties may contain the statement: sysField= Sys_record_id bigint unsigned auto_increment primary key, Sys_usr_id_int, Sys_status_enum ('0','1','2') default '2',Entry_date timestamp not null default current_timestamp, confirm_date timestamp, IP varchar(15), Initials varchar(5), and App varchar(6). By using this statement, those system fields are added to the table structure of each of the data tables and they are also used by the system for other purposes. System fields can be directly written in program, declared as the values of static final variables, or stored in any file as long as the server can get them in creating data tables and history tables.

The operation of those steps is subject to certain constraints. One constraint is the fact that certain data must be obtained for a late step of execution and other consideration is the minimizing the potential impact on the system in the event that a configuration attempt fails. For example, the manager's intention of selecting an option must be ascertained before any of the steps; it is necessary to read the Head table to get the table IDs of the data tables for the project group before the data tables can be deleted; dropping data tables can be executed anywhere after those ids have been obtained from the Head table but preferably before the creation of new data tables to reduce the storage volume; but the steps can be combined in one single java program for improved efficiency; and creating new data tables requires the knowledge of the table ids which are assigned by the Head table; and deleting data from the discussion board and email can be done any time, but it is preferable to delete them after the program has reached a point that the configuration operation would succeed.

The function of resetting data tables may be extended to a method of selecting a configuration from a plurality of configurations such as patent_suit.conf, bribery_action.conf, securities_action.conf, and merger.conf. When the manager selects option 1, the system reads all configuration files, and passes their file names or identities to the web page in hidden fields, and displays a list of the configuration files in descriptive language together with mutually exclusive radio buttons. The manager is asked to select one table configuration from (1) Patent Suit, (2) Merger or Second Request, (3) Bribery Investigation, and (4) Securities Action. After the manager selects one of the available configurations, the web page sends the file name in name-and-value pair to the server, which uses the selected file to reset table configuration. Besides those modifications, the rest of the operations are identical or substantially the same.

When the option 2 (delete data in selected tables) is selected, the server calls a server program to delete the data from the selected table. It does not change table structures. When this option is clicked, the JavaScript embedded on the page expands page space to show all existing table names which have been embedded on the page, and a check box for each of the data tables for the manager to select. It allows the manager to select any or all of those tables to delete data without affecting table structures. When the user selects one or more tables, a script on the web page marks the selected tables by assigning a unique value to their operation statuses (i.e., name="opstatus" value="delete_data"). This option allows the manager to delete data from any or all of the tables at once. To ensure that data is not deleted by a mistake, the manager is required to confirm the option by typing "yes" in a pop-up window and submit the pop up.

This program for deleting data is called with a connection handler, history file flag, group id and tables names. It first sets dbhandler.setAutoCommit(false). It goes through all tables by a loop. For each table, the program cleans the data from the table. If the table is a data table has a history table, it just drops the history table. If the table is a discussion or email table, it deletes the data from discussion table and the email table. After those tables are deleted, it then clears the records from records_properties and suggest_source for those tables. It deletes the records using the deleted data as destination field. However, the program may be altered to keep the setup in the suggest_source table. When data is deleted from a data table, the history flag is set to "No." When a table data are deleted, it resets the auto increment number by using "alter table "+tableName+" auto_increment=1." Deletion may be done through truncating the table. After deletion is done, the server set dbhandler.setAutoCommit(true).

The option 3, is used to replace selected tables by the table structures from the configuration file. All data in the selected tables will be deleted. The system will not touch existing tables that are not selected. Under this option, the web page shows a list of the existing data tables with a check box or button in front of each of them. The user selects one or more tables to reset, and script on the web page marks the selected tables by assigning a unique value to an operation status (i.e., name="opstatus" and value="reset_table"). Under this option, the manager is prompted to select tables and browse to find the file path of the configuration file on the client computer. Upon submission, the server sends a pop-up page, prompting the user to confirm its intention. After the user confirms by typing "yes" in a pop-up page, the system uploads the configuration file into a temporary folder such as a/upload folder or any suitable path. Upon successful upload, the system checks the file validity, reads the table names and associated table structures into proper variables, and creates a list of table names based upon the user's selection. Then, the system drops each of the selected tables and creates a replacement table for the same navigation tab entry by going though a loop. In an alternative, the system can delete the fields that do not exist in the replacement table, add new fields that appear in the replacement table, and alter fields the fields in replacement table is different from the existing table.

To support this function, data tables should be named in a name best reflecting the substances of the tables, and funny and irrational names should be avoided. For example, a names table means a table holding attorney names and other party names no matter how many variations it may have. The system in one version of embodiment has the maximum number of 10 but this number can be changed in the program, a property file or a system file, or in the declaration of Sysinfo.java. If the data tables on the configuration file are fewer than the tables that the manager has selected, the system returns a warning and overwrites only those selected tables by the same tables defined in the configuration file.

The operation affects only selected tables without touching tables that are not selected. However, there are two further choices (1) delete all existing tables that do not match with any table in the configuration file (2) create a new table according to the configuration file if the table does not exit in your current system." The first choice is used to delete tables. If the system has table A, B, C, and the configuration file has A and B, the user can use the choice to delete table C. The second choice is used to add new tables. If the system has table A, B and C, the user decides to add table X, this choice will cause the system to create a new table X. Therefore, the system allows the user to modify any table, add tables, and delete tables by using the two choices under the option 3.

An improved implementation allows the user to view both data tables in the system and data tables in the configuration file. The server first uploads the configuration file, reads the configuration file to get table names and structures, and gets the existing data tables from the Head table. The system then displays two lists of data tables. The system's existing tables are shown as a left column with each table being preceded by a check box for deletion. For each of the existing tables A, B, C, and D, there is a row of the candidate tables X, Y, Z. Each of the candidate tables is preceded by two check boxes or buttons (which changes its look upon a click) so that the row looks like "[ ] [ ] X, [ ] [ ]Y, Z [ ] [ ]" where the first button for each candidate table is for adding the table at the position, and the second button is for replacing the existing table by the candidate table. The page also has a submission button. Thus, the user can choose any existing tables to delete by checking the left check boxes, add any candidate table by selecting the first button, and replace any existing table by checking the second button. After the user makes all selections, the web page have the marks on those tables to be deleted, the tables to be inserted and their relative positions in the navigation bar, and the tables to be replaced and the corresponding replacing tables. The server, upon confirmation, deletes all tables that have been marked for deletion, replaces those tables that have been marked for replacements by candidate tables, and add tables at right positions. Table positions may be tracked with table ID numbers; however, additional order number may be added to the Head table for convenience.

When the option 4 (reset all tables according to user's configuration file) is called to reset the system, the manager finds the path for finding a configuration file from the client computer. The rest of the operations such as reading records for the project group in the Head table, dropping existing data tables from the database, inserting records in the Head table, creating data tables, deleting data from email and discussion board, deleting records from other shared tables are substantially the same as those steps for resetting data tables by default configuration.

Figure 8A:
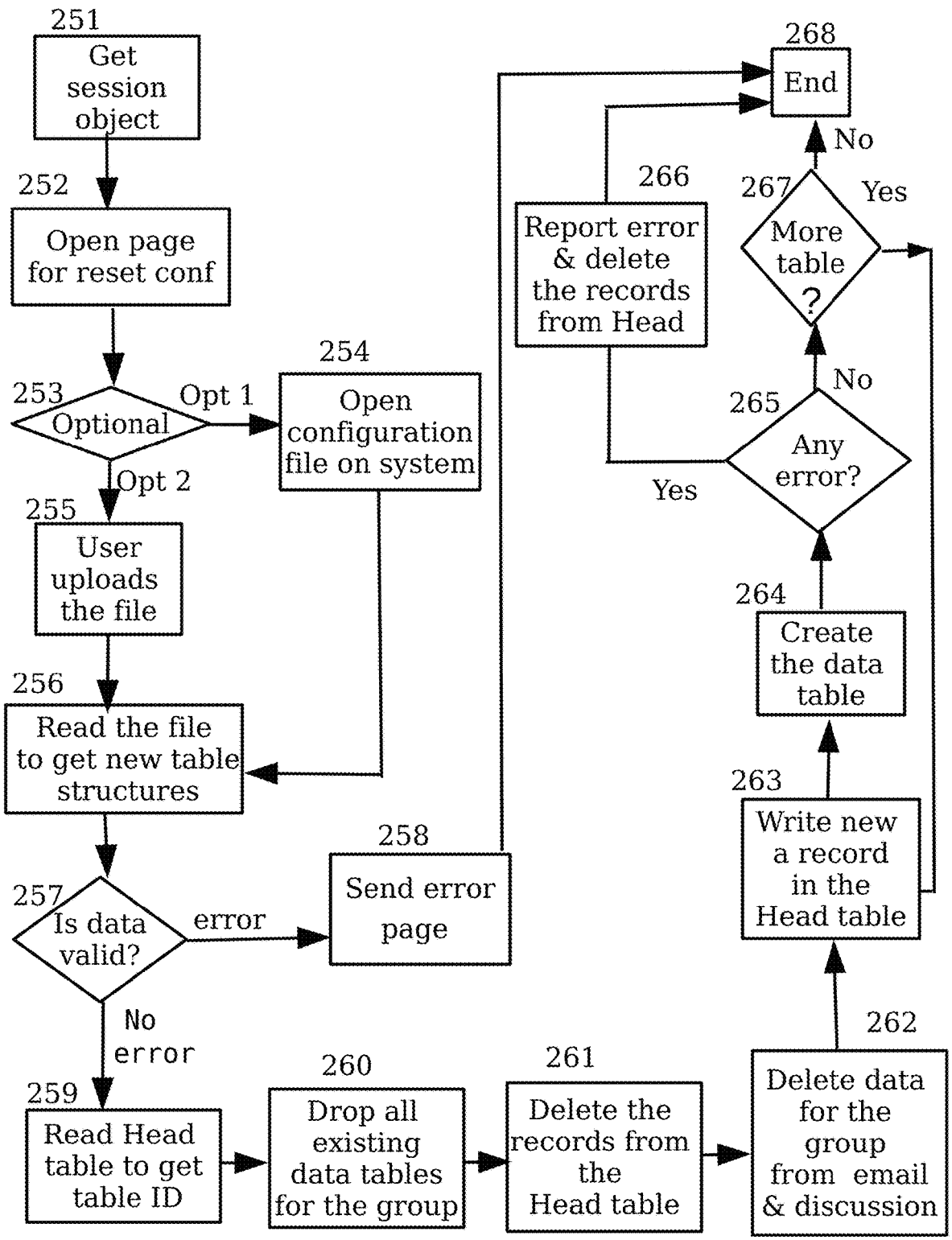
FIG. 8A is a flowchart showing the steps of changing data tables by uploading a configuration file.

FIG. 8A shows the steps for resetting data tables. The user gets session object at Step 251 and opens the page for resetting system configuration at Step 252. Two of the options are uploading a configuration file and using a default configuration on the system. If the user chooses default configuration (option 1) at Step 253, the server reads the default configuration file at Step 254. Otherwise, the user uploads a configuration file at Step 255. At Step 256, the server reads the file into buffer, extracts data, and stores the data in proper variables. The data include table names, navigation names, and table structures of data tables. If the file cannot be opened or no data in the file, the server sends an error reporting page at Step 258, and ends the operation at Step 268. If the server finds no error at Step 257, the server reads Head table to get all records for the group at Step 259, drops all existing data tables by using the table ID and prefix "t" at Step 260, deletes setup records for the group from the Head table at Step 261, and deletes data from the discussion and email tables at Step 262. The server uses the data table structure to write records in the Head table in one record a time at Step 263, and create a new data table at Step 264. If there is error in creating data table, the server sets error variable with message at 266, and ends at Step 268. If no error was encountered at Step 265, the server checks whether it has more table to create at Step 267. If more table is to be created, the server goes back to Step 263, otherwise, it goes to the end at Step 268.

Like DefaultSys.java, ResetAllTables.java contains the code for retrieving table Ids of all data tables for the group from the Head table, drops all data tables for the group by using prefix "t" and table IDs as table names, delete all records for the group from the Head table, and delete data from the discussion and email tables, and delete all pad tables. It then restores the system. The restoring function includes loading the default configuration file, reads the system fields, gets the table structure from the configuration file, inserts records into the Head table, drops existing data tables if any, and creating data tables. Following is part of ResetAllTables.Java.

This program goes through a loop from i=0 to the maximum table count. However, the loop is terminated by "if(props.getProperty("t"+i)==null)break", which happens when it has used all tables in the configuration file. If the number of the tables in the configuration file is fewer than the tables on the system, the server reuses the existing table ID. If the configuration file provides more tables than the tables in the system, the server gets new table ID by the statement "new LastInsertID(dbhandler).getId( )" Each of the tables so assigned are out of the table ID range originally used by the group. While data tables have been deleted in a prior step (not shown here) by using the table IDs from the Head table, the system may still have spurious data tables using this assigned ID (which might be from a prior use, from an export file, or other reasons). Therefore, it is very desirable to use the "delete table t[n] if exists" command to delete any such table. When the system goes through all tables, t1, t2, tn, the system drops any of the data tables that are not reset by the system. This happens when the configuration file contains fewer tables then the system. After this operation on a configuration file defining six data tables, the Head table may contain the following records:

---
INSERT INTO 'Head' VALUES
(1,1,'Notes','Notes','T','N','0',NULL,'0','2011-05-14 15:39:47','0','N'),
(2,1,'Acronym','Acronym','T','N','0',NULL,'0','2011-05-14 15:39:47', '0','N'),
. . .
(6,1,'Production','Production_log','T','N','0',NULL,'0','2011-05-14 15:39:47','0','N'),
(7,2,'Notes','Notes','T','N','0',NULL,'0','2011-05-15 00:50:30','0','N'),
(8,2,'Acronym','Acronym','T','N','0',NULL,'0','2011-05-15 00:50:30', '0','N'),
. . .
(12,2,'Production','Production_log','T','N','0',NULL,'0','2011-05-15 00:50:30','0','N');

---

The first six entries in the Head table are for project group with groupID=1 while the rest of the entries is for project group 2. A setup operation by group 1 does not affect the data records for project group 2. Their board ID or table ID may be non-consecutive because some tables have been deleted. The "N" value of the history field indicates that no data of has been transferred from a data table to a history table. The "N" in the last field denotes that the data table contains no data. The program also drops data tables for which the configuration file has not provided enough data tables in case that the configuration provides only 3 tables while the system has 6 data tables.

Configuration files may be prepared and pre-tested for site use. They may be customized for different projects. Different projects require different tables structures. This feature allows the manager to change table names, navigation names, and table structures on site within a project life cycle or between two projects life cycles. Before any of such operations, the server asks the manager to save current project data by using the export function. If there is a need to change the system back to the original system's state, the manager can upload the project zip file to restore the system.

Figure 8B:
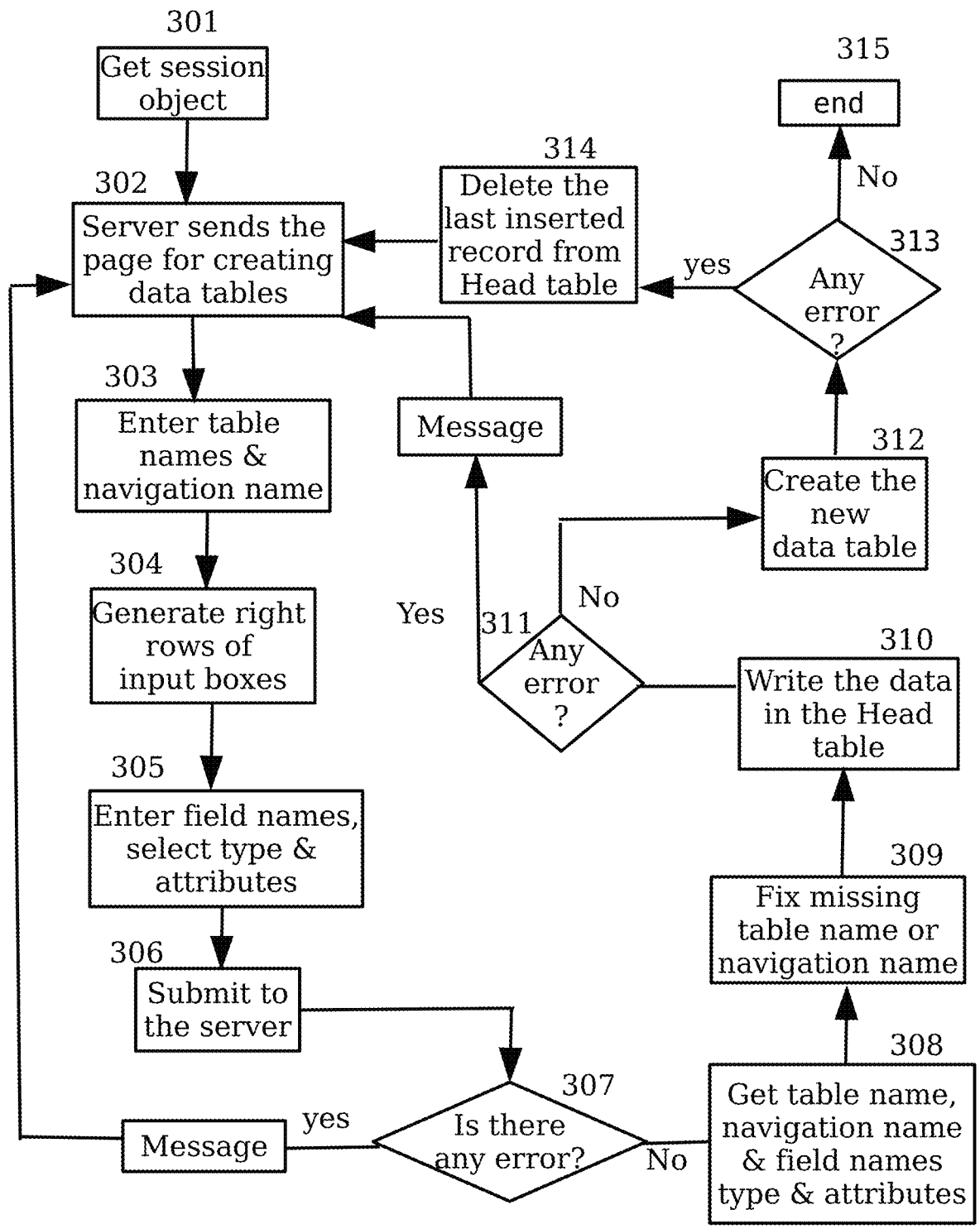
FIG. 8B is a flowchart showing the steps of creating a data table.

4. Changing Data Table Number and Table Structures from Using Web User Interface The functions implemented on web pages in FIG. 5A-5D can be used to change table configuration and related functions. FIG. 8B shows the general process for creating a data table on web page. The user logs in a privileged account at step 301, and starts the page. The server sends the page for creating data tables at Step 302. On the page, the user enters table name and navigation name at Step 303. By clicking "More row" and "Remove row," the user can generate a right number of input box rows for an intended number of fields at Step 304. The user provides fields names, selects types, enters lengths and selects attributes for each of the fields at Step 305. The page is submitted to the server at Step 306. The JavaScript conducts a formality check. If navigation name is not provided or any of the fields contains impermissible characters or are too long, the browser asks the user to change. If an error encountered at Step 307, the user is prompted to reenter data at Step 302. Otherwise, the page is submitted to the server for processing. Upon successful submission, the server gets table name, navigation name, and field names, field types, and attributes at Step 308. If the table name is not provided, the server creates one by using a string (e. g, "Table") affixed with a unique integer, the last count number plus 1 at Step 309. The server constructs a SQL statement and writes an entry in the Head table at Step 310. If no error encountered at Step 311, the server executes the SQL statement to create a new data table and ends at step 315 if no error is encountered. If the server encounters an error at Step 311, it sets error variable with an error message and goes back to the page for creating a table at Step 302. If the server encounters an error at creating table at Step 313, it deletes the last entered record from the Head table at Step 314 and goes back to the start page 302.

To create a data table by the user on the web page, the manager clicks the "Setup More Table" link (FIG. 5A) to open the page shown in FIG. 5B. This page contains two input boxes: one for table's navigation name and one for table name, and two buttons: "Insert Entry" and "Delete Entry." Below these two buttons are a row of input boxes and drop-down boxes for accepting field definitions. The input and drop-down boxes are respectively for field name, type, length, not-null, and uniqueness. On this page (FIG. 5B), only one row input boxes is initially shown. By clicking the "Insert Entry" button once, it generates one-row input boxes. To create a table containing five fields, the manager clicks the "Insert entry" button four times. If the manager has created too many rows, the manager can delete the last input row by clicking the "Delete Entry" once, and can delete as many rows as necessary by clicking the "Delete entry" button repeatedly. A sample web page for creating a configurable data table is:

This example web page allows the manager to create up to 10 rows of input boxes for holding nine fields. Similar code can be created to implement the same concept. This table limit can be increased to any reasonable number. In this web code, when the manager clicks upon "More Entry", it calls the following script to create a row of input boxes:
var isTable;
function insertRow(is){

```
var isTable;
function insertRow(is){
    isTable=document.getElementById(is); index=isTable.rows.length;
    if(index>25)return;
    nextRow=isTable.insertRow(index);
    cell0=nextRow.insertCell(0);
    . . .
    cell5=nextRow.insertCell(5);
    index++;
    cell0.innerHTML="Col "+index;
    cell1.innerHTML="Field <input type=\"text\" name=
\"Field\" size=\"20\"maxlength=\"50\">";
    . . .
    cell5.innerHTML="Unique <input type='checkbox' name=
'Unique"+index+"'value="NotNull"+index+"'>";
}
```

The manager can reduce the field number by clicking "Delete Entry." Script function deleteRow(where) deletes a row by statement isTable.deleteRow(index-1), where index=isTable.rows.length.

A server program, CreateTable, is responsible for creating a data table on the server. It extends a HttpServlet and declares a connection dbhandler, group_id, table ID, table name, navigation, field[ ], length[ ], and type[ ]. It initializes global variables, processes the get request, and processes http post request. In processing the do-post request, it gets the values for group_id, table name, navigation, field[ ], length[ ], and type[ ] by using getParameter statements, makes connection to database application, uses the table name to find the current table Id, or, if the submitted data

```
<table width="760" border="0" align="center" cellpadding="0" cellspacing="0" style="line-
height:30px;">
<tr><td bgcolor=" " class=" " style=" ">Create Board</td></tr>
<tr><td align="center"><span class="">*</span>Board Navigation: <input type="text"
name="navigation" size="30" maxlength="15"> (Fewer than 15 letters)</td></tr>
<tr><td align="center">Table Name: <input type="text" name="boardname" size="30"
maxlength="20"> (Fewer than 20 letters)</td></tr>
<tr><td width="" align="center"><input type="button" value="Insert entry"
onclick="insertRow('dynTable')">   <input type="button" value="Delete entry"
onclick="deleteRow('dynTable')"></td></tr>
<tr><td align="center">
    <table id="dynTable" cellpadding=0 cellspacing=0 border=0 style="border:1px #A8B4C4
solid; line-height:40px; text-indent:8px;">
    <tr><td height="30">Col 1</td><td>Field <input type="text" name="Field" size="20"
maxlength="50"></td>
    <td>Type <select name="Type">
        <option value="INT">INT</option>
        <option value="TINYINT">TINYINT</option>
        [some code is omitted]
        <option value="DATETIME">DATETIME</option>
        </select></td>
    <td>Length <input type="text" name="Length" size="3" maxlength="5"></td>
    <td>Not NULL <input type="checkbox" name="NotNull1" value="NotNull1"></td>
    <td>Unique <input type="checkbox" name="Unique1" value="Unique1"></td>
    </tr>
    </table></td></tr>
<tr><td height="40" align="center"><input type="submit" name="Submit" value="Submit"
/></td></tr>
</table>
``` contains no table name, it just creates a table name. It optionally selects a project-wise default validation rule for the group. It creates a record for the new table in the Head table by using the executeUpdate command. The record includes group_id, navigation, table_name, and validation_ route. Knowing the table ID used in the last insertion, it then uses the last inserted table id to create a data table according to the naming convention. In creating the SQL statement, it first gets Sys_record_id, Sys_usr_id, Sys_status, default validation route, Entry_date, Confirm_date, IP, Initials, and App, and adds the fields (together with length and type) by a loop. Sys_status ENUM ('0', '1', '2') is for data validation route, where default "2", 0 denotes validated record, 1 denotes tentative record from a whole table, and 2 denotes tentative record from a tentative table. Apparently, the values "1" and "2" may be merged as one value with a minus adjustment to related programs. The system finally executes the SQL statement for creating the table. The server uses the table id to create a new data table. If the data table cannot be created due to an error, the system deletes the record it has just created from the Head table. Additional method has been provided to fix errors arising from out of synchronization between the entries in the Head table and data tables. Duplicate table names are not allowed within the project but are allowed between different projects because they use unique table ID and group ID.

Figure 8C:
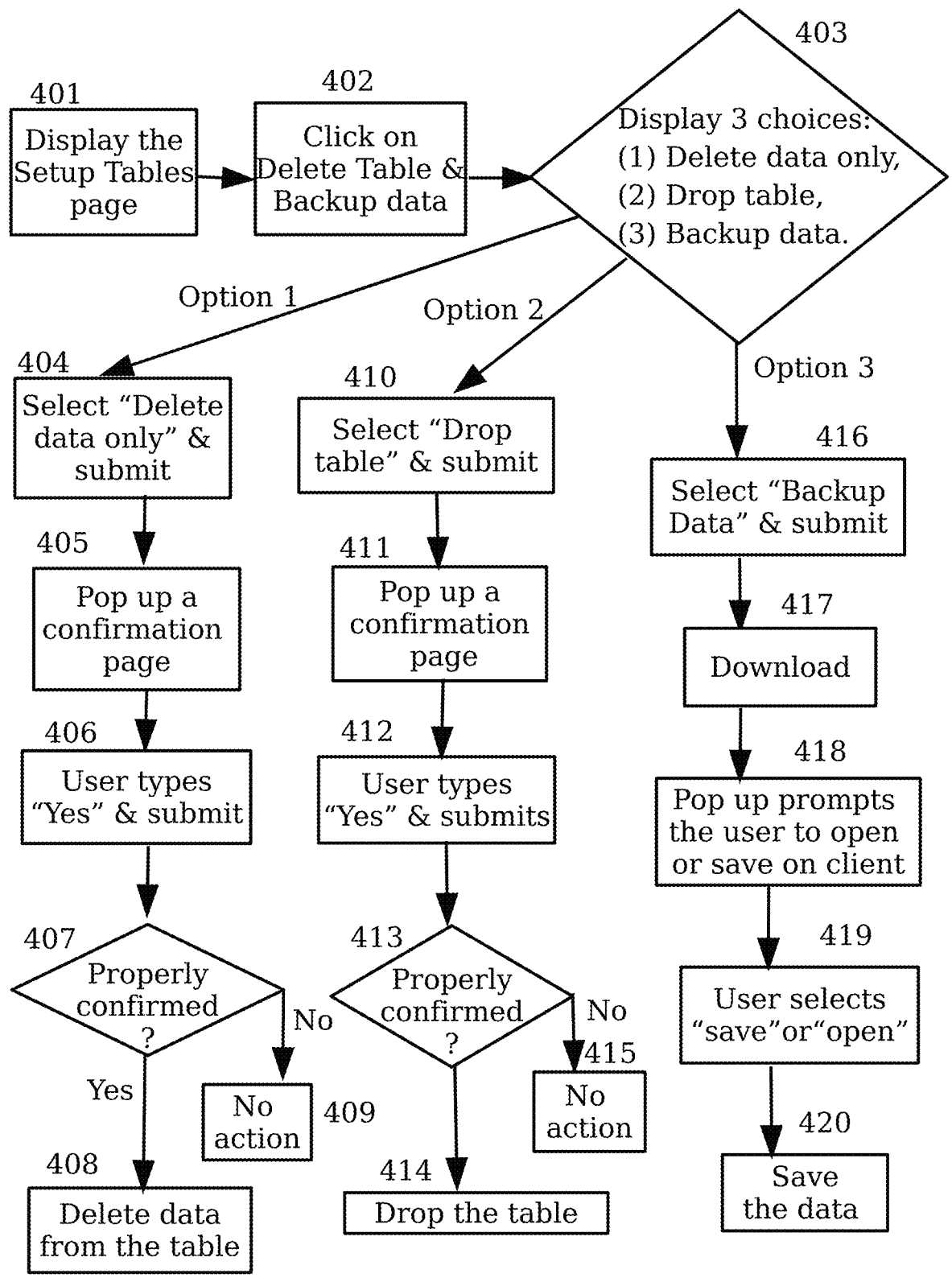
FIG. 8C is a flowchart showing the steps of deleting table, backing up data, and deleting data for any table.

FIG. 8C shows the process for the user to delete data table and data under the "Setup Tables" menu. On the "Setup Tables" page (at Step 401), the user selects the "Delete Table and Backup Data" (FIG. 5A) in the line of a data table at Step 402. The server sends a page having three options at Step 403. If the user selects "Delete Data only" and submits the page at Setup 404, the browser pops up a page, asking the user to confirm at Step 405. The user types "yes" and submits the page. Upon confirmation at Step 407, the server deletes data from the data table. If the use selects option 2, "Drop Table," and submits the page at Step 410, the browser pops up a confirmation page at Step 411, and the user types "yes" and submits at Step 412. Upon confirmation, the server drops the table with all data discarded at Step 414. If the user dose not properly confirm, the browser will not submit the page at Step 415. If the user selects "Backup Data" and submits at Step 416, the server downloads the data from the table at Step 417. The server causes the client computer to generate a pop-up window, asking the user to "Save" or "Open" the file. The user selects "Save" at Step 419 (The user may change path & file name). The client saves the downloaded data at Step 420.

The page contains operation type with three values, respectively, for deleting data, dropping table, and downloading the data, and table ID. Upon submission, the server gets user ID and group ID from a section object, gets the value for operation type, and table ID. If the user-selected option is to delete data, the server deletes data by using executeUpdate on "delete from table" and "alter table tablename AUTO_INCREMENT=1," followed by cleaning relation tables. If the user-selected option is to drop table, the server executes "drop table tablename" and "delete from Head where board_id='boardid'." If the user-option is to download the data, the server uses the code similar to the corresponding code for downloading a zipped project.

The structure of any of the data tables can be modified by using the "Modify Table" page. In response, the server generates a page titled "Structure of the Names Table" (FIG. 5C). The structure of the attorneys (names) table could have eight rows of data corresponding to eight fields: email address, first name, middle initial, last name, firm or company, dates, type, and comments. Each row contains field name, type, a null flag, and a uniqueness flag. There is a check box in front of each of the rows, and there are three buttons at the bottom: Delete, Add, and Modify. If the manager selects a column (e.g., Last_Name) and clicks the Modify button, the server sends a page titled "Modify Columns for Names" for editing the selected field in FIG. 5D. This row of input boxes is substantially same as the input row used in the creating new table except that input fields are filled with the original values. The manager modifies the field. Upon submission, the server updates the table structure to reflect the modification of the field. To add a new field, the manager clicks the Add button at the bottom of FIG. 5C, and the server sends a page titled "Add Columns for Names Table." This page is similar to the page in FIG. 5D except that it has the buttons "Insert entry" and "Delete entry" for adding or removing an input row. After the field names are provided and their types and flags are set, the page is submitted to the server. If the new fields are added successfully, the server responds with the same page titled "Structure of Name" except that it has newly inserted fields appended at the end of the table. If the manager deletes a field from a table containing data, the manager is prompted to confirm the deletion because all of the data in this field will be lost. If the manager confirms the operation, the field together with data will be deleted.

5. Modify or Reset Work Environment for the Group by the Import Method

The import tool shown in FIG. 4G can be used to modify any aspect of the working environment, update the data, modify table configuration, restore the project settings to a prior state and create a new working environment. If a group owns a table, the group manager can control the whole table. If a table belongs to all groups, the group can control only the data for the group. The tables that are shared by groups include Head, discussion, email, suggest_source, records_ circumstance, and display. All tools for import and export must obverse this limitation.

In creating an export zip file, the server creates two files for tracking all files. One called data.properties or data_f.properties if the exported file was a human friendly format ("HFF") and the other is struct.properties. struct.properties contains table name and file names of a list of files containing SQL table structures of exported data tables. It contains "t6=struct/Production.txt; t5=struct/PrivilegeLog.txt, ... t1=struct/Notes.txt." The server can import each of the files into the database to create the data table. data.properties contains table name and file names of a list of the files containing data exported from data tables. The server can import each of the files into respective data table. When data is exported by using mysqldump, discussion attachments are saved in the one file, and email attachments are saved in a different file. However, if the project is exported in a human friendly format as denoted by data_f.properties (or "data_hff.properties"), discussion attachments and email attachments are stored in original native files in two different folders.

The process of rendering a project includes (1) uploading a compressed project file to a temporary folder on the server by data stream, (2) unzipping and, optionally, decrypting it by using the key provided on the submitting page if the file is encrypted, (3) dropping and creating data tables and the base tables, (4) deleting data from related tables such as suggest_source, record circumstance, display, pad, discussion, email, and groups, as illustrated in the sample program, and (5) read the data from the file and writing it into the data tables and all related tables.

Figure 8D:
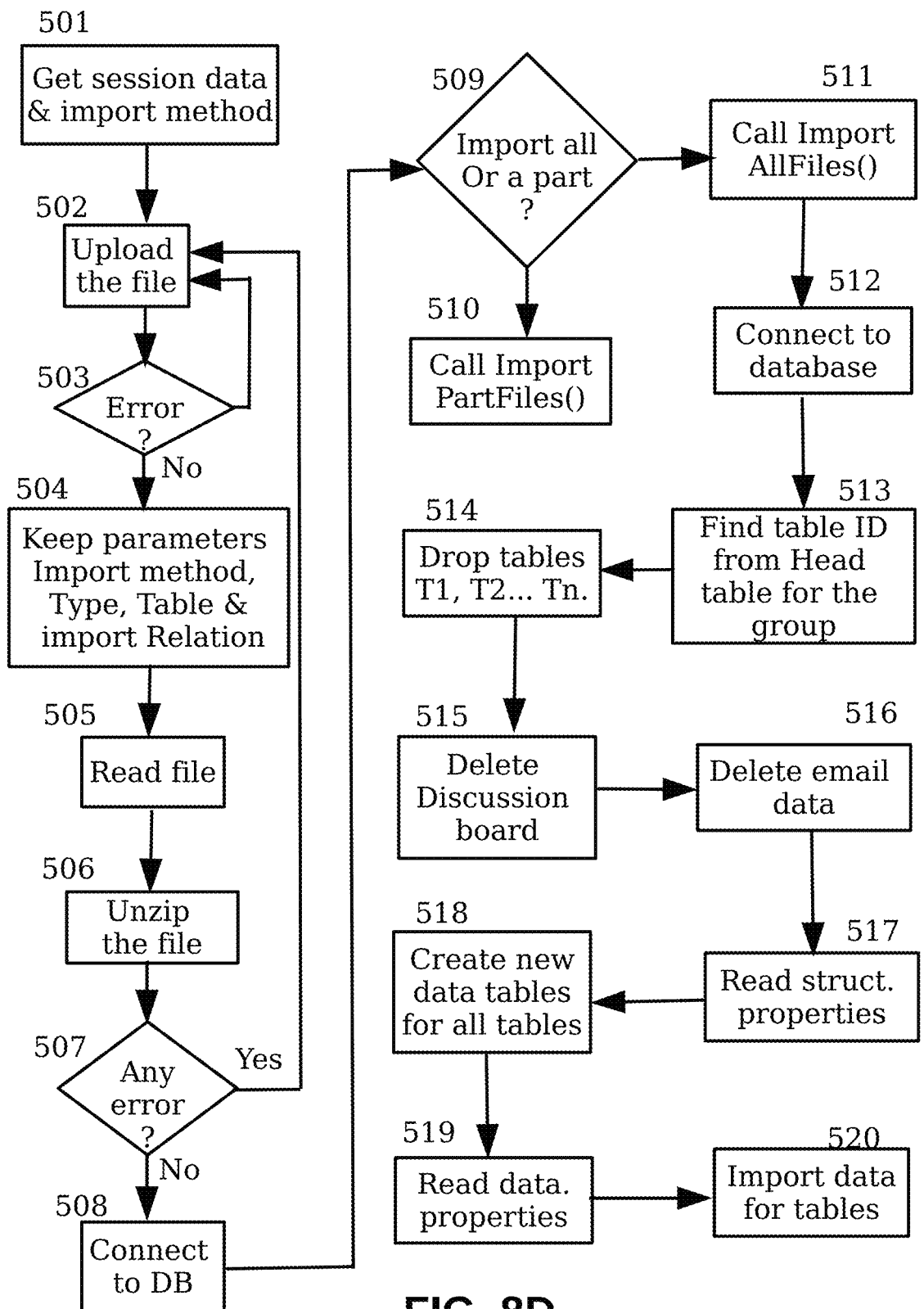
FIG. 8D is a flowchart showing the steps of importing a whole project.

FIG. 8D shows the process for importing a while project file. The user gets session identity and initiates the process of uploading project at Step 501. At this step, the user selects an import method from two options: import a whole project and import selected tables. If the user selects the option of importing part project, the user selects tables and has an option of cleaning relation tables (importRelation="Y" or "N"). The user causes the server to upload the file to the server at Step 502. If the server encounters an error, it sends an error page. If it runs into no error at Step 503, the server gets the values of import method, import type, table, and importRelation at Step 504, reads the file at Step 505, and unzips the file at Step 506. If the server encounters an error at Step 507, it sends a page informing the user of an error and goes back to Step 502; or otherwise, the server creates an instance of database connection and connects to the database application at Step 508. At Step 509, the server determines whether it imports a whole project or part of a project at 509. If the import method is for part of a project, it calls ImportPartFiles( ) at Step 510 (continued on FIG. 8E). If the import method is for a whole project, the server calls ImportAllFiles( ) at Step 511. The server sets auto-commit to false at Step 512, finds all table IDS for the group in the Head table at Step 513, constructs table names by using prefix "t" and respective table IDs for all data tables and drop each of the tables by using "drop table if exists" statement at Step 514. Optionally, this step deletes all history tables by executing a similar command. The server deletes data from the discussion and email tables at Steps 515 and 516. The server reads struct.properties to get the paths and file names of all files containing the SQL structures of all tables to be imported at Step 517, and loads by using a database command each of those files into the database, thereby creating new data tables at Step 518. The server then reads data.properties to get the paths and file names of all files containing the data of the tables to be imported at Step 519, and loads the data from the files into the database at Step 520. Since pads table are not listed in the Head table, the server cleans it if it exists in the system. This step also includes loading the data for the discussion table and the data for the email table if the data is available in the project file. If the import file is in human friendly format, this step includes a call to load the discussion attachments and email attachments and inserts each of them into discussion attachment and email attachment.

Figure 8E:
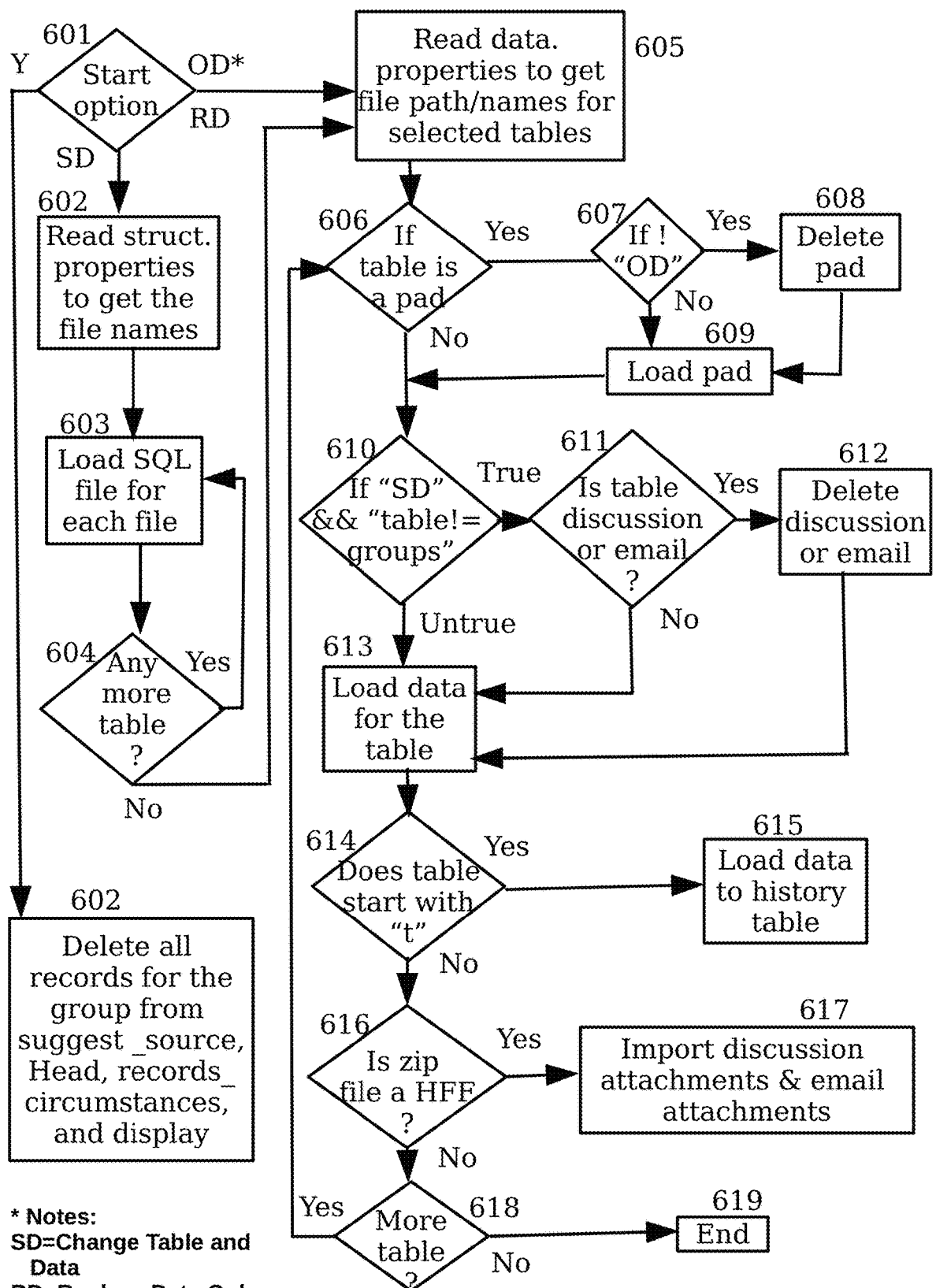
FIG. 8E is a flowchart showing the steps of importing part of a project.

FIG. 8E shows the steps of importing part of a project into the server. When the page is submitted, the program calls ImportPartFiles( ). In this case, the user has three import methods to choose (see FIG. 4G) at Step 601: import table and data (ImportMethod="SD"), replace existing data (ImportMethod="OD"), and add data (ImportMethod="RD"). In addition, the user can indicate the need for clearing entries in all related tables (importRelation="Y" or "N"). If the user has chosen the option to import both table structure and data, the server reads struct.properties file to get file paths and file names of a list of files containing SQL structure of the data tables to be imported at Step 602. The server then loads each of the files by using the database command, thereby creating each of the data tables at Step 603. In this step, the server skips the table if its name does not start with "t" and finds the file name for each of the tables selected by the user. If the user selects a table, but the server would not find the file containing SQL structures, the server skips this table. For each of the data tables for which a proper SQL structure is provided, the server imports it by using a MYSQL command. "mysql -h serverhost -u username -p password database <dirpath/filename" The server repeats this process in a loop at Step 604 until all selected tables are created. The server read data.properties file to get the file paths and file names for each of the tables including possible email, pad, discussion, and other tables loads data and starts loading data by a loop at Step 605. At Step 606, it constructs a pad name, and uses the name to find a corresponding data file for the pad. If the file does not exist, the server continues to Step 610. If the file exists and if the user selection is to overwrite data at Step 607, the server deletes data from the pad table and then loads the data at Step 609. If the user's selection is not to overwrite data, the server loads the pad data at Step 609 without deleting it. The server processes for next table. If import type is for importing table structure and data and if the table is not the groups table at Step 610, the server deletes data at Step 612 if the table is the discussion table or the email table at Step 611. Otherwise, the import type is "OD" or "RD," it proceeds to next step. The server loads data at Step 613. It then check if the table is one starting with "t" at Step 614, it also loads history data at Step 615 if its name starts with "t." The server determines from the name properties file (data.properties v. data_f.properties) whether the exported file is a native database file or a human friendly file at Step 616. If it is a native file and it goes to Step 618. If the file is a HFF at Step 616, and if the table is discussion or email table, the server imports email attachments or discussion attachments at Step 617. The server determines if it has more tables to be imported at Step 618. If it has no more tables, it ends at Step 619 or goes back to Step 606. In a simpler system that does not have discussion board and email, all those steps relating to the discussion table, the email table, and the server pads can be omitted.

This import and export program can be implemented as console programs. If the manager has access to the server, a project zip file may be loaded onto the system from server's terminal. In this case, the command may be like "pimport project-file-path". Optionally, it may be implemented with a step of prompting for a project password. Upon confirmation of the password, the program decrypts the project file, reads data from the unzipped files, and writes data into data tables and all relevant database tables.

The system extracts data from the database or from selected data tables and related tables, saves the data in files inside a temporary root folder, and then zips the folder. The whole or part of project may be exported in two file formats, and it can be imported back to the system. One file formats is that of the database dump file so data is exported directly using database application's dump tools such as mysqldump or its equivalent by using "mysqldump -h hostname, -u username -p password -d database ti >data_folder/tn.text". Optionally, the folder can be encrypted with a password for security. The file can be imported back to the system to render the project.

A project or part of it can be exported in a human friendly format (FIG. 4F). When this method is used, the program extracts data from each of the selected tables, add proper delimiter, and save data in files in a folder. Project files may be saved in different sub-folders under a root folder. The files in the root folder are then zipped up to form a project zip file. After the files are unzipped, they can be read by humans, and can be imported into other applications such as Excel. If attachments from a database table are saved in one single file, they cannot be opened off the system. If they are extracted from the table and saved as individual native files, they can be opened off the system. The project zip file can be imported back to the database to overwrite same tables, add new tables, copies data into the data tables, and inserts records in related tables such as Head, display, suggest_source, records_circumstance, pad, discussion and email.

In creating a human-friendly project zip file, the server first extracts basic information ("group properties") such as owner identity, project name, project password, user list, user accounts and passwords, project table setup data, and writes them in one or more text files. The server extracts posting dates and times for web mail messages and attachments from relevant tables and saves the data in a text file, extracts posting dates, author identities, and client IP addresses from the discussion board table and saves data in a text file; the server also extracts data from the pad tables and saves them in a text file. All of those files are in well-delimited text format, and contains file names of attachments. They contain the same substantive information that is shown on the discussion board, email page, and data tables.

The message bodies of the email messages are saved as plural text files in one sub-folder, and the message bodies of the discussion messages are saved as plural text files in another sub-folder. The program also extracts discussion attachments and saves them in native formats in a sub-folder, and extracts email attachments and saves them in native formats in another sub-folder. Each of the attachments may be renamed by a message ID or appended with a unique string or its posting-date and time so that no name conflicts exist. The root project folder is compressed as a project zip with an optional password protection. This human-friendly project file can be opened and viewed without using the system's software.

Other data stored in property files, written in programs as constants, or static variables in java programs, must be treated properly. Any information in those files is taken care of separately because they are not part of the database. It is understood that the import and export tools may include functions to collect and manipulate the data.

Figure 8F:
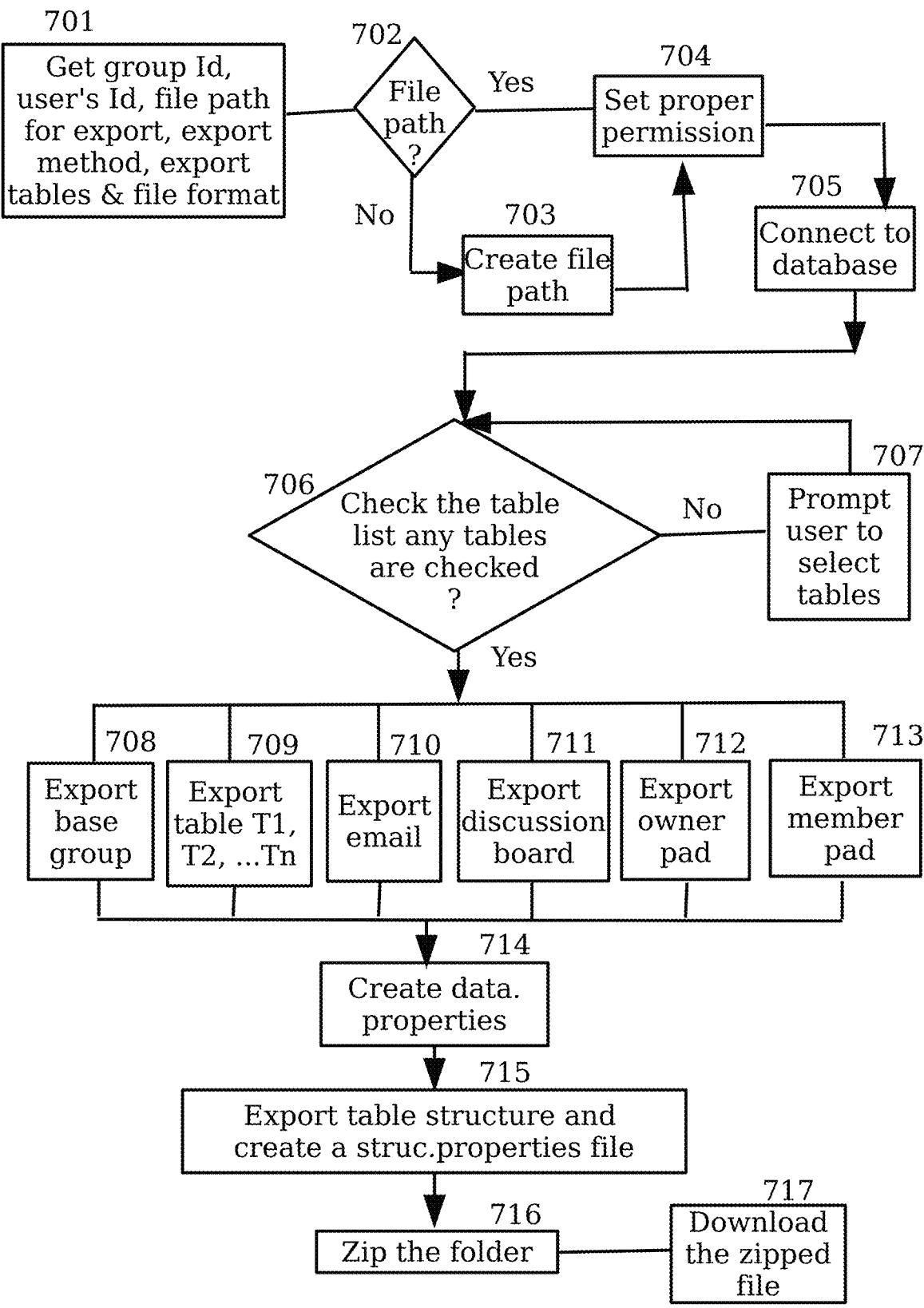
FIG. 8F is a flowchart showing the steps of exporting a project.

FIG. 8F shows the process of exporting a project. When the user submits the import page, the server gets group ID, user ID, file path, export method, selected table names, and file format at Step 701. The server checks the file path at Step 702. If the file path is valid, the server sets proper permission to user writable at Step 704. If the file path does not exist, the server creates a file path at Step 703 and sets permission to user writable at Step 704. The server connects to the database at Step 705. It then determines which of the tables have been selected for export. If no tables have been selected, the server prompts the user to select a table at Step 707. The server checks each of the tables, exports only those tables that have been selected at Step 706. The server exports the groups table if it is selected at Step 708. The server checks data tables and exports any of them that have been selected at Step 709. The server exports the email table if it has been selected at Step 710, exports the discussion board if it is selected at Step 711, exports the owner pad if it is selected at Step 712, and exports users' pads if they are selected at Step 713. Each time when the server exports data from a table, it also adds a record to a properties object by using "properties.setProperty (tablename, tablefile)." It adds a table name and file name pair to the properties object. When the data of all tables have been exported, the server stores the properties in a file stream by using properties.store (outstream, "set") to create a data.properties file a propertier folder at Step 714. The server exports the table structure of the selected data tables by using statement like "mysqldump -h hostname, -u username -p password -d database ti >struct_folder/tn.txt". In the process of exporting table structures, the server also creates a properties.setProperty (tablename, tablefile) object. When all structures of all tables are exported, it saves the object in the file struct.properties in a properties folder before the file was closed at Step 715. The server then zips up the whole folder at Step 716.

When the database application dumps data from data tables and other tables, it needs a sufficient wait time. Thread.sleep( ) causes the server to wait for the files to be formed. The required wait-time depends upon the table size and server performance. It cannot be a static value. The ways of determining the best wait time is by trial-and-error to establish a formula, which is a function of the size of the table file and the server performance. A solution is to run this program in background, and the manager will download the file in a late time. The file name is preferably affixed with date and time so the manager knows when the project is formed at the time of download.

The feature of setting up database tables allows the user to create data tables without any limitations in field number and storage size. This feature creates two problems. First, if the tables are displayed in the conventional view, some tables cannot be properly displayed on web pages if they have too many fields and irregular data types and sizes. Therefore, it may be inconvenient or even impossible to see the whole data records on web page. Second, there is no way to control the display order for all fields. The field order in the configuration field or the interactive setup page often is not the best way to display the data records for the table. Finally, there is no proper way to determine the display space for each of the fields for each of the data tables. A display based upon the field storage size may show too much space for some fields, but show too little space for other fields. There is no way for a program algorithm to determine which field needs to be shown, which fields are given more space, and which fields are given less space. If a field is not assigned with a proper display space on the web page, the field data cannot be displayed properly. In conventional development practice, the web pages for displaying a data table are specifically designed and finely tuned to achieve the best display result and thus do not have all of those problems. Therefore, a true web-based information system needs new method for creating the display layout outside the development cycle.

6. Reliable and Configurable Display Layout for Each of the Data Tables on Web Pages The configurable data table requires new method for presenting data for the data tables. All data tables are undefined in the development cycle, and, thus, the developer of the system cannot design a display layout for any of them. A manager has unlimited flexibility to create data tables. A manager may create a table containing 3000-character text and wants to see all, but another manager may create a very text but want to hide it in a view page. The conventional display method cannot determine proper display size for text, attachment, status fields, and cannot know the order of fields on web page for the best performance. When the database application is extended for unrestricted use in the Internet, it must provide a reliable way of displaying data tables under all circumstances and also provide a way of changing display layouts in the application cycle. One of the concepts of the present invention is use of multiple-row display layouts. Each of the data records is displayed in multiple display lines anywhere from one to the Field number (in one-field-per-line). One example display layout is shown in FIG. 7D, where all fields are displayed in one-field-per-line except the last four system fields. Another way is to display the table data by carefully using available web space. For example, five small data fields may need only one single line, two relatively large fields may occupy one line, and a single large field may take a single line or even a big block space (FIGS. 7A, 7D). This display layout offers great flexibility.

The display method should have all useful features of that conventional layout. First, a table allows the user to sort the table according to one or more of column headers. This sorting function can be preserved in multiple-row display layouts because the sorting links can be placed on a detached column header although it appears to be strange in the first instance. The second utility is the easiness to identify field names for each field datum. In the one-field-per-line layout, each of the field names can be placed as fine prints right before each of the data cells. In the drawings, small field numbers are used as field identifiers, but they can be replaced by field names. Or field names may be displayed as infotip. When record data are presented in several fields per line in the table, the sorting and search functions still work. When the record data are displayed according to display space availability, it would be more difficult to identify data. If the user has gotten used to a table display, the user has little need to read column headers. It is more difficult to identify field names when the table contains a large number of fields and the user have moved away from the column headers. A solution to this problem is to print a small field number or field name in the vicinity of each data field as the identity of the field. The numeric field indicators or field names are less important in the case where the user knows the table fields well. One useful feature of the conventional display layout is that the user can quickly see any abnormal data in any column by scanning through the column. For example, if the manager wants to conduct a quick scan to identify any abnormal dates in a column of a table, the manager can move the table from top to the bottom quickly while looking at the dates. When table records are presented in a multiple-row layout, it would be more difficult to conduct such a quick scan. A solution to this problem is to place each of the data fields in a unique horizontal position on the web page. By moving the table from the top to the bottom, the user can focus on this unique position to catch abnormal data. This multiple line display provides one advantage: the user can see the full record in one screen and has no need to scroll the screen horizontally to see it.

The method of implementing multi-line display layout include (1) creating a setup table or equivalent file with proper data structure for storing the display layout definitions, (2) creating a data record to define the display layout for a data table for the user or the group, (3) displaying the table data using a reliable default display layout, and (4) applying any of the available layouts to the data table.

The setup table or equivalent file contains (1) the number of total lines for each record of the data table, (2) the number of the fields and field names in each of the display lines (a field may take one line or even a whole block space), (3) the display length of each of the data fields on the web page, which may be different from its storage size, (4) the owner of the display layout, which may be a manager-id, manager name, or group ID or any other unique identity, and optionally (5) position of each of the fields in the context or the position of each of the display lines on the web page. In the preferred embodiment, the display table is defined as follows: create table 'display' ('board_id' int(11) not null, 'group_id' int(11) not null, 'manager_id' int(11) not null, 'line1' varchar(200) default", 'line2' varchar(200) default", 'line3' varchar(200) default", 'line4' varchar(200) default", 'line5' varchar(200) default", 'line6' varchar(200) default", 'line7' varchar(200) default", 'line8' varchar(200) default", 'line9' varchar(200) default", 'line10' varchar(200) default", 'status' enum('p','m') default 'p', 'position1' enum('left','center','right') not null default 'left', 'position2' enum ('left','center','right') not null default 'left', 'position3' enum('left','center','right') not null default 'left', 'position4' enum('left','center','right') not null default 'left', 'position5' enum('left','center','right') not null default 'left', 'position6' enum('left','center','right') not null default 'left', 'position7' enum('left','center','right') not null default 'left', 'position8' enum('left','center','right') not null default 'left', 'position9' enum('left','center','right') not null default 'left', 'position10' enum('left','center','right') not null default 'left', 'font_size' tinyint(2) not null default '9', key 'board_id' ('board_id'), constraint 'display_ibfk_1' foreign key ('board_id') references 'head' ('board_id') on delete cascade) engine=innodb default charset=latin1. The table has a board_id, group_Id, manager_Id, 10 lines field definitions and 10 lines position definitions. Manager_Id stores owner identity such as user Id (It was originally for manager). The status, having "m" or "p" value, determines whether the display layout is for the group or personal use. The position definitions define the position of each of the display lines. The relationship between two or more variables is coded into their order. For example, the fields in the third line are defined by the positions in the third line, and their relationship is preserved through the use of an array index. In the above example, the position instruction determines the horizontal position of each of the lines. If a line contains 3 fields of 20 spaces each and the line has 100 spaces on the display screen, this line will use only 60 spaces with 40 spaces unused. When the position is set to "left", the unused 40 spaces will be on the right. If the position is set to "center", it has 20 unused spaces on the left and 20 unused spaces on the right. Optional field may be added to define the vertical position of each of the display lines.

There are many alternative schemes for carrying the necessary information for a display layout. The position instructions for potentially maximum 10 lines may be defined by one single string such as "lllccccar", which denotes left alignment for the first three lines, center alignment for the fourth to seventh lines, and right alignment for the last three lines. The total lines number 10 in the instructions could be changed as long as the program reading the instruction is changed accordingly. Owner identity could be user ID, user name (if names are unique), group ID (if the layout scheme is for the group). One alternative scheme comprises an owner identification, a field list "field_name_1, field_name_2, field_name_3, . . . and field_name_n," a size list: "size_1, size_2, size_3 . . . and size_N," a field allocating instruction: "3, 2, 1, 1, 1, 1, n, n, n, n," and a horizontal position instruction: "lll0000000, lr00000000, c000000000, c000000000, l000000000, r000000000, n, n, n, n." This scheme means that each record from a target data table is displayed in six lines: three fields in the first line, two fields in the second line, and one field per line for the last 4 fields. The first three fields are aligned to left, the first and second fields in the second line are aligned to left and right respectfully, and the fields in the lines 3, 4, 5 and 6 are aligned to center, center, left and right, respectfully. This scheme has the capacity of displaying 10 lines in the maximum, as indicated by the entry number in the field-allocating string and the word length of the position instruction. The horizontal position instruction would be combined to form one word "lllrcclr0" as long as the program understands it. In this case, it is convenient to keep track of all fields by field index, rather than the index for tracking fields within each of the display lines. The scheme may include a two-dimensional positions by using strings "llllicclr0; tmcbbbb0", where the first string defines horizontal positions for 9 fields and the second string defines vertical positions for 9 fields. In the second string, t means "top," b means "bottom" and c means "center." The string lengths may be increased to accommodate the maximum 10 display lines.

Another alternative scheme is one single string "Owner_identification@ field_name:20:l:c, field_name_2:30:r:t, field_name_3:50:l:b; field_name_4:20:l:c, field_name_5: 30:Et; n; n; n; n; n; n; n; n". This schema can be split by "@" to form owner identification and display instructions for ten display lines. This scheme means that each record from the data table is displayed in two lines: the first line has three fields and the second line has two fields. The eight additional lines, denoted by n, are not used. After the remaining string is spited at ";" to form ten sub-strings, only the first two sub-strings have values while the 3rd to 10th sub-strings have no value. Each of the sub-strings is further split by "," to get instruction set for each of the fields. After the instruction set is further spitting by ":", the system gets field name, display size, horizontal position, and vertical position, respectfully. The instruction on vertical positions is provided, and the program applying display layout should be implemented to effectuate vertical position. The owner identification could be delimited by a different character or marked up with a unique mark or stored in a separate field if this scheme is maintained in a special table. The delimiter characters can be any characters as long as they are allowed in the database and used in proper levels. If the owner identification is also separated by the same delimited ";", it has 11 sub-strings. The first sub-string is treated as owner identification and the remaining sub-strings are treated as layout instructions.

Figure 8G:
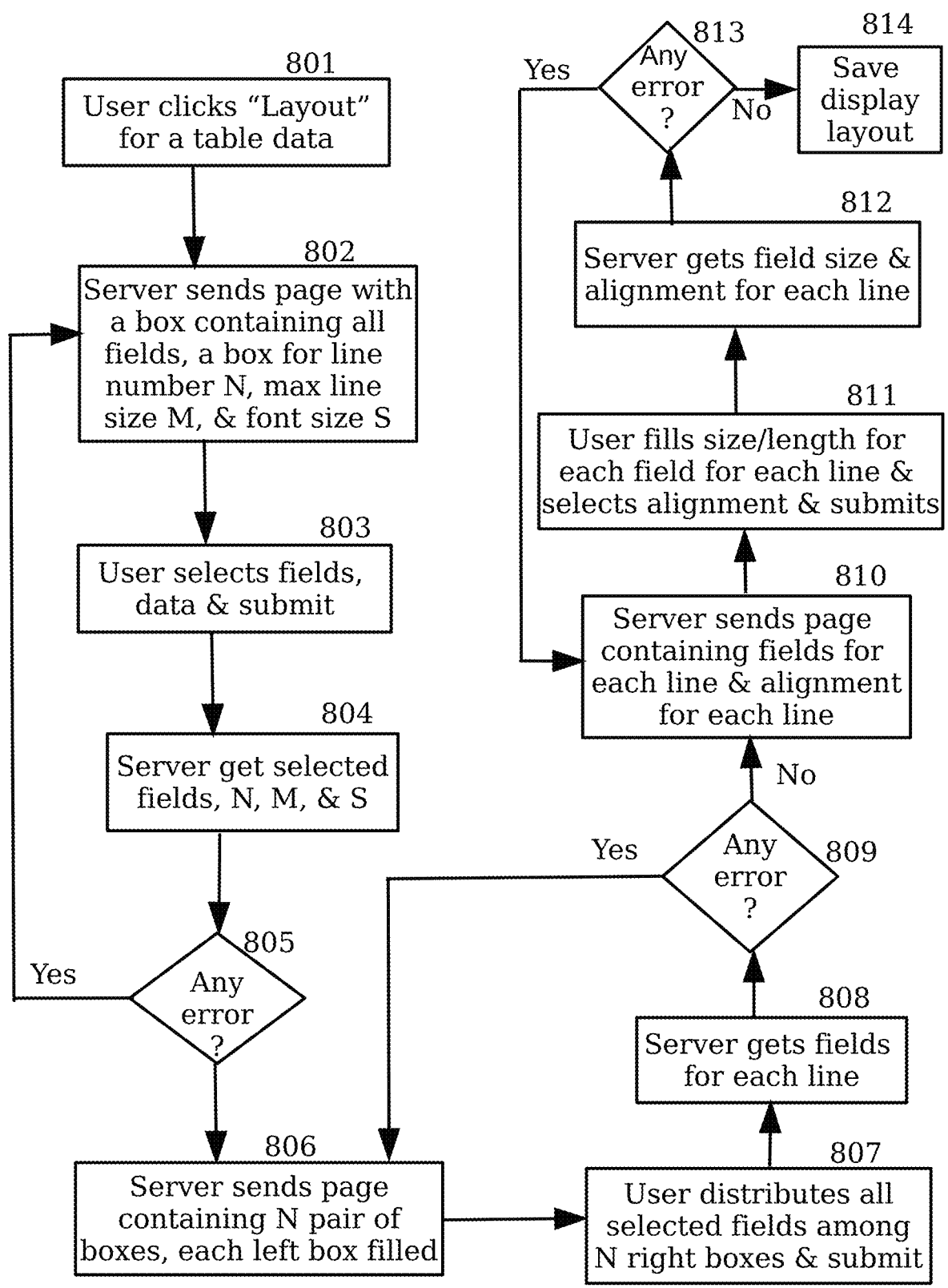
FIG. 8G is a flowchart showing the steps of creating a display layout from web user interface.

The system provides a method for setting up a display layout for any data table interactively. The manager can set up a display layout for all users of the group and each user can create a display layout for each data table for the user. The display layout data are saved in a display table. If a display layout is created for the group, the status field has value "m". If it is created for personal use, it has value "p". FIG. 8G shows the process of creating a display layout interactively. In the first step, the server sends a page (FIG. 5F) containing a box showing all fields available for display at Step 802. The user is required to select at least one field to display and provide display lines number N, font size S, and the maximum length of line M at Step 803. Upon submission of the page, the server gets the N, M and S at Step 804. If the server encounters an error, it goes back to Step 802. Otherwise, the server generates a second page, which contains N pairs boxes, with user-selected fields in each of the left boxes and nothing in each of the right boxes (shown in FIG. 5G) at Step 806. On this page, each right box is to define the fields for one display line, and the user can move fields from a left box to a right box by using the "Add" or the "Add All" buttons. When a field has been moved to a right box, it will disappear from all left boxes so that it cannot be selected for moving to another right box. The user selects fields in the first left box and moves them to the corresponding right box, selects fields from the remaining fields in the second left box and moves them to the corresponding right box, and selects the remaining fields in the third left boxes and move them to the corresponding right box until all available fields are allocated to all right boxes, and submit the page at Step 807. The server gets field data at Step 808. If there is an error, it goes back to Step 806. Otherwise, the server, according to the display lines and associated fields, generates a third page (FIG. 5H) at Step 810. This third page contains the allocated fields for each of the N lines or blocks, and an input box for the field display length of each field ("field size" on web page). The user enters a value for the display length for each of the fields and selects a horizontal position from the options "Left," "Center" and "Right" for each line at Step 811. Upon submission, the server gets the display length value of each of the fields, and gets the alignment value for each of N display lines at Step 812. If there is no error, the server creates a layout, saves it, and sends a page showing display layout settings (FIG. 5I) at Step 814.

Many steps of creating a display layout can be changed in their order. Font size may be entered at any time or step. The maximum line size is the limit of total display space used by assigned fields in a display line and depends upon web page size, view table, and display screen. The system may provide any reasonable default value for maximum line size. The step of selecting fields must be done before allocating them; and field space sizes and line positions can be set only after fields have been allocated to lines. In addition, the process may be implemented in one or two steps by using interactive data changing method such as Ajax. In such implementation, the line number, font size, and maximum line size may be entered interactively, script may be designed in support of user action of allocating the fields to all display lines, and the server can get their values, and use them in generating web page for taking next action. A display layout for any data table can be created by a manager and a user, respectfully, for the whole group or the user.

After the user submits the final page shown in FIG. 5H with filled values, the server gets the selected fields, their display sizes, and the display position for each line. The Java program processes the data and writes a display record for the table and for the user in the display table. A program, DisplaySetup.java, creates the display layout record in the display table. It first declares session, dbhandler, user Id, table Id, group Id, layout type, fontSize[ ], fields[ ][ ], size[ ][ ], position[ ], and lines[ ]. The program gets values for session, user Id, group Id, table Id, and layout type by using getAttribute statements. It gets fields, positions, and field sizes by request.getParameterValues and request.getParameter, and stores them in the proper variables for each of the display lines in the loop (int i=0; i<lines; i++). It then connects to the database application, constructs a SQL statement to retrieve the display layout record for the user and the target table. If a record exists for the user and the table, the program deletes it. It then creates a SQL statement for inserting a record by using loop. The program creates the statement for inserting lines and assignment positions. Within a line, the program goes through an inner loop (int j=0; j<lineFields.length; j++) to create statement for inserting fields and field sizes. The program then saves the layout record by writing it in the display table. It finally sends the page for showing the layout. For the names table containing the following fields, the user sets up a display layout with the following field arrangement:

TABLE 2

A Display Layout to be Set up for the Names Table

| Line | Fields in Each Display Line | Position |
|---|---|---|
| 1 | 'Sys_record_id,20;Confirm_date,20;App,20' | left |
| 2 | 'Firstname,10;MI,6;Lastname,10' | left |
| 3 | 'Email,60;Company,20' | left |

TABLE 2-continued

A Display Layout to be Set up for the Names Table

| Line | Fields in Each Display Line | Position |
|---|---|---|
| 4 | 'Comment,98' | left |
| 5 | 'Initials,20' | left |
| 6 | 'Type,40' | left |
| 7 | 'Entry_date,90' | left |
| 8 | 'Date,10' | left |

After the user goes through the tour steps, the display-Setup creates a personal layout for the names table: (3, 1, 3, 'Sys_record_id, 20; Confirm_date, 20; App, 20', 'Firstname, 10; MI, 6; Lastname, 10', 'Email, 60; Company, 20', 'Comment, 98', 'Initials, 20', 'Type, 40', 'Entry_date, 90', 'Date, 10', ",", 'p', 'left', 'left', 'left', 'left', 'left', 'left', 'left', 'left', 'left', 'left', 14). This display layout record is for table_d=3 (the names table), group_id=1, and manager_id=1 (the user ID), it is for a personal layout, as indicated by "p," and the display font size is 14.

The system provides a reliable and proper default display layout ("system layout") so that each of the users should be able to view data from each of the data tables immediately after the data tables are setup. The main requirement is a default layout must be immediately available and reliable and has limited utility. A proper display layout may be (1) one-field-per-line layout fully within the web page intended width, (2) a conventional layout within the intended usable width or the intended web width under scrolling bars, or (3) multiple-row layout within the intended usable width of the web page. The default display layout may be one of them. The sFields( ), which is a method in server program for creating the web tables, is responsible for returning a default layout. The main purpose of sFields( ) is to fill recordsLine [j] position[j] where j=0 to N−1 (the number of display lines), fields[k], and fieldsSize[k], where k=0 to M−1. All data tables have eight system fields in the preferred embodiment, but they may be omitted in certain applications.

When the conventional display layout is used, all excessively large text fields may be displayed in reasonable field display lengths (in character number). For example, if the sum of the storage sizes or required field lengths for all data fields is more than the intended usable width of the web page, small necessary fields, dates, and integers are given necessary field lengths, but all large text fields are given reduced field lengths as long as the maximum lengths are consistent with their storage sizes. If a system uses a modified conventional layout, it returns a layout descriptive array consistent with the one-line display layout except that the large field size is reduced.

The one-field-per-line display layout is most reliable because it generally does not depend on discretionary decisions. When a field needs a field length, which is longer than the usable width of the display, the field can be displayed as text in a text area. In this case, the column number may be equal or less than the maximum display width of the web page, while the row number may be the integer from dividing its storage size by the maximum display width, subject to certain limit such as 5 rows. Each user can set up one or more display layouts and select one from all available layouts for any of the data tables. The third one is least reliable no matter how thoughtful the size-assignment logic might be. If a system uses one-field-per-line display layout, it just returns a layout descriptive array consistent with the one-line display layout. The display layout created by computer program may show abnormal view for some tables as a result of unique table structure. It should not be used if the manager routinely changes table configuration and uses highly unique tables.

sFields( ) first reads the table t1, the Changes table (or Event table). It gets the fields right after the $8^{th}$ row so that it gets all data fields but avoid getting system fields. It adds special fields Entry_date and Initials with recordLine [3]=2 if the intended view is a tentative table, or adds special fields Entry_data, Initials, confirm_data and App with recordLine [3]=4 if the intended view is a validated table. Those fields are added with appropriate fixed sizes. The data table is to be displayed in 4 display lines, each of the first three lines containing only one field and the last line containing four system fields. After execution, the method fills values for recordsLine[ ], fields[ ], fieldsSize[ ], and position[ ]. For a Changes table (Sys_record_id bigint(20), Sys_usr_id int (11), Sys_status enum('0','1','2'), Entry_date timestamp, Confirm_date timestamp, IP varchar(15), Initials varchar(5), App varchar(6), Events varchar(80), Date date, Comment varchar(300), a preferred display layout may be as follows:

TABLE 3

The Values of Layout Descriptive Arrays for a Default Display Layout

| Display Lines | Field Names | Display Lengths | Alignment |
|---|---|---|---|
| recordsLine[0] = 1 | fields[0] = Events | fieldsSize[0] = 80 | Position[0] = left |
| recordsLine[1] = 1 | fields[1] = Date | fieldsSize[1] = 10 | Position[1] = left |
| recordsLine[2] = 1 | fields[2] = Comment | fieldsSize[2] = 300 | Position[2] = left |
| recordsLine[3] = 4 | fields[3] = Entry_date | fieldsSize[3] = 20 | Position[3] = left |
| | fields[4] = Confirm_date | fieldsSize[4] = 20 | |
| | fields[5] = Initials | fieldsSize[5] = 10 | |
| | fields[6] = App | fieldsSize[6] = 10 | | sFields( ) treats system fields such as Initials, Entry_date, Comfirm_date, and App in a special way, depending upon the view and layout setup. Those fields are hidden in some user views, but show up in the manager views. Comfirm_date and App are not used in a tentative table because they are only for the validated records. Preferably, those system fields may be placed as neighbors and displayed in one single line to save space. To display four system fields in the fourth line, recordsLine[3] is set to 4. After all of the variables are set, a JSP program displays the table by using the default display layout. The method for applying a display layout will be discussed below.

Another major step is to apply a display layout to a data table when the view table is called to show the data for a data table on web page. This step includes four steps: (1) getting display preference from the users table, (2) retrieving the display layout definitions for the data table from the display table, (3) creating layout descriptive arrays, and (4) creating data records in format by using the display layout descriptive arrays.

The user's preference is set by the value of "view_layout" in the users table. The system reads the preference value from the users table. "View_layout" has values enum('p', 'm','s','d'), where 'd' default display, "p" for private display, "m" for manager display layout, "s" for system-set layout, and "d" for having no preference. This value serves as user's preference. The user can only set it for all data tables. If the system is implemented allowing the user to set preference for each of N data tables, the layout definitions may be implemented in a string like "ppppmmss", where the user uses personal layout for tables 1 to 4, group layout for tables 5 to 6, and the default layout for tables 7 to 8. The order of the letters is correspondent to the order of data tables sorted by their table ID numbers. This string should have a sufficient length for the maximum number of data tables.

The layout definitions are filled into several layout-descriptive array variables. The purpose of the variables is to define the sizes of fields in the column headers, the fields in each display line, and line positions or field positions in the display context on web page. Since record data is displayed on the web page, the variable carrying data is also discussed.

Record_Line[j]=Record_Line[0]; Record_Line[1]; . . . Record_Line[N-1]
   positions[j]=position[0], position[1], . . . position[N-1]
   fields[k]=fields[0], fields[1], . . . fields[M-1]
   fields_Sizes[k]=fields_Size[0], fields_Size[1], . . . fields_Size[M-1]
   record_Data[i][k]=record_Data[ ] [0], record_Data[ ] [1], . . . record_Data[ ] [M-1]
   (where for i=0 to P-1)

Those layout descriptive arrays are for defining P data records, with M fields, displayed in N lines. Record_Line[j] determines the field number for j=0 to N-1 display lines and position[j] defines the horizontal position for j=0 to N-1 display lines. The array fields[k] holds field names for k=0 to M-1 field names, which are used to print the column header and small print field identifiers in front of each field data on the web page. The fields_Sizes[k] (or "fieldsSizes[ ]") defines the field sizes (display length) for k=0 to M-1 fields. Field size is the display length on web page and is different from storage size in database. The record_Data [i][k] holds data for i=0 to P-1 data records from the data table and for k=0 to M-1 fields for each record. The server reads data from the data table in the i loop, the data array becomes an one-dimensional array on the JSP page. The layout definition may provide optional vertical position instruction. The total display line number, N, is smaller than the total field number, M. When all fields are displayed in one field per line, the display line number is equal to the field number (N=M). Additional arrays may be used to define other properties such as font size, font type, color, and font weights.

The layout descriptive variables may be two-dimensional arrays fields[j][k], fields_Sizes[j] [k], hposition[j][k], and vposition[j][k], where j=0 to N-1 display lines, and k=0 to the field number in each display line. Number of fields in a display line j is stored in Record_Line[j], where j=0 to N-1, and the field names are stored in fields[j][k], where j=0 to N-1, and k=0 to actual field number in the display line. If field names are used to print the small field identifiers in front of each of the data fields, field names may be stored in fields[j][k], where j=0 to N-1, and k=0 to actual field number in the display line. Since a data table has P records, the array for holding record data would in theory require a three-dimensional record_Data[i][j][k], where i=0 to P-1, j=0 to N-1, and k=0 to actual field number in the display line. However, since the server gets data in the i loop and the JSP program creating the layout gets data records one at a time, the server needs two-dimensional array record_Data [j][k] (where j=0 to N-1, k=0 to actual field number in the display line).

The data array and the field-name array share the same index. Field names are used to print the column header index and also used to retrieve the field data from the data table. When two-dimensional arrays are used, many of the arrays are not completely filled. The reason is that N fields can be allocated to one single display line, several display lines, and N display lines (one field per line). When this scheme is used, there is no need to keep track of the sequential order of the fields. Both the program that reads and processes the display layout records and the program that displays the table data must support the same scheme. When the program processes the layout record, it assigns fields[j][k] (where j=0 to N-1 and k=0 to the actual field number in the line) with null when it has no value. In printing the column header, the program exits the loop when it encounters null or when it hits the maximum number of the fields for the display line. Additional arrays may be used to define other properties such as font size, font type, color, and font weights. Those generic layout descriptive arrays may be used in any implementations and under any server environments, but many other variations may be derived from this concept as long as they can carry the required display layout information.

The system allows the user to change the display layout for any of the data tables on web pages. On each of those pages (tentative table, whole table, validated table, and Edit Table), there is a link for changing layout ("Change Layout"). This link is associated with the code <a href= "javascript:openLayoutSet('edit', 'member')." When the user clicks it, it opens a web form for setting layout. This form has hidden field flag and tableid, and a variable "layout." The "layout" variable has three options: s, m, and p, respectively, for system default, group layout, and personal layout. The "flag" value determines whether the page is one of tentative, validated, and whole table, or an edit table view. After the user selects an option, and submits the page to a server program, LayoutSet.java, together with table ID and flag="view." The program gets the value for "flag" and "layout" and saves the layout's value in the view_layout field for the user in the users table. The program then sends an updated page. The LayoutSet program uses response.setContentType( ). It prints a web page, which simply reloads the same page. If the flag is set to "view," it reloads the window. If the flag is set to "edit", it calls an Edit Table page using window.opener.location.href=jsp/[user]/editTableInText.jsp?tableid=5, where [user] may be user or manager. If the user starts the layout dialog from an Edit Table page, the flag would have the value "edit."

The display layout works with any database table and can be used with non-configurable data tables. In this case, the navigation buttons are permanently built in program files. The field names, field types, and storage sizes for each of the static tables can be directly written in a program, properties file or system file. The server can get field names, field types, and storage sizes from any of those sources or from the data table directly. Reasonable size may be provided for those fields having no size information such as date, time, integer, and float. The user can set up display layouts for static data tables by using the field definitions. The server can fill layout descriptive arrays using the layout records, and display a target table by using the data and the layout descriptive arrays. Non-configurable data tables may be displayed in a multiple-row display layout. All other functions such as sorting, searching, data validation, and data routing can be implemented. Table attributes may be saved in a system file, program file, and properties file, and even partially in data tables themselves.

In the preferred embodiment, all functions and features are implemented in a Java program BoardRecords and a JSP program ("view-creating program"). When the user tries to access a data table, it calls the view-creating program, which interacts with BoardRecords. One of the functions of BoardRecords is to determine the display layout based upon the value of view_layout in the users table (also "members table") and the related display records in the display table. This function is realized by the method, displayFields( ), which fills the layout descriptive variables according to the preference in the users table and available display layouts. If the view_layout uses a string as the settings of the default preference of the data tables, the program should get the letter for the specific table. displayFields( ) calls three methods: pFields( ), mFields( ) and sFields( ). pFields( ) or mFields( ) searches the display table for a display record for a data table, processes the record, and fills layout descriptive variables if a display record exists. In contrast, sFields( ) fills layout descriptive variables with the values for a default display layout.

displayFields( ) first reads the users table to get the value for preference of display layout. If the user does not select a group display layout and nor a default layout, it will try the personal display layout. If a personal layout ("user layout") exists, the program uses the personal layout. If no personal layout exists, pField( ) will return a false result. The program then tries to get a group display layout by trying haveFields=mFields( ). If it has a true value, the program uses the group display layout for the table. If it is false, the program then tries to use the default display layout by calling haveFields=sFields( ). A default display layout always exists. If view_layout in the users table is set to "m", the group layout ("manager layout"), the program tries to get the group layout. If group layout does not exist in the display table, it then tries to get a personal layout. The program uses the personal layout if a personal layout exists, or uses the default layout if no personal layout can be found in the display table. If view_layout in the users table is set to "s", the program returns the default display layout. By using this method, the system always finds a proper display layout to any data table.

The system, by sFields( ), pFields( ) and mFields( ), fill data into several layout-descriptive array variables. The purposes of those array variables are to get the display lengths for the column headers, the field names in each display line, and line positions or field positions in the display context on the web page. Since record data are displayed on the web page, the variable carrying data is also discussed. There are different ways to represent the display layout data, but generic display layout descriptive arrays are as follows:

| | |
|---|---|
| Data records | record_Data[i][k], for i=0 to P−1, and k=0 to M−1 |
| Record Line | Record_Line[j], for j=0 to N−1 |
| Positions | position[j], for j=0 to N−1 |
| Field names | fields[k], for k=0 to M−1 |
| Field sizes | fields_Sizes[k], for k=0 to M−1 |

When those variables are implemented as Java ArrayList, i is unnecessary.

The method sFields( ) for creating a system layout fields, fieldsSize, and recordsLine. It gets all fields from the data table by using "desc table_name." It gets the field names, and field size from storage size, which can be identified by the brackets. The program assigns an arbitrary size for variables such as Date, Integer and anything that do not have numerical storage size. It then adds field name, field size, line and position by using fields.add(Field), fieldsSize.add (StringSize), recordsLine.add(1), and position.add("left"). The program may specially threat Entry_date, Confirm_date, Initials, and App fields. If the operation is successful, it returns true.

If the user has set up with a personal display layout and if the manager's preference is a personal layout, displayFields( ) calls the method pFields( ) to fill layout descriptive variables. To fill the display layout descriptive variables, it first retrieves all lines, line1, line2 . . . lineN, all positions, position1, position2, . . . positionN, and font size for the target table and the user from the display table. The program goes through the lines in a loop, and gets fields names and field sizes for each of the line. It adds fields and field sizes to an arrayList by using fields.add(fieldname) and fieldsSize.add (fieldsize) for each of the lines. In the loop, it may skip non-displaying fields such as confirm_date. At the end of each lines, it adds recordsLine.add(fieldnumber) and position.add(alignment) once for each line, as shown in the above table. The algorithm in mFields( ) is substantially same as that of pField( ) except that mFields( ) processes a group layout. It processes display record for the whole group and only the manager (status=m) can create the display layout for the whole group to use.

For the display layout for the names table, (3,1,3, 'Sys_record_id, 20; Confirm_date, 20; App, 20', 'Firstname, 10; MI, 6; Lastname, 10', 'Email, 60; Company, 20', 'Comment, 98', 'Initials, 20', 'Type, 40', 'Entry_date, 90', 'Date, 10', ",", 'p', 'left', 'left', 'left', 'left', 'left', 'left', 'left', 'left', 'left', 'left', 14), pFields( ) fills values for RecordsLine[ ], fields[ ], fieldsSize[ ] and position[ ] as follows:

TABLE 4

The Values of Layout Descriptive Arrays for Personal Display Layout

| Display Line | Field Names | Display Lengths | Alignment |
|---|---|---|---|
| recordsLine[0] = 3 | fields[0] = Sys_record_id | fieldsSize[0] = 20 | position[0] = left |
| | *fields[1] = Confirm_date | fieldsSize[1] = 20 | |
| | *fields[2] = App | fieldsSize[2] = 20 | |
| recordsLine[1] = 3 | fields[3] = Firstname | fieldsSize[3] = 10 | position[1] = left |
| | fields[4] = MI | fieldsSize[4] = 6 | |
| | fields[5] = Lastname | fieldsSize[5] = 10 | |
| recordsLine[2] = 2 | fields[6] = Email | fieldsSize[6] = 60 | position[2] = left |
| | fields[7] = Company | fieldsSize[7] = 20 | |
| recordsLine[3] = 1 | fields[8] = Comment | fieldsSize[8] = 98 | position[3] = left |
| recordsLine[4] = 1 | fields[9] = Initials | fieldsSize[9] = 20 | position[4] = left |
| recordsLine[5] = 1 | fields[10] = Type | fieldsSize[10] = 40 | position[5] = left |

TABLE 4-continued

The Values of Layout Descriptive Arrays for Personal Display Layout

| Display Line | Field Names | Display Lengths | Alignment |
|---|---|---|---|
| recordsLine[6] = 1 | fields[11] = Entry_date | fieldsSize[11] = 90 | position[6] = left |
| recordsLine[7] = 1 | fields[12] = Date | fieldsSize[12] = 10 | position[7] = left |

*Note: The confirm_date and App fields are added for a validated table but not for a tentative.

Some fields such as date and enum, date, and integer do not have numeric values for defining their storage sizes. The program cannot get their sizes from field data. They must be given reasonable spaces on the web page. The code for generating a group layout for a data table is substantially same as the code for the generating personal display layout.

This method, mFields( ), differs from the pFields( ) in a where clause of SQL statement. The method retrieves group display layout record. Assuming that the user has the display layout record for the names table for the group: (3, 1, 1, 'Firstname, 20; MI, 2; Lastname, 20; Type, 10; Email, 30', 'Company, 90', 'Comment, 180', 'Sys_record_id, 10; Entry_ date, 10; Confirm_date, 10; Initials, 5; App, 10', ",", ",", ",", 'm', 'left', 'left', 'left', 'left', 'left', 'left', 'left', 'left', 'left', 'left', 14). The 12 fields are allocated to four display lines. The first line has five fields, the second and third line has one field each, and the last line also has five fields. After execution, mFields( ) fills values for recordsLine[ ], fields[ ], fieldsSize[ ] and position[ ].

After the display layout descriptive arrays are filled, the view-creating program then applies the layout to the data records on the web page when it create the web table. In displaying the fields, the program runs three loops. The outer loop goes through all records. The middle loop goes through the display lines (also "record line"), from j=0 to N−1 (the line number). For each display line, the program goes through the field names, from k=0 to recordsLine[i]−1 (the field number per line). The code keeps track of the fields by using a cumulative index m. The middle and inner loops may be illustrated by the following pseudo code:

```
int m=0;
for (j=0; j<DisplayLineNo; j++) {
   for(k=0; k< recordsLine[j]; k++){
   print field[m];
   print recordData[m] (using fieldsSize[m] to determine the display space);
   m++;
   }
   [Print the HTML code for changing line]
}
```

For the "group layout" discussed above, the program prints the following 12 data fields data:
   For j=0, 0 to recordsLine[0]=4, it prints recordData[m], m from 0 to 4
   For j=1, 0 to recordsLine[1]=1, it prints recordData[5]
   For j=2, 0 to recordsLine[2]=1, it prints recordData[6]
   For j=3, 0 to recordsLine[3]=4, it prints recordData[m], m from 7 to 11
   FieldsSize [ ] determines the display space on the table and position[ ] determines the horizontal layout. After the program goes through the three loops, it results in a display layout. While code may be implemented in various ways, it must achieve the above layout.

The view-creating program contains <jsp:useBean id="BR" class="dforum.BoardRecords"/>. It then declares an ArrayList for records, fields, recordsLine, fieldsSize, position, and other necessary variables for page navigation and user session. It gets value by using records= BR.getRecords( ), fields=BR.getFields( ), recordsLine=BR. getRecordsLine( ), fieldsSize=BR.getFieldsSize( ), position= BR.getPosition( ), and fontSize=BR.getFontSize( ). The number of records is the number of records that will appear in the view. It first creates a cell header by using the fields and fieldsSize by using a loop and those cell headers are also the link for sorting. If the Java program gets no records from the database table, it sends a page containing the message that the data table contains no data. The HTML code for displaying a table in a view contains three loops: for(int i=0; i<records.size( ); i++), for(int j=0; j<recordsLine.size( ); j++) and for(int n=0; n<(Integer)recordsLine.get(j); n++, m++), where m is an accumulator as an index within a record. The outer i loop goes through all records to get individual record data. It gets records by ArrayList rcd= (ArrayList)records.get(i). If the web page is a whole table, it gets all data records. If the page is a tentative table, it will skip the all validated data records if the BoardRecords returns all records, or it get all records if the BoardRecords returns only tentative records. For each of the records, the program prints a small left-side cell, which may be in different colors for tentative records and validated records. If the table is set up with a vote method, the background color of the left cells may be marked in different colors, respectfully, for user-voted records, others-voted records, and non-voted records.

For each of the records, the view-creating program goes through all display lines from j=0 to recordsLine.size( )−1. If the table has five display lines, the program will go though all five lines one by one. For each display line, the program will go though all data fields from n=0 to n<recordsLine.get (j)−1. If the display line has three fields, it will go through the three fields. The field names are used as field names or unless correspondent numeric number are used to save space, the field sizes are used to define the horizontal spaces of data fields on table. The position defines if the whole line should be alighted to left, center, or right within the span of the display area. It keeps track of the fields within each display line j. In addition, a cumulative counter m is used to keep track of the data field. All field data are allocated to all display lines.

7. Method of Generating Web Pages for Configurable Data Tables

Figure 8H:
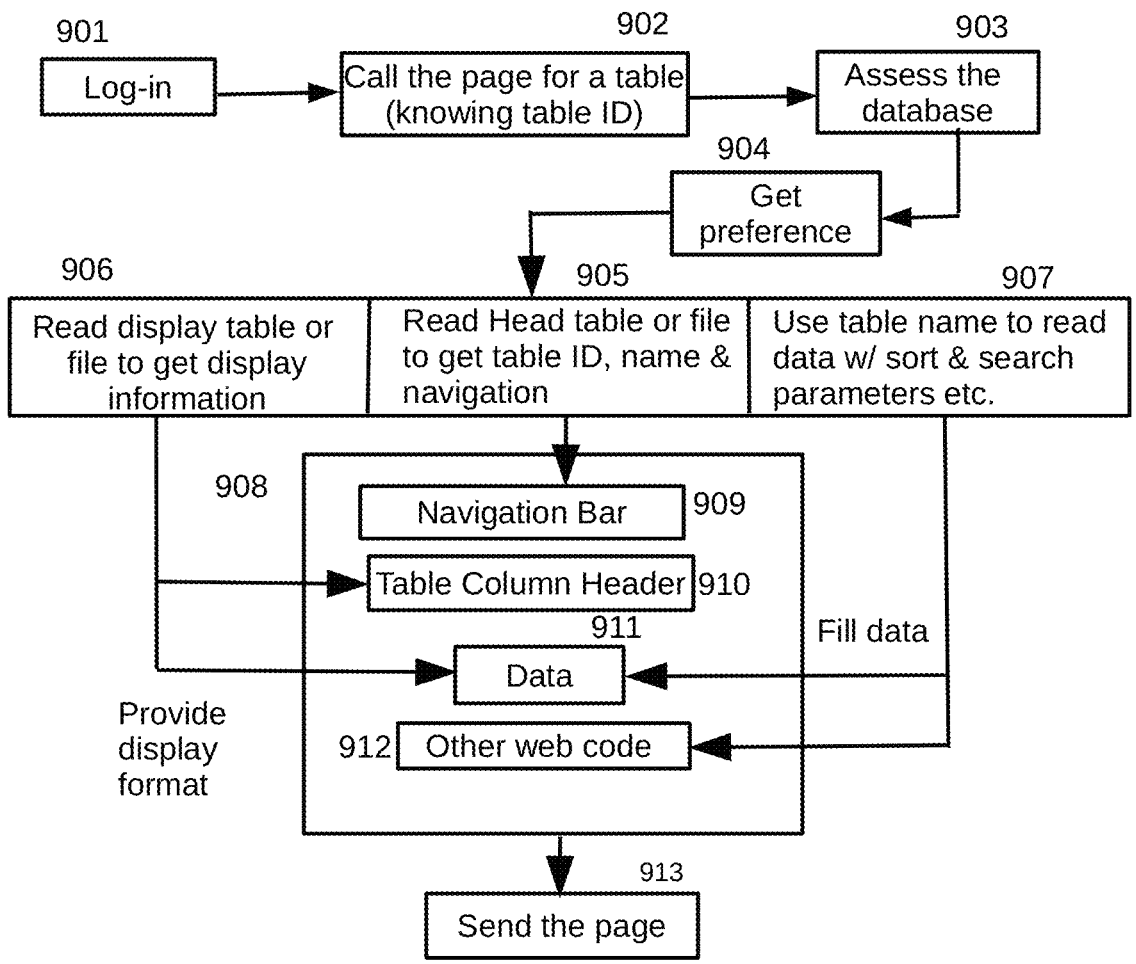
FIG. 8H is a flowchart showing the steps of creating a web page using a display layout for a data table.

The main functions of the system are realized by using special tables: Head, display, suggest_source, records_cricunstanese, groups, and users. FIG. 8H shows the major steps of creating web page for any data table. When the server generates a home page, it uses the navigation names to create navigation buttons, each being associated with a proper hidden table ID and thus the database table name. A user starts by logging in the server at Step 901, clicks the link or button to view a data table at Step 902. The server accesses the database at Step 903, gets the value of view preference from the users table at Step 904, gets from the Head table the values for table ID, table names, navigation names, validation method, validation route, data edit rule, history table flag, table data flag, and board status at Step 905. The server uses the display preference and the table ID to retrieve a display layout for the user for the data table at Step 906. In this step, the server tries to use a preferred layout. If a preferred display layout does not exist, the server tries to use a display layout in the preference order of personal layout, group layout, and system layout. Whenever the server finds a layout, it fills layout descriptive arrays with the values from the layout record to be used. The server also uses the table ID to construct a database table name, uses the database name together with default sorting and page size control parameters (i.e., page size) to retrieve data from the data table at Step 907.

In building the web page 908, the server uses the navigation names from the Head table to build the navigation bar 909 to be placed on the top of the web page. The server creates column headers by using the layout descriptive arrays at Step 910, and uses the retrieved data from the data table and uses them in printing data records in a proper web format defined by the layout descriptive arrays at Step 911. Among the layout descriptive arrays, fields[ ] is used to print column headers and optional small field identifies, recordLine[ ] is used to allocate the fields in each display line, and fieldsSize[ ] determines the display length of field data, and position[ ] determines the horizontal position of each display line on the web page. The server creates other HTML code and embedded script to implement other functions such as Edit, Delete, Validate, Validate all, Vote, Revoke, Sort, Search at Step 912. After the page is generated, the server sends it to the client computer for rendering at Step 913. After the page is rendered, the user can change the initial default values for many variables such as display page, page size, sorting key, and search keys.

The system allows the user to set up both tentative table and whole table as validation page. When the system is so set up, validated records are lodged in the validated table, tentative records in the tentative table, and all records in the whole table. Validation may be performed in either the tentative table or the whole table. However, validated data and tentative data may be stored in two different database tables as long as all related programs are properly modified. General method of retrieving data from a database table may be used to replace the specific method of retrieving the data. Also, known methods of saving data in a database table, retrieving data from a database table, and displaying data from a database table can be used to substitute the specific implementation.

In a preferred embodiment, the relationship between table names and the entries in the Head Table is established by table_IDs and database table names, which are formed by prefix "t". It is understood that the relationships can be established and maintained by using common table names as long as they are unique in the database. Use of common table names is not convenient when the system runs a plurality of projects because the table names used by one group cannot be used by a second group. In the preferred embodiment, the table ID is implemented with auto increment integer. If for any reason, the entries in the Head table are not consistent with the actual data tables, the system may, but not always, malfunction. A privileged user can check the Head table's dump file and the database dump file to see if they are consistent. Inconsistency can happen as a result of failed attempt to reset the system. An error may happen as a result of using configuration tools improperly. For example, improper table name, navigation name, and field name are provided in resetting the work environment. Whenever an existing data table is not listed in the Head table or an entry exists without a corresponding data table, the administrator should ensure that all data tables are consistent with the entries in the Head table. A system tool can be used to delete from the Head table the entries that are not associated with any data tables and to drop a data table that has no correspondent entry in the Head table. If the "addition" and "addition2" are spurious, they can be deleted at the server's terminal. If the database has a spurious table t24, the table can be dropped from server terminal. A client tool may be developed for deleting any data table not pointed to by any record in the Head table, and any entry in the Head table pointing to non-existing data table.

After the Head table has been used for a long time, it may be necessary to reset the system. When the table Id number is too large, it may be necessary to restart the table id number. Resetting project for a project group cannot reset the table Id numbers. When the system is configured using a default configuration file or user's configuration file, the board-id (table ID) will not restart from the lowest number. To restart the table ID in the Head table, the administrator issues "Drop Head" and then deletes data tables by issuing a series of commands: "drop table t1", "drop table t2", and "drop table tn." After this operation, the Head table contains no entry, the table ID will restart from 1, and the navigation bar will be reset to the initial setting.

There might be situations where resetting table is not proper, but there is a need for restarting the table ID. This can be achieved through dropping the board_id field and then using the "alter the table" to add the ID field back with the same attributes. This will renumber the table ID in all entries. Because table IDs are changed in the Head table, the names of data tables should be changed as well. This can be achieved by exporting data from data tables to dump files, and then import them back to the tables containing the same table structures. A solution to part of the problem is to conduct validity check for the table structures in the configuration file and provided in interactive table setup. The browser should detect improper length and impermissible characters before the page is submitted. A script embedded on the setup page may limit their lengths to specified values.

Figure 8I:
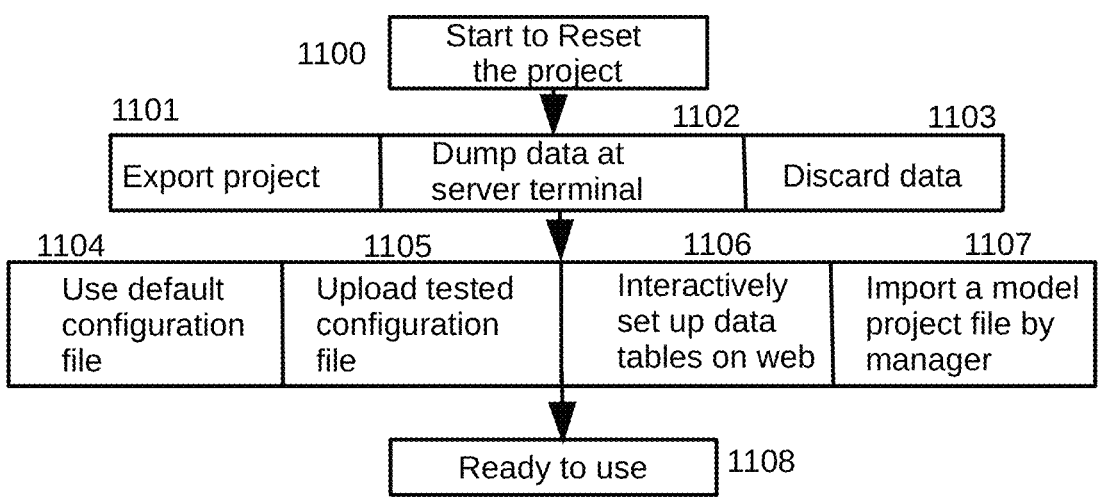
FIG. 8I is a flowchart showing the steps of changing table configuration for the project group.
Figure 8J:
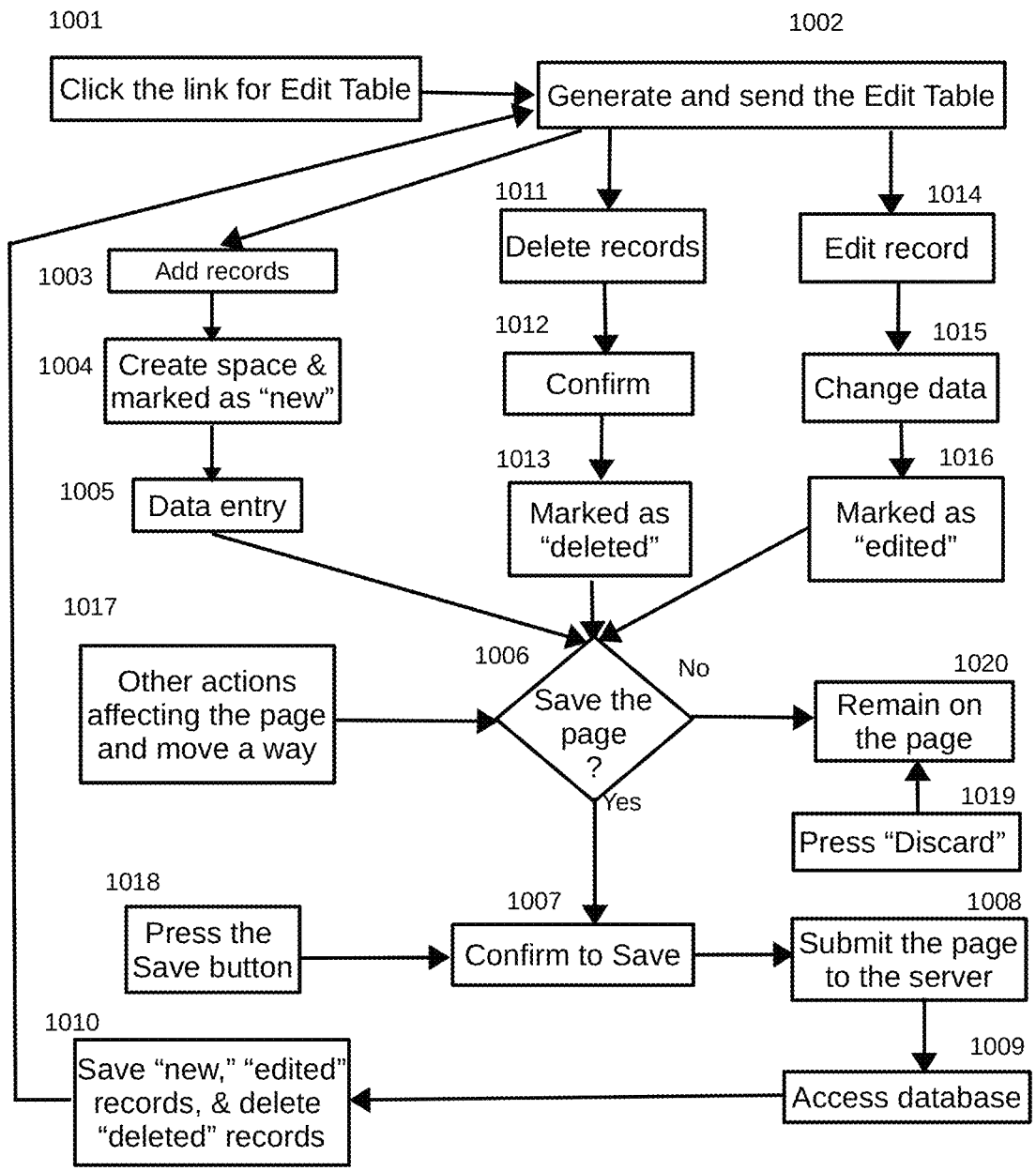
FIG. 8J shows the interactions between different functions on the "Edit Table" page.

The methods for changing the project setup and data tables are summarized in FIG. 8I. A privileged user has option to preserve project data by exporting the project at Block 1101, dump data at the server terminal at Block 1102 or discard project data at Block 1103. To reset the system, the user can use the default configuration file or one of the default configuration files on the system at Block 1114, upload a pre-tested configuration file at Block 1105, drop tables and create new tables under the "Setup Tables" menu at Block 1106, and import a model project at Block 1107. Before the system is used, it is preferable to save a copy of project data by exporting it, or dumping the entire database if the user runs and own system.

8. Edit Table Page for Configurable Tables

The Edit table page is shown in FIG. 7J. If a record in the table has five fields, it has five editable boxes. Each of the data fields is shown in one editable input box. On the left of each of the records, there are three very small menu icons respectively for copying, pasting, and deleting records. Each of the icons indicates its function whenever the mouse is moved over it. Data can be copied from any existing record and pasted onto any exiting record owned by the same user. At the top and bottom are two buttons: "Save Changes" and "Discard Changes." The page also has a page size control bar. The column name is also a link for sorting the table using the field as a sorting key. When data access rule is set up with private edit, the user can edit or delete only his invalidated records on the page. The data access rule controls all data tables. To make permanent changes to the database table, the user clicks the "Save Changes" button to have changes saved. If the user does not want to save the changes, the user can click the "Discard Changes" button. Use of the search function would cause the server to retrieve the data records, reconstruct a web page, and thus discard unsaved changes. An embedded script throws a warning message whenever the user tries to do anything that causes the server to discard the changes. The user cannot edit, change, and edit tentative records of other users. The user can view and copy inactive tentative records, and paste them onto new records. When edit_table_display_scope is set to "1", validated records also appear in the table. They can be viewed, and copied for paste and modification unless the data access rule is set to private edit. The user can use search tool at the top and the page size control bar to find data records on the Edit Table page.

FIG. 8I shows the how the different functions interacts on the edit table page. When the user clicks the Edit Table link at Step 1001, the server sends the edit table page (FIG. 7J) at Step 1002. The user can add new records at Step 1003, delete records at Step 1011, and edit records at Step 1014. To enter data, the user first creates a block of input boxes at the end of the table by clicking the "Enter Record" bottom at Step 1004. The user types data into the boxes and save the record by pressing on the "Save Change" button at Step 1006. The user copies data from an existing record to this empty record or editable records and save it. When the user submits the page to the server, the web page prompts the user to confirm if changes should be saved at Step 1006. If the user clicks "Yes" at Step 1007, the form is submitted to the server at Step 1008 where the data are retrieved. It then accesses the database and saves the newly entered records in the data table at Step 1010. To delete a record, the user clicks the Delete icon on the left of the records at Step 1011, the record is deleted from the table on the web page upon confirmation at Step 1012, but has not been deleted from the data table. The browser marks the record as "deleted" at Step 1013. The user may click the Save button to submit the page to the server at Step 1018 or press the Discard button at Step 1019 to abandon the changes. If the user does not press the Save button, nor the Discard button, but tries to move away from the page, the user is prompted to save the changes or discard the change at Step 1006. If the user chooses to save the changes at Step 1007, the browser submits the page to the server at Step 1008, and the server retrieves the data and saves the changes at Step 1010. Otherwise, the browser will remain on the page. The user can edit data in any of the displayed data fields at Step 1015 and the browser marks those records as "changed" which would cause the browser to prompt the user to save or discard when the user tries to move away from the page.

When an Edit Table page is submitted to the server, the server knows which records are new, edited and marked for deletion. The server saves new records, updates existing records, and deletes the records marked for deletion at Step 1010. It then calls the same JSP page with the same retrieving parameters to show an updated page, going back to Step 1002.

The server program, EditTableRecords, for generating data for the edit table view is similar to the server program, BoardRecords, for generating data for any of the three view tables. They take care of a few common functions such as data retrieval, display, sorting, and navigation system. The JSP program for generating the edit table view is EditTableInText.jsp. They are different in editing, deletion, voting, revoking, and searches. EditTableInText.jsp uses a unique program, SaveTableChanges, to save data.

The Edit Table web page contains a form containing the code: <form id="editForm" name="PageForm" action="/dforum/jsp/member/editTableInText.jsp" method="post" onsubmit="return checkForm( )" onkeydown="return getSrcElement(event)"> . . . . The web page is submitted to editTableInText.jsp by default. It also contains name and value for necessary variables such as maxPage, boardid, orderby, orderbytype, cxtPath (a program file path), columnSize, copyData, FactoryName, BeanName, fontSize, textareaCols, validateMethod, recordsLine, and position, where FactoryName is dforum.BoardSuggestFactory and BeanName is dforum.javabean.BoardSuggestBean.

The rest of variables are self-evident. The web page, which had been generated by editTableInText.jsp, contains the code for "Discard Changes" and "Save Changes" functions: <tr><td align="center" height="50" valign="bottom"> <input type="submit" name="save" value="Save Changes" I><input type="button" name="discard" value="Discard Changes" onclick="document.PageForm.submit ( );" /></td></tr>. A script is embedded on the web page: checkForm( ){var cxtPath=document.getElementById("cxtPath").value; document.PageForm.action=cxtPath+"/editTable.jsp"; return true;}. Here, editTable.jsp is actually "SaveTableChnages." editTable.jsp is mapped by a statement in the web.xml: <servlet-mapping><servlet-name>SaveTableChanges</servlet-name><url-pattern>/editTable.jsp</url-pattern></servlet-mapping>.

The Edit Table web page allows the user to conduct three types of searches: search Id, search date ranges, and search key. For document ID search, the relevant code is "<input type="text" name="fromRecordId" value=" " size="5"> To<input type="text" name="toRecordId" value=" " size="5"><input type="button" value="Go" size="4" onclick="searchRecordId(this.form)" >   </td>. When user types in documents Id in the two boxes and clicks on the search button, it calls "searchRecordId (this.form). SearchRecordId( ) checks the state of the page and alerts the user if the data have been changed. If the web page has been affected by edits, deletion, and addition, it prompts the user to save the changes. If no data is changed, the function then determines if the two records Ids entered in the search input boxes are good. If they are good, it calls the function goSearch(frm, "recordId"). GoSerarch re-sets page no and page size to null (frm.-pageNo.value=" " and frm.pageSize.value=" ") and assigns the search method with the current search method, and call "frm.submit( )" to have the form submitted to editTableInText.jsp, which creates an updated web page using the designated search method and search keys. editTableInText.jsp calls dforum.EditTableRecords class, which is implemented with search and sort function and all necessary methods. It can create a new edit table page except the new web page is generated with new search keys. The other two search functions are implemented in same ways. The only difference is that user action triggers searchDate(frm) for date search and searchBaseField(frm) for key search. They conduct respective date validity check and search key validity check before calling GoSerarch, which make the final submission.

Whether the content is edited or not, the user can discard the changes. If the user clicks "Discard" button, the page is submitted by "onclick=document.PageForm.submit( )" in the input statement. If the edit table page has been edited and if the user clicks the "Save Change" button, the browser calls CheckForm( ), which changes the action program to EditTable.jps, which is actually SaveTableChanges. This server program first gets values from the submitted page for delRecords, updateFields, and other variables (pageSize, pageNo, totalNo, orderby, orderbytype, searchkey, boardid, fields, fieldType, fieldMax, and tableName) by using request.getParameterValues. It then gets newRecords by statement "for(int i=0;i<fieldsSize;i++){if(request.getParameterValues("i_"+i)==null)break; newRecords[i]=request.getParameterValues("i_" +i);}" The server then gets a session object, and gets the role of the user.

SaveTableChnages makes connection to the database, adds new records to the database table if newRecords is not null, updates changed records in the table if updateFields is not null, and deletes "deleted" records if delRecord is not null. If a record with a voting record is deleted, it deletes the records from the records_circumstance table. After all changes are made, SaveTableChnages checks if the table still has any record. It sets has_records to "No" if it has no record, and sets it to "Yes" if it has records. After closing the connection, SaveTableChnages finally send the page jsp/member/editTableInText.jsp that is the value of "gotoPage." editTableInText.jsp declares all variables and gets values for the variables from an EditTableRecords object by using set-methods and get-methods. This server program contains the code for getting values of board_name, board_status, access_rule, edit_table_display_scope from Head table, code for processing the display layout and fills the layout descriptive variables, and code for retrieving data records by using any of selected search method and sorting method. editTableInText.jsp gets values for all necessary variables including Fields, FieldType, RecordsLine, FieldsSize, Position, FontSize, DateFields, Base-Fields, TextareaCols, Max-Page, TotalNo, Boardname, and Boardstatus, and get data records. It constructs navigation buttons, builds an edit table page, and sends the page reflecting the changes.

9. Editing, Voting, Deleting and Search Functions for Data Tables

The system allows the user to edit a plurality of records, vote to validate tentative records and delete tentative records. In implementation, the web page of a tentative table contains the line: <form name="PageForm" action="/dforum/jsp/member/loggingBoard.jsp" method="post" onsubmit="return checkForm( )">. When the user selects 3 records and clicks the "Delete" button, it changes action program by the code <input type="submit" name="delete" value="Delete" onclick="changeAction('/dforum/deleteEntry', 'dl')"/>. Upon submission, script checkForm( ) determines whether the user has confirmed any of the three operation. For a deletion operation, bt="dl", the pop-up asks the user to confirm the deletion. If the user confirms it, it proceeds with deletion by deleteEntry. Otherwise, the form will not be submitted to the server. The "Enter" button for calling the page for entering records works independently from the check boxes, and, therefore, the above program does not have an entry for it.

The server program, deleteEntry, first gets the values from the web page, constructs an SQL statement for deleting all selected records by ID numbers. It allows the user to delete the records if the data access rule is public, the user is a manager, or the user is the owner of the records. It will do nothing for the records that the user has no privilege to delete. It is understood that the program may be changed to include a feature of sending a message that the user lacks the privilege to delete specific records. After the deletion, the program checks if there is any remaining record in the table. If the tentative table still has records, it will resend the same tentative table. If no record remains, it marks the data table as having no data records, and then it may call a whole table or a validated table.

If the user selects 3 records and clicks the Edit button by using the page in FIG. 7I, it invokes the action by the line <input type="button" name="edit" value="Edit" onclick="editRecord('member')"/>. The editRecord sends an edit page containing the following code:

```
<form name="frm" action="/dforum/EditRecord" method="post"
onsubmit="return checkForm( )">
    <input type="hidden" name="boardId" value="4" />
    <input type="hidden" name="recordId" value="212,211,"/>
    <input type="hidden" name="curRecord" value="213" />
    <input type="hidden" name="JspName" value="jsp/admin/
    editRecord.jsp" />
```

The record Ids of the records to be edited are passed to the server by a hidden field, name="recordId" and value="212, 211". After the current record ID=213 is edited by the manager and the form is submitted to the server program, EditRecord.java, the server saves the edited record ID=213 by using dbhandler.executeUpdate(sql.toString( ), and then the program calls the same JSP page, EditRecord.Jsp. The code on this page gets the recordId value="212,211", gets the first number 212 as the currentId, and uses remaining sub-string (with one fewer id number) as the recordId value. It then calls showField.java to access the Head table to find the name of the data table and record status, and calls oneRecord.java to retrieve from the data table the data for the current record ID="212", and displays the data record on the page for edit. This program may also determine if the user is allowed to retrieve the record. It finally generates a web page, which contains a hidden field: name="recordId" and value="211" and another hidden field: name= "curRecord" value="212". By repeating this process, the user can edit the selected records successively.

When the user chooses plural records for vote, it changes the action by the code <input type="submit" name="vote" value="Vote" onclick="changeAction('/dforum/ConfirmEntry', this.name)"/>. Thus, a script on the browser prompts the user to confirm. Upon confirmation, it proceeds to change vote status. Otherwise, it will do nothing. It is understood that the program can be modified to include a feature of sending a message that the user has already voted. When records have been voted, the color of the records in the left margin (the field number and cell background) changes, indicating their voted statuses. If the user revokes her vote, the color will be changed back to the original color. It is preferable that two distinctive colors are used to distinguish the records voted by the user and the records voted by other users. By modifications, the edit record page may contain buttons for validating and editing records, and thus a privileged user has an option to edit a record only, validate a record only, and edit and validate a record without the need to open additional web page.

The tentative table, whole table, and manager's web pages have the function of showing voting status by moving mouse over the record ID number or the first field. This features is realized by the table: create table 'records_circumstance' ('board_id' int(11),'record_id' int(11),'usr_id' int(11), 'vote_status' enum('0','1','2','9','10') default '0', 'vote_date' varchar(100), 'revoke_date' varchar(100), 'access_date' varchar(100), key 'board_id' ('board_id'), constraint 'records_circumstance_ibfk_1' foreign key ('board_id') references 'head' ('board_id') on delete cascade) engine= innodb default charset=latin1. Vote_status has the values ('0','1','2','9','10'), where 0=no action taken", 1=voted, 2=revoked, 9=validated by manager, and 10=validated by vote. Vote_date, revoke_date, and access_date can store a plurality of dates each.

When users submit a vote on a validation page, the browser shows "Records List 2: The records have passed validation. You can find them in the validated table." For this record, it has the value (2, 2, 3, '10', '2011-07-05 19:58:15', null, null), reflecting the status of being validated by vote. If a user (Id=2) voted and then revoked it, the server results in a record: (3, 2, 1, '2', '2011-07-05 20:15:37', '; 2011-07-05 20:16:34', null) where status=2 means "revoked." The record (3, 2, 1, '2', '2011-07-05 20:15:37; 2011-07-05 20:18:16', '; 2011-07-05 20:16:34; 2011-07-05 20:20:50', NULL) suggests that the user (id=2) have voted twice, and revoked twice with a final status of "revoked."

The edit table page also contains relevant code: <td style=" " align=" " onmouseover="controlDiv(this, '2', 'T')" onmouseout="setDivHidden( )"> <span>1</span> <input class="textborder" style=" type=" value= "field-data" size="100" readonly></td> . . . . When mouse is moved over the number and the first data field, the browser shows the voting status (as in FIGS. 6A, 6B.) At this point, the browser calls controlDiv(this,'2','T'), which has the following code: function controlDiv(TD,recordId,record-Status){

```
function controlDiv(TD,recordId,recordStatus){
    initVars( ); curTD=TD; var ajax=new Ajax( );
    ajax.setRequestURL(cxtPath+"/SuggestServlet?boardId="+boardId+
    "&recordId="+recordId+"&recordStatus="+recordStatus+
    "&FactoryName="+FactoryName+"&BeanName="+BeanName);
    ajax.sendRequest(null);
    window.setTimeout("handleResponse(ajax);",100);
}
```

This function calls SuggestServlet with table ID and recordId, which then searches the records_circumstance table to get data. It uses the following function to process data:

```
function handleResponse(ajax){
    var items=Array( ); var votes=Array( );
    var res=ajax.getResponseXML( );
    items = res.getElementsByTagName("item");
    votes=res.getElementsByTagName("vote");
    handleDatas(items,votes);
}
function handleDatas(items,votes) {
    clearDiv( );
    if(validateMethod.indexOf("vote")!=-1)addVotes(votes);
    if(items.length>0)addAccessInfo(items);
    if(items.length>0||validateMethod.indexOf("vote")!=
    -1)setDivVisible( );
}
```

It gets items and votes from an ajax object from the server, fills the items and votes arrays, adds votes and access information, and sets divisions visible as in FIGS. 6A, 6B. It has many functions such as initVars( ), addRow(item, table), calculateOffset(field) (for each side), setDivVisible ( ), etDivHiddenO, clearDiv( ), addVotes(votes), addAccess-Info(items) (for the user initials in the small table view). Ajax scripts and supporting programs can be adapted from known applications to implement those functions.

The data entry forms has a feature of displaying confirmation message on the same data entry page. If the server finds no error, the server writes the record, and responds with a success message on the top region of the same data entry form for entering next record. If the server encounters an error, it displays an error message. The operation scope of Edit and Delete on data records are different from the scope of Vote and Revoke. The server uses different criteria to determining validating privilege and voting privilege for tentative records. One method is to place a check box for all tentative records. In this case, the user can check records of others for validation purpose, but may have no privilege to edit and delete them. The difference must be handled by the server problem. Another method is to place a check box in front of each tentative record only if data edit rule is public, the user is the record's owner, or validation method is the voting method. It does not place a check box for the record of other users if neither voting validation nor public edit is required. To avoid this operation scope inconsistency, the system may use two series of checking boxes, one for Edit and Delete, and the other for Vote and Revoke. Also, the voting function may be directly placed as a link "Vote" for all proper records and a "Revoke" is placed for all records voted by the user.

Record statuses are marked by the values in their status fields. They change upon validation. Any suitable method may be implemented to mark the two kinds of records so that they can be easily identified. For example, the background color in the cell containing the front check boxes may be marked in black for tentative records and in green for validated records; the first field index number, 1, may be marked in black for validated records and in red for tentative records; and their validated status may be shown in infotip, which shows the status by moving mouse over it. The marking scheme should distinctively differentiate records that the user has voted, the records other users have voted, and the records nobody has voted. Server tools for changing the statuses of records may be used to move data records from one view to another. If there is a need for revisiting validated records, the manager uses the "Remand" tool to send validated data records to the respective tentative table for edit.

The search function is part of the server program, BoardRecords.java and EditTableRecords, for generating data for displaying data records. The program also has a method, SearchRecords( ), for generating the segment of SQL statement for conducting search and sorting. The only unique feature in this search method is that the program can specially handle the type for the names table. It must recognize four integer values as respective types: law firm, client, partner, and other. It also gets the voting status for each of the records. By executing the search method, the server first gets the search keys in one string, and the fields to be used as a sorting key. The server splits the keys by space and uses them as alternative search keys. It constructs a wheresentence "and (first_field like '% key1%' or like '% key2%' second_field like '% key1%' or like '% key2%' . . . last_field like '% key1%' or like '% key2%')." The entire SQL statement looks like select Sys_usr_id, Sys_status, Sys_record_id, [a list of selected fields] from to where Sys_status in ('1','2') and (first_field like '% key1%' or like '% key2%' second_field like '% key1%' or like '% key2%' . . . last_field like '% key1%' or like '% key2%') order by orderbytype limit pagesize (pageNo−1), pageSize In the above illustrative SQL statement, Sys_usr_id is included on the view tables for project managers. The selected fields are the fields to be displayed. The table name, tx, is formed by attaching prefix "t" to the table ID. Sys_status="0", Sys_status in ('1','2'), and Sys_status in ('0','1','2') can retrieved data records, respectively, for validated, tentative, and whole tables. The server adds Sys_record_id to the fields if it is not in the fields. Each of the view tables requires the support of the JSP program for creating it. The wherefield holds a portion of SQL for conducting search and sorting. By changing this portion of the code, the search and sorting method can be changed. For example, the search may be performed by using a plurality of keys in user-selectable logic such as "and" and "or". The web page showing a validated table contains the following HTML code:

```
<form name="PageForm" action="/dforum/jsp/member/
permanentBoard.jsp"
method="post" onsubmit="return checkForm( )"><input type="hidden"
name="maxPage" value="0">
<input type="hidden" id="boardid" name="boardid" value="6" />
<input type="hidden" name="orderby" value="Entry_date" />
<input type="hidden" name="orderbytype" value="desc" /> . . . </form>
```

Other hidden fields include name="cxtPath" value="/dforum"; id="FactoryName" name="FactoryName" value= "dforum.RecordCirFactory"; id="BeanName" name= "BeanName" value="dforum.javabean.RecordCirBean"; id="validateMethod" name="validateMethod" value= "manager". The web page also contains, for example, a code statement: <td class="boardtabletd2"><a href="#" onclick= "javascript:sqlorderby('Date')"> Date </a></td> associating with the column header Date. When the user clicks the column header "Date" on the web page, it calls a script function sqlorderby(ob), which is responsible for passing the values used by the sorting function. "Orderby" is a field name selected by the user on the view table generated by permanenBoard.jsp. When the user clicks any column header, the script assigns ASC (ascending) or DESC (descending) to "orderbytype" and assigns the field name to "orderby." After the page is submitted to the JSP program (e.g., permanentBoard.jsp) for sorting and search, the program gets the value of "orderby" the value of "orderbytype", and the value of "searchkey" by using a series statements like "if(request.getParameter("orderby")!=null) orderby= request.getParameter("orderby")."

The BoardRecords has many set methods: public void setOrderby(String s){orderby=s;} and public void setOrderbytype(String s){orderbytype=s;}, . . . , and public void setSearchkey(String s) {searchkey=s.trim( );}. Thus, the JSP program can pass the values into a BoardRecords object by statements like "BR.setBoardid(boarded)." By making a series of similar calls, the JSP program passes to the BoardRecords the values of orderby, orderbytype, searchkey, pageSize, curPage, table type ("v"), and user's role ("MB"), group_id, usr_id, and boarded.

Finally, the JSP program calls a BoardRecords object to retrieve data using new sorting and search parameters. In retrieving new data, BoardRecords applies the new value of orderby and the new value of orderbytype in sorting the data, and the new value of searchkey in conducting search. The JSP program then uses data to build the web page, inflecting the new sorting key and sorting method.

A page size control bar is placed at the bottom of each of the view tables. For example, the page size in terms of records per page is used in BoardRecords to compute the total page number. It first constructs a SQL statement for the record count under the search conditions. It then connects to the database application, gets the count of records, and gets max page number by dividing the total record number by page size with proper rounding. This page size value is passed between the web page, the JSP program, and BoardRecords. The user can change page size on the web page. After it is changed and the web page is submitted, the JSP program gets this value, passes it into a BoardRecords object, where it is used to compute maximum page number.

The search function for configured table is realized in a similar way. The web page contains code statement <td align="right"> <input type="hidden" name="searchkey" value="testkey" /> <input type="text" name= "searchkeytxt" value="testkey" I> <input type="button" name="search" value="Search" onclick="searchKey( )"/></td> When the user submits the page to conduct a search, it calls a script function searchKey( ). The script assigns pageNo and pageSize with null since the data records to be retrieved are unknown, alter the value of searchkey in the hidden field and submits the page to the same server program with a new search key. The program gets values for searchkey, pageNo, pageSize, curPage, and orderby etc. from the submitted web page. It then uses the set-methods like "BR.setSearchkey(searchkey)" to pass into a BoardRecords object the values of searchkey, pageSize, curPage, orderby, and orderbytype etc. When the web page is submitted for a search, the only values that have been changed are those relating to the search, BoardRecords uses them to retrieve data from the same database table using the same other parameters, and sends a web page containing records found by the search keys.

10. Global Search for all Data Tables and Non-Configured Tables

Global search presents several problems in its implementation. One of the problems is the display format of the data records. It cannot be planned in advance because data tables are configured after the programs have been developed. Data tables have different field numbers and types. Due to the uncertainty, it is impossible to display them in a conventional table view on the web page because the programmer could not allocate a suitable size. Therefore, search results are printed in "text format" on the web page or in the same display layout set for the view table. Another problem is the lack of a common sorting key. Since data tables have different column numbers and different fields, there is no way to sort them cross all data tables. Search results are displayed according to the order of tables and a default filed of the first table. The result page contains a tool for changing sorting method. This setting tool, in conjunction with the server program, allows the user to choose the first table, and select a sorting key from all available fields in the selected first table. The system allows the user to focus on one table and view the results sorted by the most likely key. It is understood that an advanced sorting tool can be implemented to allow the user to set up the order of all tables for showing search results, select a sorting key for each of the tables, and save the search configuration on the system.

The web page of the view table contains the following code for submitting a global search: <form name= "frmgbsearch" action="<%=request.getContextPath( ) %>/jsp/member/combinedSearch.jsp" method="post" onsubmit= "return checkSearch(this)"><table><td valign="middle" > <img src="<%=request.getContextPath( ) %>/img/zoom.gif" width="15" height="20" /></td> <td valign="middle" ><input type="text" name="globalsearch" value=" " size="30"> <input type="submit" name="sbtgs" value="Global Search" ></td></tr></table></form>. On combinedSearch.jsp is the statement: jsp:useBean id="CS"

class="dforum.CombinedSearch" for conducting search. The JPS program declares variables with initial values for orderby="sys_record_id", searchkey=" ", firstboard=" ", records=new ArrayList( ) boards=new ArrayList( ), maxPage=0, curPage=1, pageSize=50, and isexist=false. It then gets values for orderby, searchkey, firstboard, pageNo, and pageSize by using request.getParameter. It gets usr_id and group_id from a session object. It then passes the values of usr_id, usr_id, pageSize, curPage, searchkey, firstboard, orderby, pageNo and isexit into a combinedSearch object. It then calls combinedResults( ) by "isexist=CS. combinedResults( )" If result exists, the JSP program gets records, maxPage, and boards (table name list) by using three get-methods: records=CS.getRecords( ), maxPage= CS.getMaxPage( ), and boards=CS.getBoards( ). The program finally displays search results as shown in FIG. 7G.

The combinedSearch goes through following steps. In the conbinedResult method, it connects to the database, then calls four methods: searchBoardO, field( ), boardMaxpage ( ) and selectRecords( ), and closes the connection. In searchBoards( ) method, the program gets a list of table names and table common names (or description) for all data tables, saves them in str, and adds them into boards by using boards.add(str). It then adds discussion table to str, and adds it to boards. And finally, it adds pad table and its description to boards. In this way, combinedSearch build up the list of tables for global search.

In field( ), the program constructs the portion of the where statement ("where[j]") for conducting search. It retrieves the field names for each of the tables. It constructs part of an SQL statement for each of the table. This SQL statement looks like "Acrynom like '% firstkey secondkey %' or Acrynom like '% firstkey %' or Acrynom like '% secondkey %' or Full_name like '% firstkey secondkey %' or Full_name like '% firstkey %' or Full_name like '% secondkey %' or Comment like '% firstkey secondkey %' or Comment like '% firstkey %' or Comment like '% secondkey %'".

In boardMaxPage( ), the program gets the count of found records for each table by using the statement like "select count(*) from [table] where . . . ", where [table] is database table name. It goes through the loop from j=0 to board.size ( )−1. For [table] is a discussion table, it would be "select count(*) from [table] where group_id='groupid' and . . . ". This program then sums up the counts for all tables to arrive at the total count, which is shown in the search results.

The program, by executing selectRecords( ), gets only the data records which is to be shown in the result page. The actual hits to a global search may be of many pages long, but the system needs to display only one page. It has initial values: startRecord=pageSize*(pageNo−1), curRecord=0, lastRecord=0, limitStart=0, limitSize=0, and readCount=0. The program conducts searches, for example, by using an SQL statement "select selectfields[j]," as fieldx, 'board[1]' as boardname from board[0] where where[j] [order by orderby] limit limitStart, limitSize." If there are four data tables, one pad table and a discussion table, the search program would execute a SQL statement like this six times. The statement for the discussion board includes an additional parameter, "group_id='groupid'," with necessary adjustment because the discussion table is shared (but their data are not). "Order by orderby" appears only for the table selected as the first table. The "x" in fieldx is table index number. After the server runs a global search by using search key "firstkey secondkey", an SQ1 statement for the Acronym table is "select Sys_status, Sys_record_id, Acrynom, Full_name, Comment, "as field0, "as field1, "as field2, "as field3, "as field4, "as field5, 'Acronym' as boardname from t4 where Acronym like '% firstkey secondkey %' or Acronym like '% firstkey %' or Acronym like '% secondkey %' or Full_name like '% firstkey secondkey %' or Full_name like '% firstkey %' or Full_name like '% secondkey %' or Comment like '% firstkey secondkey %' or Comment like '% firstkey %' or Comment like '% secondkey %' order by Sys_record_id limit 0,0." The statements for other data tables are obvious. This statement is intended to find each of the search keys in any searchable fields. Since this statement is run after boardMaxPage( ), the program only need to run the first one or few tables to get enough data records. The program retrieves records, and copies the field data (exclusive of system fields data) into a string buffer to form text. If a data field has nothing, it will be copied as "[ ]" or other notation. It adds a red color mark the record number of each of the tentative records (sys_status=1 or 2). One example of the record may looks like "<font color="red">11</font>; test11@test.com; [ ]; [ ]; Bar; Henry LLP; 11/10/2008; 1; For special use; [ ]  [Attorneys]." It is HTML code to be inserted in the table on the search result.

In generating the web page, the program also creates a sorting tool, which comprises a drop-down box for selecting the first table and a drop-down box for selecting a sorting field for the first table. The server knows all table names, the field names of each table, the total hits, and page number. Inside the code for the form, it has the following generic code:

```
First Table:<select name="firstboard" onchange="refreshOrderByList('/dforum');">
<option value="t1">Notes</option> . . . <option value="pad3">Pad</option></select>
Ordered By: <select id="orderby" name="orderby" style=" "></select> 
<input type="button" name="go" value="Go" onclick="document.PageForm.submit( );
" /> (where many table names are omitted)
```

After the user selects a table, the change to the table name calls the script to refresh the fields list by onchange="refreshOrderByList('/dforum');". When the user selects "Notes" as the first display table, the field names of the "Notes" table are displayed as the options for the "Ordered By" drop-down box. The script declares variables for first table, current sorting order, URL, and an ajax object, sets the Ajax request URL, sends an Ajax request, sets timeout for a response, and handles response. In handling the response, the script declares an orderby variable, gets result from the ajax object (results=ajax.getResponseXML ( ).getElementsByTagName("orderby");), clears the orderby list, and creates an option list. Tools implemented by Ajar technologies or remote scripting for this particular function are known and all kinds of scripts can be used with minor modification.

After the field list is refreshed on the web page, the user elects a field as a sorting key and sends the page to the server. CombinedSearch conducts a search by using new sorting parameters and returns search result using the first table and sorting field. The limited display records may make many searches unnecessary. If the page size is 50 records per page and if the first table returns 13 records, the second table returns 37 of found records. The server does not need to search the rest of tables. It is understood that a sophisticated advance search tool, such as the one used on the edit table page and the discussion board, may be implemented to allow the user to enter a plurality of search keys with "or" and "and" search logic. When the server receives the page, its constructs a proper SQL statement consistent with the search keys and the search logic.

11. Interactive Search and Data-Feeding Functions and Phrase Construction Methods Interactive search and data feeding functions are implemented for any destination field (i.e., "simple data source") or one or more component input boxes of a destination field (composite data source). Those functions are realized by using a setup table, method of defining a destination field and data sources, a server program for generating or embedding script or required code on the data entry page, and an interactive search program. The system comprises (1) a database table or equivalent for storing destination field, data source, construction type, and their relationship for system-wise application, (2) a server search program in support of Ajax object, and (3) special code included in the server program for generating data entry form. The server search program comprises three files: SuggestServlet, BoardSuggestBean, and FieldSourceFactory (or BoardSuggestFactory).

One example setup table is suggest_source (board_id int, field_name varchar(50), static_source varchar(5000), tabl_source varchar(5000), field_source varchar(5000), primary key (board_id, field_name). In this table, the board_id stores unique ID of the destination table. Field_name holds the name of the destination field to which suggested data pieces are provided. The static_source field stores data pieces with proper delimiter, tabl_source contains table names separated by a proper delimiter, and field_source contains field names with proper delimiter. The number of data units in the tabl_source and field_source are identical so that they are split up to form two string arrays (e.g., string table_name[i] and string field_name[i]), the same index number means that the table name is related to the field name. The value in the table name is single (i.e., "names"), but the field name may have plural fields separated by comma (i.e., "first_name, last_name, comment"). If the user wants to use static data source only, the user clicks the radio button for static data source, types data pieces with proper delimiter in the input box and submits the page for processing. Upon receiving the page, the server retrieves the data pieces and saves them as one single data field in the table.

The next step is to set up an interactive search and data-feeding function for a destination field as discussed above. The user opens a setup page for a destination field of any data table, and this setup page is automatically associated with the data table and the destination field. The user sets up a simple interactive search method or phrase construction method for the destination field. For simple method, the system gets destination field and the table ID while the user provides data source (data pieces or table names and field names of source data). For composite data source, the user provides additional data such as the number of components by generating a right number of input boxes. The setup data are saved in the suggest_source table or the equivalent file. For example, two data pieces, "first data choice" and "second data choice," for the acronym field of the acronym table (table id=4) may be expressed as (4.'acronym','first data choice\r\nsecond data choice',",",'0'). The manager may select one or more fields of one or more data tables as data source. The record (4,'Acronym',",'5;4;','Description,Comment,; Acronym,;','0');) means that the data source of the acronym field of the acronym table (table Id=4) is the description and comments fields of the privilege_log table (Id=5) and the acronym field of the acronym table (Id=4). An alternative setup data structure may look like "2:field1=table1.sfield2, table2.sfield1, and table2.sfield2" where the first numeral 2 is the table id and field1 is a destination field and the string after the equal sign defines table names and field names for the data sources. If the suggestion function is maintained in a file, the file should contain similar definitions. Project ID and board ID, which are unique among all projects, are used so that the same file can be used to track data sources for many projects on the server.

When a data entry form is called for the target table, the server determines if any of the fields of the data table is listed as a destination field in the setup table or equivalent file. If a field is a destination field, the server embeds necessary script and code in support of the interactive data-feeding function and phrase construction function. The static data pieces may be embed on the data entry page with if they are limited in number. The static data pieces may be placed in a drop-down box as an alternative. If the data pieces remain on the server, the server program retrieves the data pieces in one string, breaks it up at the delimiter, sends them to the server, and displays them in the selection box as selectable data pieces. If a field is setup with composite data source, the program generates a plurality of input box below the destination field and makes the destination field inactive. Variables such as cxtPath, table ID, and field name are embedded as hidden fields. The server embeds statement onkeyup="controlDiv(textOj, event, fieldname, fieldorder, stype)" and onBlur="checkDivStyle( ); appendSource ('Comment','sValue_Comment');." The form is also embedded with the script containing function controlDiv( ) { . . . }. Through different setups, a data entry form may contain several input boxes and several sets of phrase construction boxes, a plurality of sets of construction boxes may be created for a single destination field, and the different sets of construction boxes may use different data sources. Two input boxes may use the same data sources or part of the same data sources. Two or more input boxes may be for the same destination field, but use different data sources. Any of the data fields, which serve as data source, may also be set up with a data source on a data entry form. A script may be placed on the data entry page to copy the data from one input box to another automatically.

To avoid reading the setup record in the interactive search, the data entry page may be designed to contain (1) a listener's statement for triggering the running of the script by user's action in an input box, (2) the information on data name and fields names of data sources, (3) script to get the keys that the user is typing in the active input box, (4) code for passing names of destination field, the table names and field names of data sources, and the search key to the server, and (5) code for receiving found data pieces from the server and displaying it in the selection box for the user to select, and (6) code for coping user-selected data pieces into the construction box. In this case, the script passes the table names and field names of the data source, together with other necessary parameters to the server by using the request URL, and retrieves data pieces, and return found data pieces to the client computer to be displayed in the selection box.

When the user types in primary destination field of the data entry form, the typing triggers the statements to call the script function "controlDiv(textOj, event, fieldname, fieldorder, stype])." where fieldname is the name of the destination field, fieldorder is the order number of the construction box, and stype indicates source types: stype=L (data pieces on web page), stype=1 (data pieces from local field for copy use), and stype=0 (data from both the setup table and data tables). From the parameters passed from the statement, the script knows field name, component number, and data source type. The script resets current source page and selects source under various key characters. If the data source is a local source on the data entry form, it gets the data string, breaks it up at delimiter points, and shows them in the selection box.

If the data source is from the database table, the script calls appendSource( ) (or combinesource( ). Inside this function, it declares FactoryName and BeanName as function names of BoardSuggestBean and FieldSourceFactory. It declares a new Ajax object, sets request URL to Suggest-Servlet with proper path information, sends an Ajax request, and sets time out for response to be handled by handleResponse(ajax). SuggestServlet gets FactoryName and BeanName and other necessary information. It processes the request and generates a response by using instantiated objects of BoardSuggestBean and FieldSourceFactory and sends a response. BoardSuggestBean contains get-methods and set-methods for current page number, table ID, field names, and search keys. Inside FieldSourceFactory, the system accesses the suggest_source table to find the setup record for the same destination field. It then gets static data pieces and the table names and field names from the record from the setup table. If the static source field has not data pieces, the program retrieves only table names and field names. From the record, the system knows exactly the construction method, static data source, and table names and field names. The server retrieves the data, breaks up the data at delimited points, send them to the browser, and displays them in the selection box for selection. When data source comprises only a limited number of data pieces, the input field on data entry form may be implemented as simple drop-down box. Fixed data pieces are shown before the data from a data table. One example response might be "<response> <stype>0</stype> <item> <![CDATA [description1]]> </item> <item> <![CDATA [description2]]> </item> <item> <![CDATA [description3]]> </item> <item> . . . <![CDATA [Legal Department]]> </item> </response>" The data pieces are generally displayed in alphabetic order, however additional sorting rule may be implemented by adding a sorting operation in FIG. 5N and modifications of FieldSourceFactory. For a phrase construction method, the user types in each of the component input boxes, causes the server to search the source data, and selects a data piece for each of the component input boxes. If construction is conducted in one single construction input box, the user needs to enter suitable advance keys between two data logic components. After the user finishes entering data, the user submits the data entry form to the server so the server can get data and save the constructed phrase in the destination field of the target table. If the source data comprises more than one database table and data fields, the server retrieves partially matched data pieces from all tables, pools them together, presents them in the selection box, and copies a user-selected data piece into the input box for final submission. The interactive search and data feeding function is well known. Its unique features in the present implementation include the feature for setting up this function, the server ability to embed script on web data entry form according to the setup, and different ways of retrieving data from the setup table or to retrieve data from one or more data fields of data tables.

The phrase-constructing feature and interactive search and data-feeding feature is useful in creating privilege log. Assuming that a typical description for a log entry is made of the five components: [component 1] [component 2] [component 3] [component 4] [component 5], and each of the components has the following choices:

Component 1: Letter, email, Article, Press release (static).

Component 2: prepared by counsel, sent to counsel, and provided by counsel (static).

Component 3: Attorneys: First name, Last name (may have >1000 names).

Component 4: concerning, regarding, relating (static).

Component 5: product litigation, employment relationship, customer complaint, and business transactions (static).

The user selects "Composite data source" to set up a phrase construction function in FIG. 5N. After a construction function is set up, the setup data in the suggest_source table may look like (5,'Description','Letter\r\nemail\r\nArticle\r\nPress release@# prepared by counsel\r\nsent to counsel\r\nprovided by counsel@#@# concerning\r\nregarding\r\nrelating@# product litigation\r\nemployment relationship\r\ncustomer complaint\r\nbusiness transactions@#', ';; 0:3, ; ; ;', ';; Firstname|Lastname|, ; ; ;', '1'). The record values mean that a type 1 construction ("a composite data source") is set for the description field of the privilege log table (ID=5). It has total five components as indicated by five "@#" count. The first and second components use static data sources, the third component uses the first name and last name field of the names table (ID=3), and the fourth and fifth components use static data.

When a user clicks "Enter Record," the server checks the suggest_source table or the equivalent file to determine if any data fields of the data table are listed as a destination field. The server retrieves this record, gets the static data string, and splits it at the delimiter to yield information such as the total number of construction components, the data pieces for the first and second components, and the data pieces for the fourth and fifth components. It also gets the source table ID=3 and field names (first name and last name) for the third component. The server program then embeds a script on the data entry form, and adding listener's statements for each active input field with necessary parameters for calling an interactive search program. When the user types in the first, second, fourth or fifth component boxes, the system retrieves the embedded static data pieces. When the user types in the third component box, the server searches retrieve the setup record for the description field, retrieves first names and last names, pools the static data pieces and retrieved data pieces, sends the data to the client computer, and fills the selection box with retrieved names. By going through the process, it constructs a phrase "Letter sent by counsel Triten concerning product litigation." The embedded script contains code for appending the values of all components with a preceding space to form final phrase in the construction box. Upon submission, the server saves the formed phrase in the destination field of the data table.

The script may be a universal program, which can be called by any active input fields to cause the server to search specified data sources. It may be a program for a specific field to cause the server to search specified data sources or plural programs for plural active destination fields.

In some cases, the data entry form does not have sufficient space for placing a plurality of component input boxes. The data-entry form may contain just one input box or "construction box." The user types in the input box, the server retrieves data pieces from the data source associated with the first component, and displays data pieces in a dynamically generated selection box. The user selects one of the data pieces and the script copies it into to the construction box. The user then types unique key or key combination for advancing to the second component, and types keys, which cause the script to call the search program to get data pieces for the second component, and displays them in the dynamic selection box. The user selects a data pieces, has it appended to the data in the construction box with a preceding space, and types a switch key to advance to the third component. This process is repeated until the user finishes all components. When the user finishes the process, a phrase is constructed in the construction box. To avoid confusion from losing track of keystroke sequence, all of the sequential searches may be triggered by a combination of a unique keystroke and a number key 1, 2, 3, or 4. Further when the data source is a database field, the server should conduct interactive search to narrow down the number of the data pieces. It is not required that every component is set up with a data source, and some components may accept user-entered data.

The construction box, where the user types keys directly, may be the input box itself. In this case, the user directly types in the input box for the destination field. When the user types in the input box, it invokes the selection box for the user to view, selects data pieces, and advances the component. In addition, the user should be allowed to edit the final phrase by editing the data piece in the construction box. The construction input box may be a dynamically generated box that may be different from the input box. In this case, the user types in the component box, but the final result is copied into the input box.

When the source data is the data from one or more data tables, the number of data pieces may be large. It is preferable to retrieve only the data pieces containing typed keys. The keystrokes for defining component order should be different from the keystrokes for retrieving data; the keystrokes for defining component order may be a special key plus a number key while data keystrokes are for sequential search. Keystrokes "ab" cause the server to retrieve only the words and phrases starting with "ab." Dynamically generated selection box should be labeled with the order number so the user knows if a component has been skipped. After a phrase is constructed and the data entry form is filled, the form is submitted to the server for processing. Upon receiving the form, the server retrieves data and saves it, including the constructed phrase in the data table.

The data feeding method may include (1) manually inputted data, (2) a static data source in an alphabetic order, (3) field data in an alphabetic order; and (4) a field data retrieved by typed keys. In addition, the user selects a keystroke such as control or other key combination as the key for advancing components. The third method is a server construction of a phrase using unique values from other fields in the same record. Phrase construction can be performed without personal attention after all of required fields have been filled with values. The program should mark out the records that have missing component data. In addition, all resulted phrases should be verified in a quality control stage to ensure that errors from component incompatibility are fixed.

A privileged user can use tools for setting up a background construction method. This method is useful only when it uses field data of same table or single data from other source. The user is allowed to define a destination field, the fields on the same table, construction order, and use of static string. If a component data comes from a field of a different table, it must have a single value and is able to get a single value by a condition. The system retrieves data pieces from source fields, appends them in buffers to form phrases, and finally writes them in the destination fields.

12. Personal Server Pad

A server pad is generated by a server and rendered on the browser of a client computer. Each of server pads uses a dedicated individual database table or a shared table. The data field of the server pad is a field, which is with the search scope of the global search function by the owner. Each user can get only the data pieces from user own server pad.

Two types of server pads may be used in this system. One version of the server pad is shown in FIGS. 7K-7L. The number of the users is unknown and thus the pad table cannot be created in advance. A database table or required entry on shared tables for a user is created when the account is assigned or when a user logs into the account for the first time. When the server saves the account information and makes a call to the program for creating the database table for a server pad: create table 'pad1' ('record_id' bigint(20) unsigned not null auto_increment, 'content' varchar(500), primary key ('record_id')). The server also creates a table for maintaining the information on all pad structures by create table 'pad_stru' ('usr_id' int(11), 'record_size' int(11) default '500', 'font_size' int(11) default '9', primary key ('usr_id'), constraint 'pad_stru_ibfk_1' foreign key ('usr_id') references 'users' ('usr_id') on delete cascade).

The pad allows the user to display data on the pad by (1) normal data entry order, (2) reverse data entry order, (3) alphabetic order, and (4) reverse alphabetic order. A successful implementation allows the pad to update in four views. Since data are entered into a text input box, preservation of data entry order is a challenge. If the data pieces are arranged in user's order, the data pieces are sorted in an alphabetic order, and the data pieces are saved, the pad loses original order information. One solution to this problem is to disallow the user to update and save the pad when the pad displays its data pieces in alphabetic or reverse alphabetic order. When the pad displays data in alphabetic or reverse alphabetic order, the pad is displayed in a read-only mode. While the user can view and copy data for other use, the user cannot enter data piece into the main window. When the user tries to update the pad or enters data on the server pad, the user is asked to go back to the original data entry order view.

Interactive search feature may be implemented by using Ajax XMLHttpRequest object or Remote Scripting technologies as discussed. After the user finds a data piece, the user may move the cursor to the data piece and clicks it. This data piece enters into the data input box. The user may copy this data piece into the system's clipboard for further use. In the alternative, the user may select the data piece by moving the cursor to the data piece and dragging the cursor to the end of the data piece, and pressing on Control-C to copy the selected data piece on clip board for later use. The data-feeding function in conducting search and sorting ignores space, articles, and embedded order numbers.

The search box is placed at the top of the server pad for conducting inclusive search (Not shown in FIGS. 7K, 7L). This search tool allows the user to find from the pad table any data piece that contains a search key. Its implementation is substantially same as all local search tools for other tables. The database table for the user's server pad is searched by the global search. However, the global search retrieves data only from the server pad table belonging to the user. Other features include the function for setting up font size, which can be saved in a database table.

Personal server pad can be implemented by using Edit Table feature with one modification: each pad uses a dedicated private data table. If all users share a common database table, the users should not share data. In addition, an interactive search box may be added for any key field. The data structure of the server pad can be configured so that the pad may look like a table calendar. This pad can meet all requirements. The privileged user may set up the table structure as global default for the group while each user may change the structure of user own pad table.

While the present implementation allows the administrator to access only the discussion board, the access privilege can be extended to other tables. This may be necessary when the administrator is a trusted manager for all projects. In addition, the manager can also determine whether the administrator is permitted to communicate with its users by email. If this mailing feature is disallowed, the administrator can send email to the project manager, who can decide if it should be relayed to the users.

Many well known hardware elements, program modules, or process steps are used as building components of the present invention, and equivalent hardware elements, program modules, or process steps may be used to achieve the same. Examples include the browser, the database application, uploading tools, network types, program development environment, account management tool, the log in method, session implementation, data entry forms, page navigation system, and general navigation structures.

MYSQL database application is used for managing data although other commercial database applications may be used. The table structures are provided to help understand the concept of the invention. Many different table structures can be created to achieve the same purposes. For example, some tables such as users table, pad_stru table, and small tables can be combined and other tables can be omitted. Some features are necessary in one application, but optional in other applications.

The database tables described in this disclosure are only examples. Tables with different structures can be used to achieve the same objective. Virtually any of the commercial database applications may be used to achieve the same objectives. While the concept is implemented in Java and JSP in this disclosure, it can be implemented in other development environments such in Java EE, PHP, and service-oriented architecture ("SOA"). While the system is deployed is shown under Fedora, they can run in Window XP, Windows Server, Solaris, Mac Operating System, and other Linux Operating Systems. Many programming languages may be used to implement the same concept. For example, CGI C programs and Apache HTTP can be used to implement the concept.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

A web-based information management system allows a group of users to collect, validate, and share data of unknown types and volume in real time over the Internet. The project work environment for a group can be created, modified, and reset instantly during a project life and between project life cycles by a plurality of methods without effecting system integrity and core functions such as data validation, searches and sorting, data preservation, data display feature, and productive data entry methods.

What is claimed is:

1. A method for collecting information from and sharing information among a group of users comprising at least one user, each of the at least one user being on a client computer connected to at least one server, the method comprising:
   providing a web application which is capable of communicating with a database application;
   establishing communication with the database application on the at least one server and creating a database for the database application, wherein the web application is capable of accessing the database;
   setting up a project for the group using a project identity or a group identity;
   creating a user account for each of the at least one user, wherein each of the at least one user can access data of the group in the database;
   providing a tracking table which is a structured data saved in non-volatile memory of the at least one server, a database table in the database, or combination thereof, wherein the tracking table stores table-tracking information comprising table identity information, use information, and optionally navigation information;
   configuring at least one data table in the database on the at least one server for storing data of the group by using one or any combination of configuring operations chosen from: (1) creating a new data table in the database and adding use information and table identity information for the new table in the tracking table, (2) dropping a data table from the database and deleting the use information and the table identity information for the deleted table from the tracking table, and (3) modifying a data table by changing at least one field name, at least one field data type, or both, and modifying table identity information, use information, or optionally navigation information for the modified data table in the tracking table;
   creating at least one navigation bars by using table-tracking information from the tracking table, wherein a button or a link of the at least one of the navigation bars uses table identity or navigation information for the data table as a button name or a link name, and uses the table identity information for the data table in accessing the data table in the database;
   generating at least one web page by the at least one server by using retrieved table-tracking information for each data table of the at least one data table, wherein the web page generating step further comprises including in a web heading the use information for the data table, and placing one of the navigation bars that contains table identity information for the data table on the web page;
   submitting data from a client computer using a submitting web page to the at least one server for storage in any of the at least one data table, wherein the submitting web page uses table identity information from the tracking table as at least part of a parameter for identifying the data table by the at least one server; and
   retrieving data from any one of the at least one data table by using a retrieving web page, wherein the retrieving web page uses table identity information from the tracking table as at least part of a parameter for identifying the data table by the at least one server, arranging the retrieved data in a display layout on the retrieving web page and displaying the retrieved data on the retrieving web page on a client computer.

2. The method of claim 1, wherein the step of configuring the at least one data table comprises any one operation selected from: (1) executing a default configuration file containing table names and table structures to create at least one data table on the server, (2) uploading and executing a configuration file containing table names and table structures to create at least one data table on the server, (3) modifying at least one data table by using a configuration menu on a web page, and (4) uploading a compressed project file from a client computer to the server and executing the project file to alter at least one data table on the server, wherein each configuring operation changes data tables in the database and updates table identity information, use information, and optionally navigational information for the group in the tracking table.

3. The method of claim 1, wherein table-tracking information stored in the tracking table comprises a plurality of data records, each data record of which comprises a table identity string, a table name string, and a navigation name string, jointly for tracking one data table, wherein a new data record is added to the tracking table upon the addition of a new data table, the data record for an existing data table is deleted from the tracking table upon deletion of the data table, and the data record for a data table is modified upon modification of the data table.

4. The method of claim 1, further comprising accepting typed keys in an input box on a web page for a destination field of one of the at least one data table, conducting an interactive search in a data source to get data, retrieving the found data from the server, displaying the retrieved data in a selection box, and copying a user-selected data piece from the selection box into the input box.

5. The method of claim 1, further comprising constructing a phrase by combining plural user-selected data pieces that have entered in plural component input boxes on a web page or by combining a series of data pieces that have been selected in a dynamically generated selection box.

6. The method of claim 4, further comprising setting up a data source for the input box on a web page by a method selected from: setting up a composite data source using a setup tool on the web page, uploading a file containing a setup instruction for associating the destination field with a fixed data source or at least one data field of one data table of the at least one data table, and entering the setup instruction into a setup table.

7. The method of claim 1, wherein each of the navigation bars further includes navigation information on a button or a link for one of the at least one data table for the group.

8. The method of claim 1, further comprising generating a web page that contains a plurality of table configuration choices respectively for different project identities or group identities, upon selection of a choice by a user from the plurality of table configuration choices, submitting the web page to the at least one server for processing and execution, wherein each of the plurality of table configuration choices is associated with a unique configuration file, whereby the server configures data tables according to the selected configuration file.

9. The method of claim 1, further comprising conducting a global search which comprises searching each of the at least one data table, arranging found data records according to the data tables and a selected field of a first data table, and displaying found data records on a result web page.

10. A computer program product, comprising:
a non-transitory computer-readable storage medium having computer-readable program code embodied therewith, the computer-readable program code executable by a processor of a server to perform an operation comprising:
communicating with a database application installed on the server;
creating a user account for a group of users comprising at least one user, and allowing a user in the user account to access data of the group;
providing a tracking table which is a structured data saved on non-volatile memory of the server, a database table in the database, or a combination thereof, wherein the tracking table holds a plurality of data records, each data record containing a table identity string, a table name string, and optionally a navigation name string for tracking a data table;
configuring at least one data table in the database on the server for the group by using any one configuring operation or any combination of configuring operations chosen from: (1) creating a new data table together with table fields in the database and adding a unique table identity string, a table name string, and an optional navigation name string in the tracking table, (2) dropping a data table from the database and deleting the data record associated with the deleted data table from the tracking table, and (3) modifying a data table by changing at least one field name, at least one field data type, or both, adding a new field or deleting an exiting field, and updating the table identity string, the table name string, and/or the navigation name string for the modified data table, wherein each configuring operation may be used more than once;
retrieving from the tracking table data records for the group, and creating at least one navigation bar for each of the at least one data table, wherein the step for creating a navigation bar for a data table further comprises using a navigation name string or a table name string of the data record for the data table as a button name or a link name, and using a table identity string for the data table as at least part of a parameter for uniquely pointing to the data table in the database;
generating at least one web pages by the server for each data table of the at least one data table by using retrieved data records from the tracking table, wherein the web page generating step further comprises including in a web heading a navigation name string or a table name string from a retrieved data record for the data table and placing one of the navigation bars that contains a table identity string for the data table on the web page;
submitting data from a client computer to the server for storage in any of the at least one data table by using a web page including a table identity string, a table name string and/or a navigation name string for the data table from the tracking table, and saving the submitted data in the data table on the server; and
retrieving data from any one of the at least one data table by using at least one web pages, each of which includes a table identity string, a table name string and/or a navigation string for the data table from the tracking table, and arranging the retrieved data in a display layout on the web page, and displaying the retrieved data on the web page on a client computer.

11. The computer program product of claim 10, the operation further comprising one configuring operation selected from: (1) executing a default configuration file containing table names and table structures to create at least one data table on the server, (2) uploading and executing a configuration file containing table names and structures to create at least one data table on the server, (3) modifying at least one data table on the server by using a configuration menu on a web page, and (4) uploading a compressed project file from a client computer to the server and executing the project file to alter at least one data table on the server, wherein each configuring operation changes data records for the group in the tracking table.

12. The computer program product of claim 10, the operation further comprising accepting typed keys in an input box on a web page for a destination field of a data table of the at least one data table, conducting an interactive search in a data source to get data, retrieving the found data from the server, displaying the retrieved data in a selection box, and copying a user-selected data piece from the selection box into the input box.

13. The computer program product of claim 10, the operation further comprising editing and deleting a plurality of data records for a data table of the at least one table on a web page, adding data records on the web page, submitting the web page to the server, and saving changes made on the web page in the data table.

14. The computer program product of claim 10, the operation further comprising generating a web page that contains a plurality of table configuration choices respectively for different project identities or group identities, upon selection of a choice by a user from the plurality of table configuration choices, submitting the web page to the server for processing and execution, wherein each of the plurality of table configuration choices is associated with a unique configuration file, whereby the server configures data tables according to the selected configuration file.

15. A method of extending functions of a database application on a server to at least one client computer in a network, the method comprising:
  running the database application on the server and creating a database for the database application;
  providing a tracking table which is a structured data saved on non-volatile memory on the server, a database table in the database, or a combination thereof, wherein the tracking table is for storing a plurality of data records, each data record containing a table identity string, a table name string, and optionally a navigation name string for tracking a data table;
  configuring at least one data table in the database on the server by using any one or any combination of configuring operations selected from: (1) creating a new data table together with table fields in the database and adding a unique table identity, a table name string, and an optional navigation name string in the tracking table, (2) modifying a data table by changing at least one field name, at least one data type, or both, adding a new field, and/or deleting an existing field, and updating the data record for the modified data table in the tracking table, and (3) dropping a data table in the database and deleting the data record for the deleted data table from the tracking table;
  retrieving from the tracking table data records, creating at least one navigation bar for each data table of the at least one data table using the retrieved data records, wherein a button or a link of the at least one navigation bar uses a navigation name string or a table name string of the retrieved data record for the data table as a button name or a link name, and using a table identity string for the data table by the server in accessing the data table in the database;
  generating at least one web page by the server by using retrieved data records for each of the data tables, the web page generating step further comprising including in a web heading a navigation name string or a table name string from a retrieved data record for the data table and placing a navigation bar that contains a table identity string for the data table on the web page,
  wherein the web pages for the at least one data table maintain database accessing functions including submitting data from a client computer to the server for storage in one of the at least one data table, searching data in one of the at least one data table, and retrieving data from one of the at least one data table and displaying the retrieved data for one of the at least one data table on the web pages on a client computer.

16. The method of claim 15, further comprising editing a plurality of data records for one of the data tables on a web page, adding data records on the web page, upon submitting the web page to the server, saving changes made on the web page in the data table.

17. The method of claim 15, further comprising creating a display layout for one of the at least one data table, upon selecting a display layout, applying the selected display layout to data from the data table on web pages.

18. The method of claim 17, wherein available display layouts include a one-line-per-record layout, or a one-field-per-line display layout.

19. The method of claim 15, further comprising uploading a configuration file containing table definitions and display layout definitions, reading the table definitions and the display layout definitions, deleting existing data tables, creating data tables according to the table definitions, and writing the display layout definitions in a display setup table.

20. The method of claim 15, further comprising generating a web page that contains a plurality of table configuration choices respectively for different project identities or group identities, upon selection of a choice by a user from the plurality of table configuration choices, submitting the web page to the server for processing and execution, wherein each of the plurality of table configuration choices is associated with a unique configuration file, whereby the server configures data tables according to the selected configuration file.

* * * * *